United States Patent [19]
Terasawa et al.

[11] Patent Number: 5,760,967
[45] Date of Patent: Jun. 2, 1998

[54] ZOOM LENS

[75] Inventors: Chiaki Terasawa; Jun Hosoya, both of Kanagawa-ken, Japan

[73] Assignee: Canon Kabushiki Kaisha, Tokyo, Japan

[21] Appl. No.: 345,733

[22] Filed: Nov. 22, 1994

[30] Foreign Application Priority Data

Nov. 30, 1993 [JP] Japan .................................. 5-326225
Jun. 30, 1994 [JP] Japan .................................. 6-172078

[51] Int. Cl.$^6$ .................................................. G02B 15/14
[52] U.S. Cl. .................................... 359/684; 359/688
[58] Field of Search ................................ 359/688, 684

[56] References Cited

U.S. PATENT DOCUMENTS

| | | | |
|---|---|---|---|
| 4,099,845 | 7/1978 | Takesi | 359/684 |
| 5,136,431 | 8/1992 | Terasawa et al. | 359/684 |
| 5,572,276 | 11/1996 | Hirakawa | 359/684 |

FOREIGN PATENT DOCUMENTS

| | | |
|---|---|---|
| 52-109952 | 9/1977 | Japan . |
| 52-128153 | 10/1977 | Japan . |
| 52-41068 | 10/1977 | Japan . |
| 55-57815 | 4/1980 | Japan . |
| 55-117119 | 9/1980 | Japan . |
| 59-4686 | 1/1984 | Japan . |
| 61-53696 | 11/1986 | Japan . |

*Primary Examiner*—Scott J. Sugarman
*Attorney, Agent, or Firm*—Fitzpatrick, Cella, Harper & Scinto

[57] ABSTRACT

A zoom lens comprising, from front to rear, a first lens unit of positive refractive power, a second lens unit of negative refractive power for varying the focal length, a third lens unit of positive or negative refractive power for compensating for the image shift with zooming, an aperture stop and a fourth lens unit having the image forming function and stationary during zooming, wherein the first lens unit has a front lens sub-unit of negative refractive power, a first lens sub-unit of positive refractive power and a second lens sub-unit of positive refractive power, and wherein during focusing from an infinitely distant object to an object at the minimum distance, at least the first and second lens sub-units are axially moved.

20 Claims, 30 Drawing Sheets

OBJECT DISTANCE : INFINITY

OBJECT DISTANCE : 3.0m

OBJECT DISTANCE: 0.9m
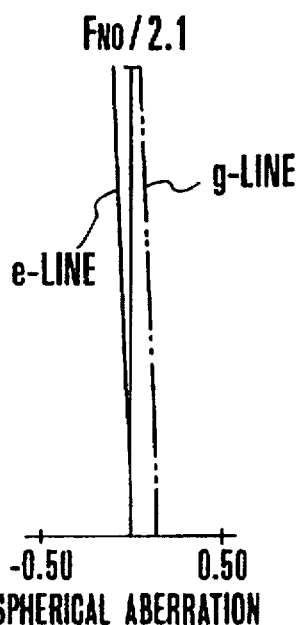
F I G.7A
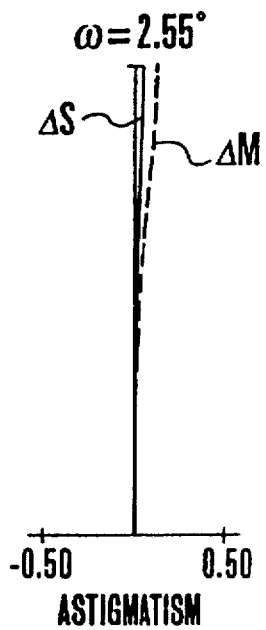
F I G.7B
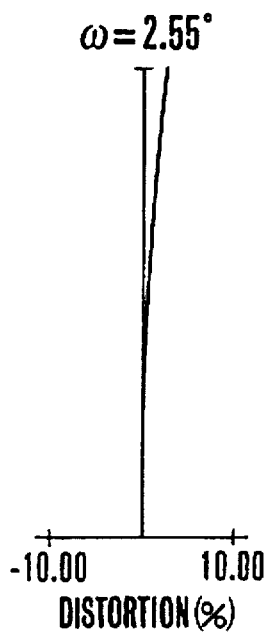
F I G.7C
OBJECT DISTANCE: INFINITY
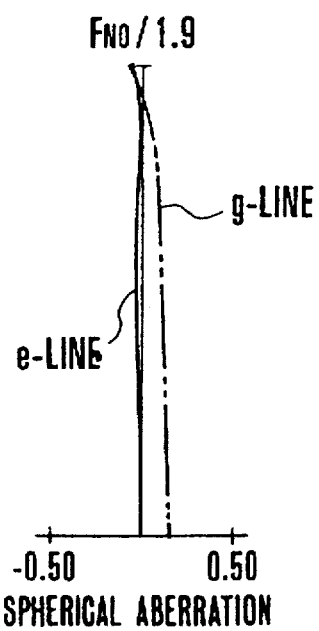
F I G.8A
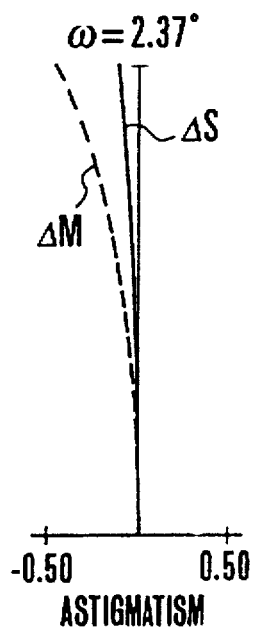
F I G.8B
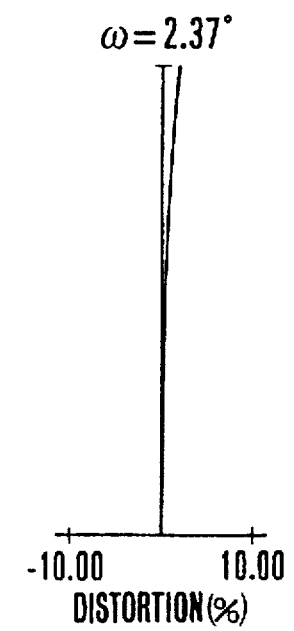
F I G.8C OBJECT DISTANCE: 3.0m OBJECT DISTANCE: 0.8m

OBJECT DISTANCE: INFINITY
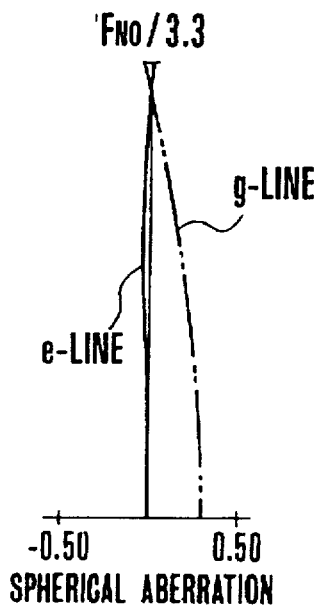 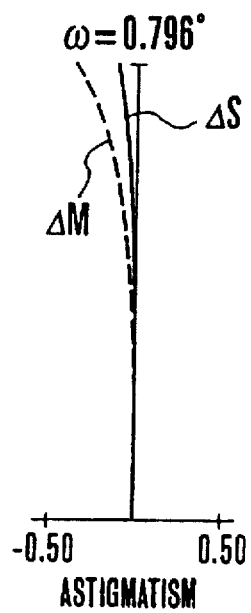 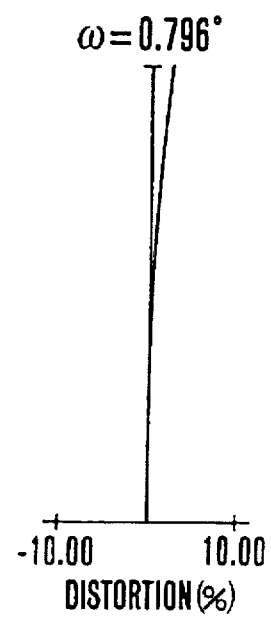
F I G.11A  F I G.11B  F I G.11C
OBJECT DISTANCE: 10.0m
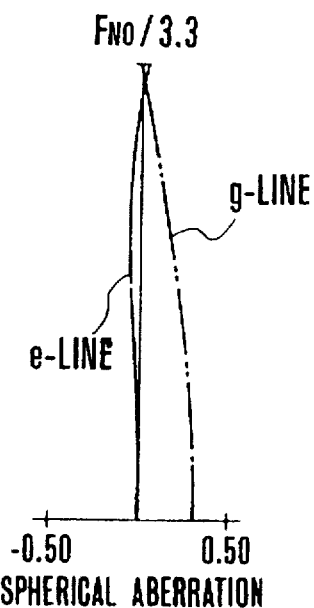 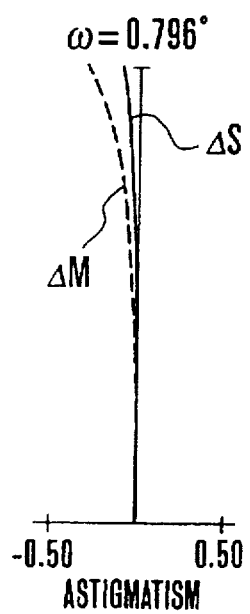 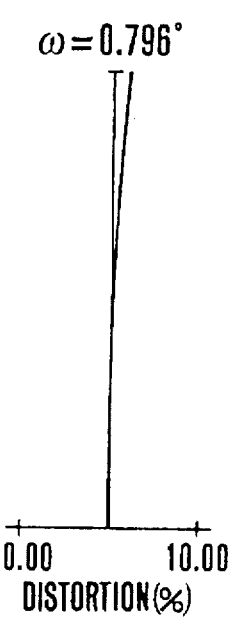
F I G.12A  F I G.12B  F I G.12C OBJECT DISTANCE: 2.0m

OBJECT DISTANCE: INFINITY

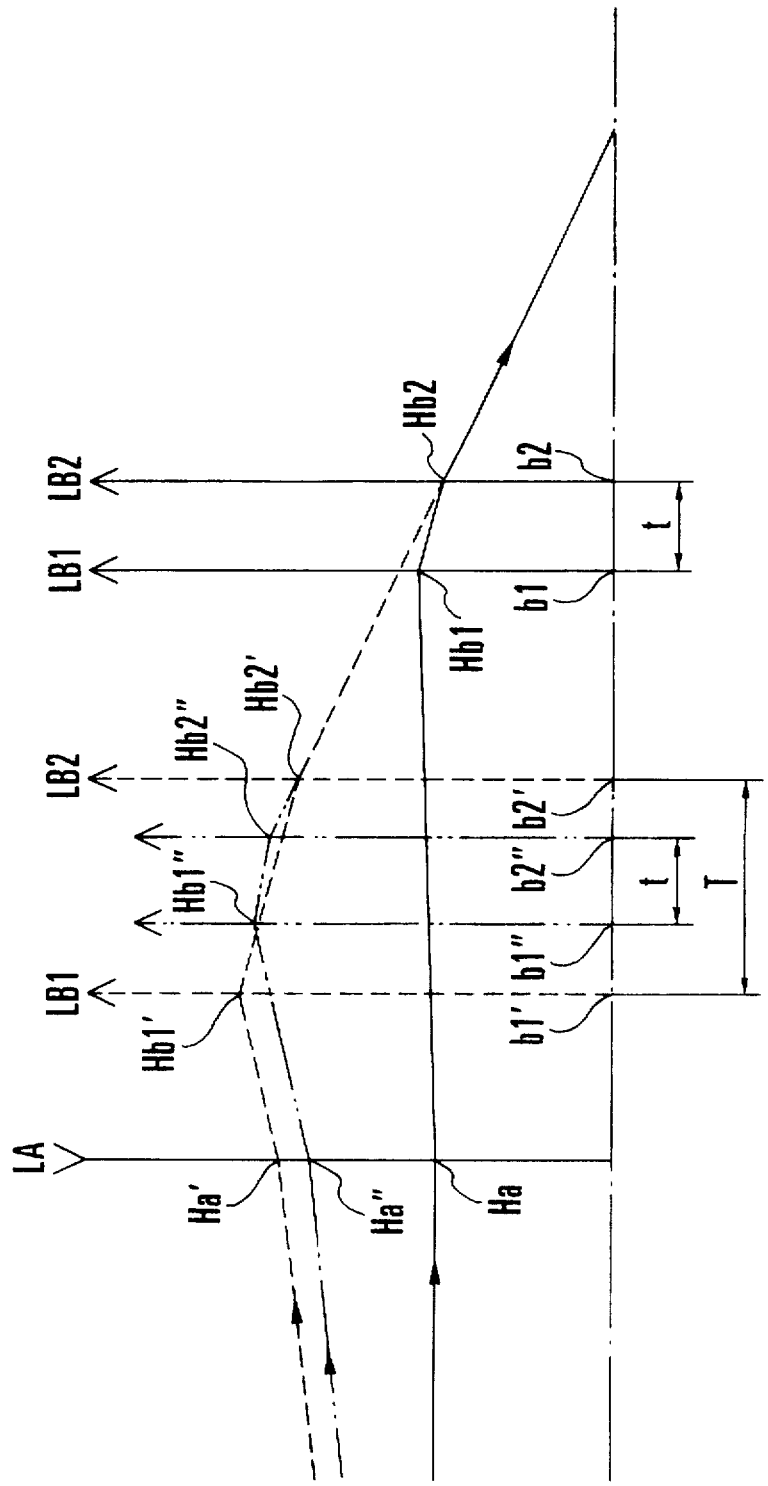

AT ∞

AT M.O.D.

f = 9.5
OBJECT DISTANCE : 3.0 m
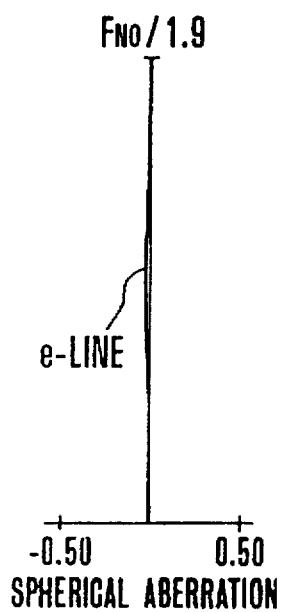
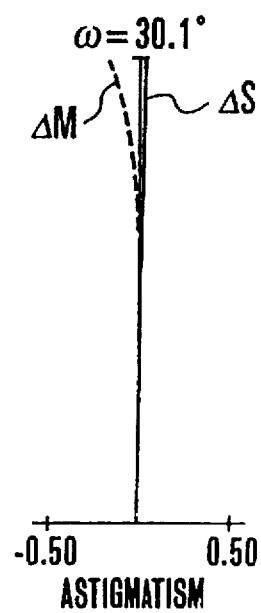
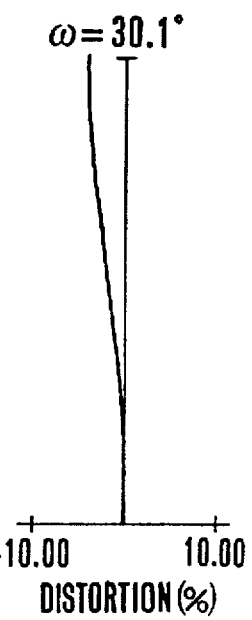
F I G. 26A  F I G. 26B  F I G. 26C
f = 30.04
OBJECT DISTANCE : 3.0 m
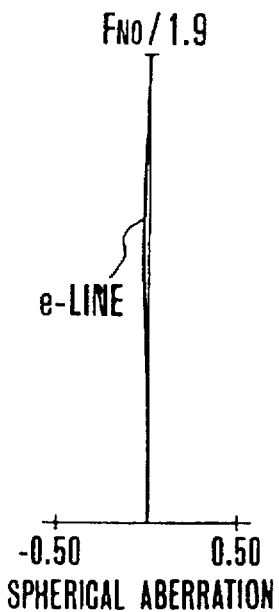
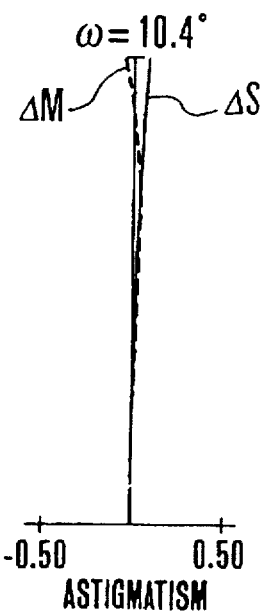
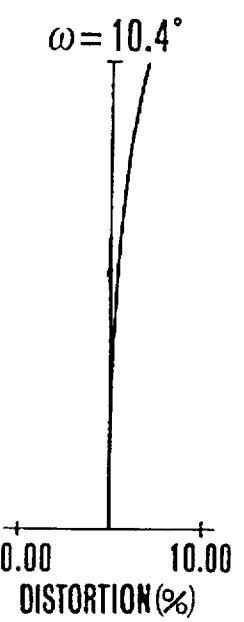
F I G. 27A  F I G. 27B  F I G. 27C f = 133.0
OBJECT DISTANCE: ∞
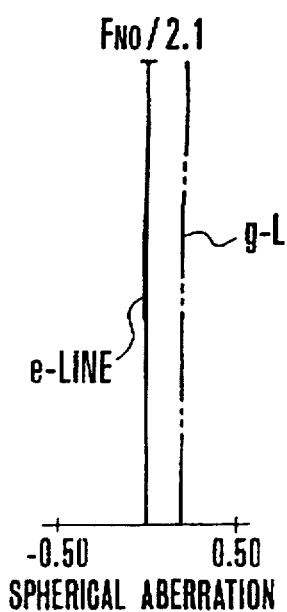
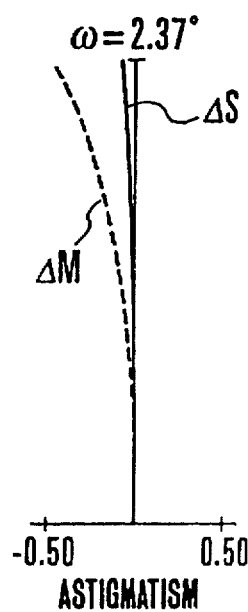
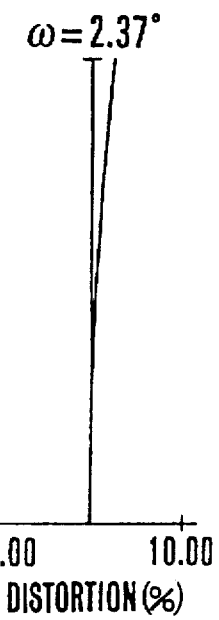
F I G. 28A  F I G. 28B  F I G. 28C
f = 133.0
OBJECT DISTANCE: 3.0 m
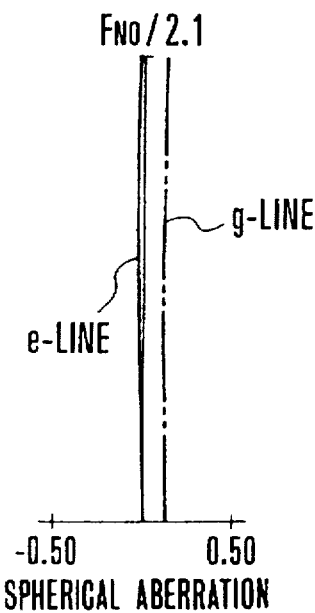
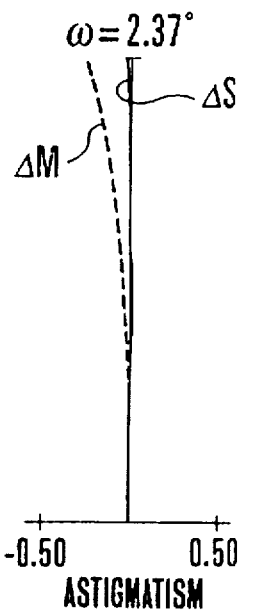
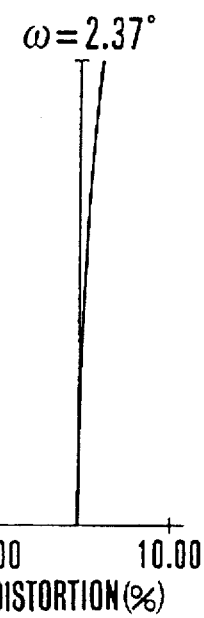
F I G. 29A  F I G. 29B  F I G. 29C f = 133.0
OBJECT DISTANCE: 1.3 m
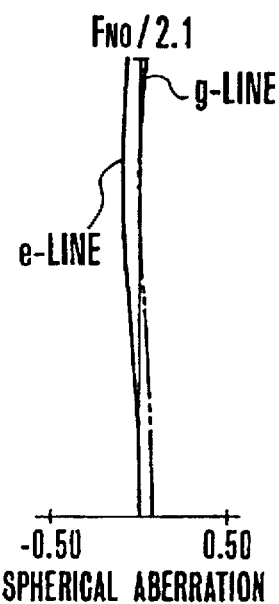
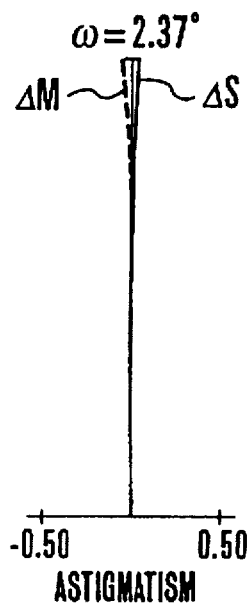
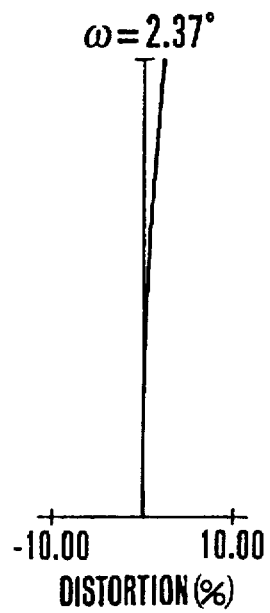
F I G. 30A  F I G. 30B  F I G. 30C
f = 133.0
OBJECT DISTANCE: 0.9 m
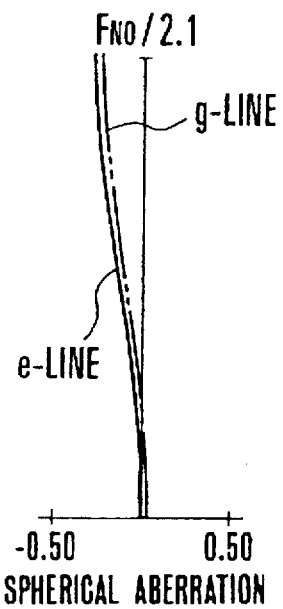
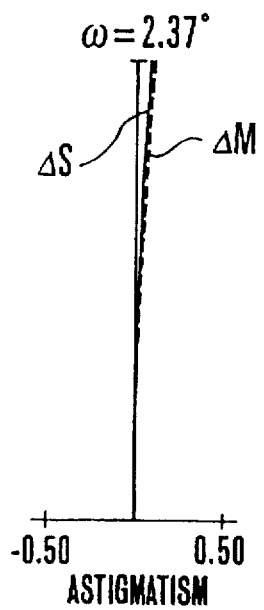
F I G. 31A  F I G. 31B  F I G. 31C f = 9.0
OBJECT DISTANCE : 3.0m
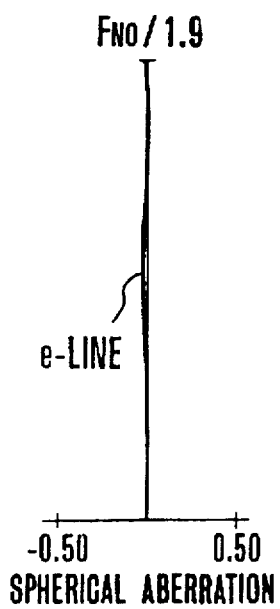
FNO/1.9
e-LINE
-0.50    0.50
SPHERICAL ABERRATION
F I G. 32A
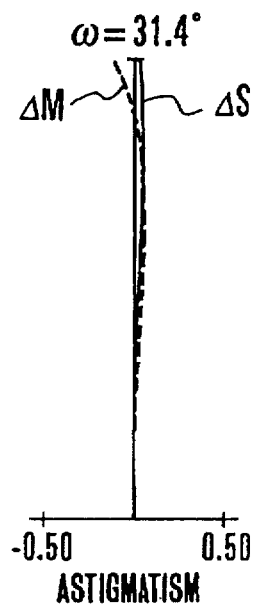
ω = 31.4°
ΔM    ΔS
-0.50    0.50
ASTIGMATISM
F I G. 32B
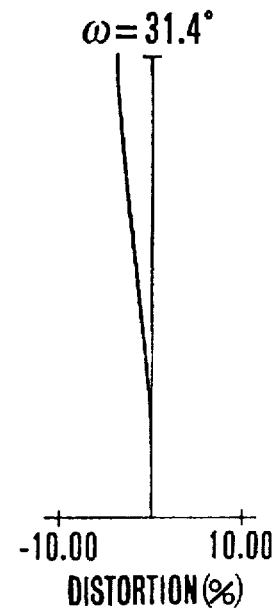
ω = 31.4°
-10.00    10.00
DISTORTION(%)
F I G. 32C
f = 28.46
OBJECT DISTANCE : 3.0m
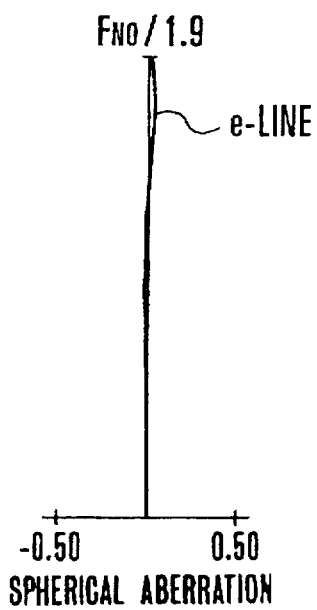
FNO/1.9
e-LINE
-0.50    0.50
SPHERICAL ABERRATION
F I G. 33A
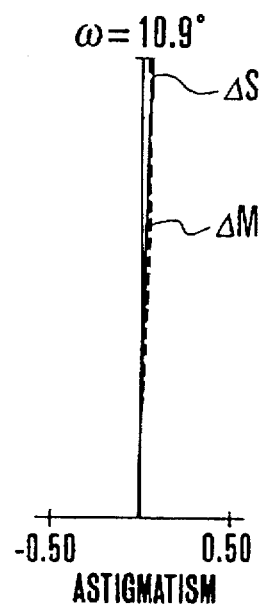
ω = 10.9°
ΔS
ΔM
-0.50    0.50
ASTIGMATISM
F I G. 33B
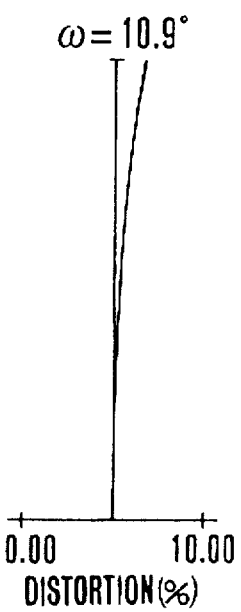
ω = 10.9°
-10.00    10.00
DISTORTION(%)
F I G. 33C f = 126.0
OBJECT DISTANCE: ∞
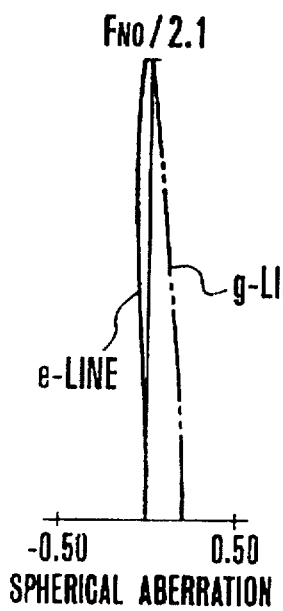
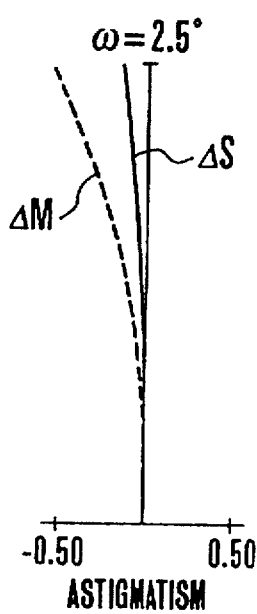
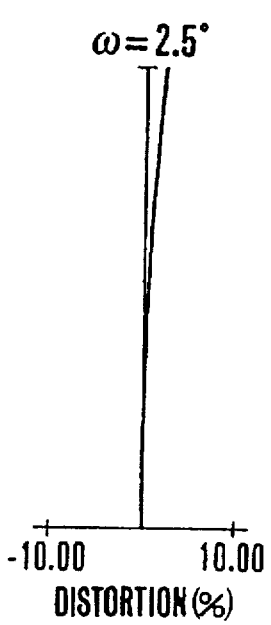
F I G. 34A  F I G. 34B  F I G. 34C
f = 126.0
OBJECT DISTANCE: 3.0m
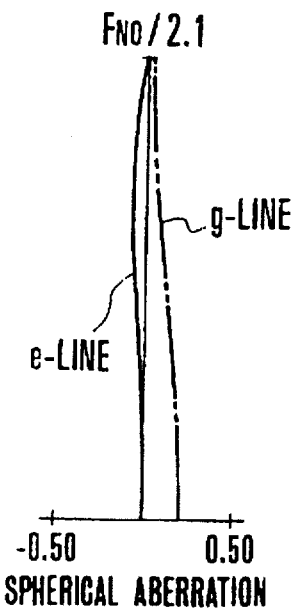
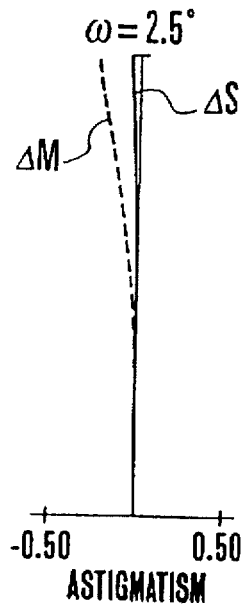
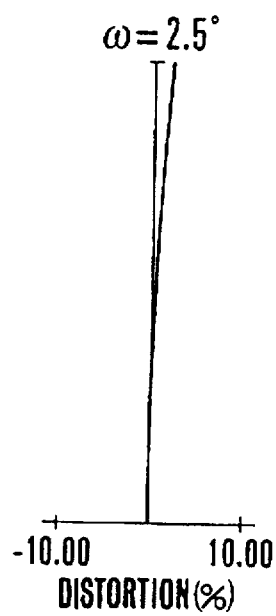
F I G. 35A  F I G. 35B  F I G. 35C f = 126.0
OBJECT DISTANCE: 1.3 m
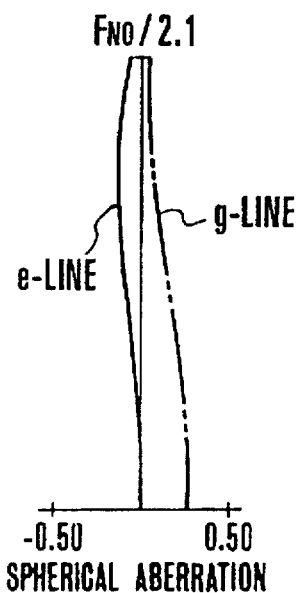
F I G. 36A
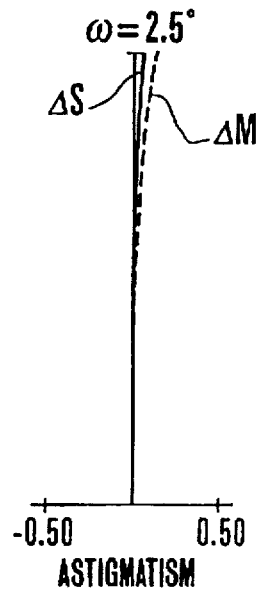
F I G. 36B
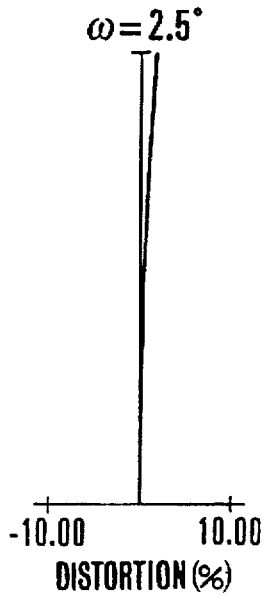
F I G. 36C
f = 126.0
OBJECT DISTANCE: 0.8 m
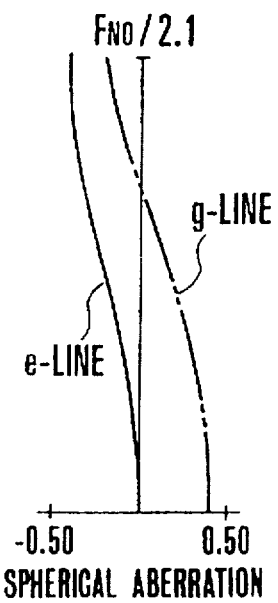
F I G. 37A
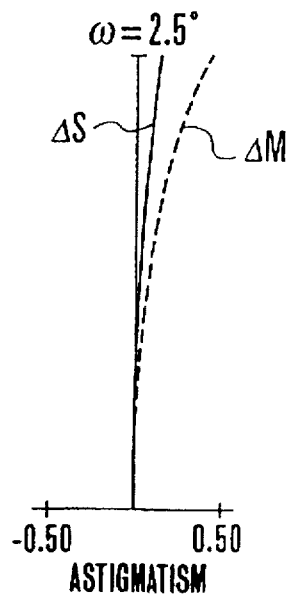
F I G. 37B
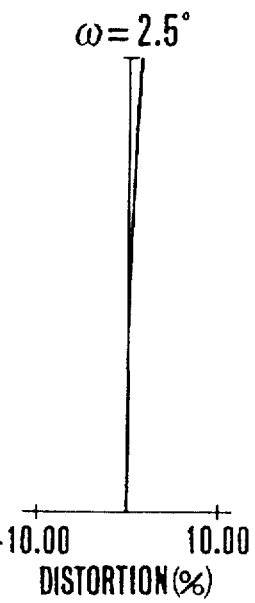
F I G. 37C

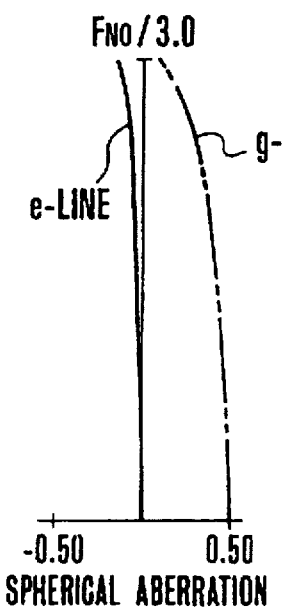
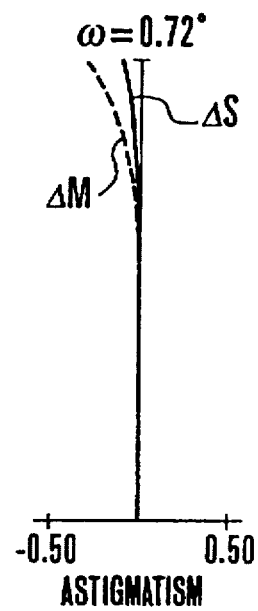
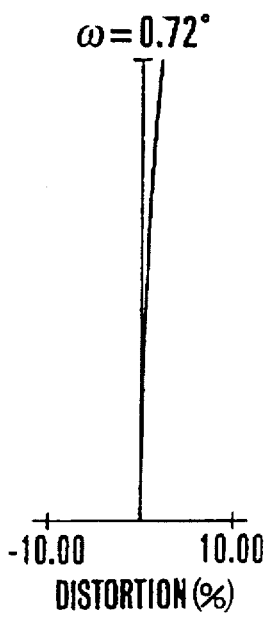
F I G. 40A  F I G. 40B  F I G. 40C
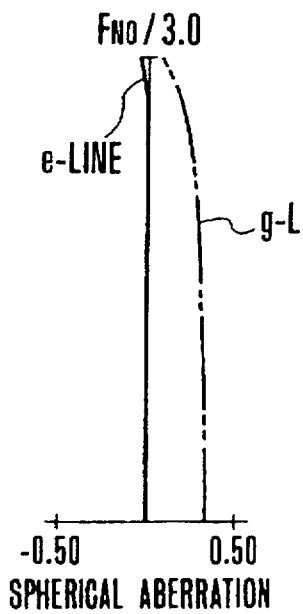
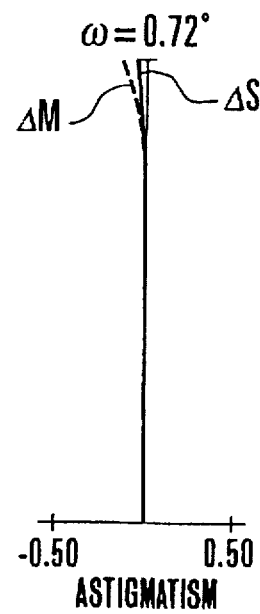
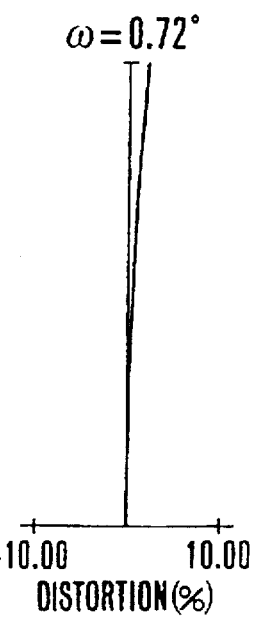
F I G. 41A  F I G. 41B  F I G. 41C f = 396.0
OBJECT DISTANCE: 3.0 m
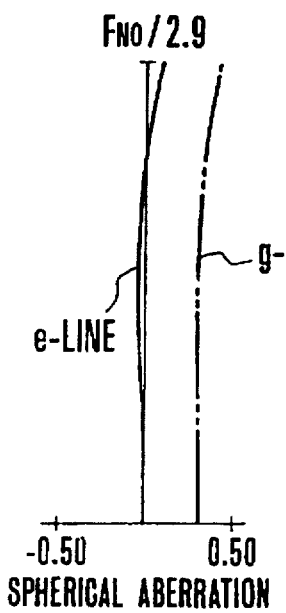 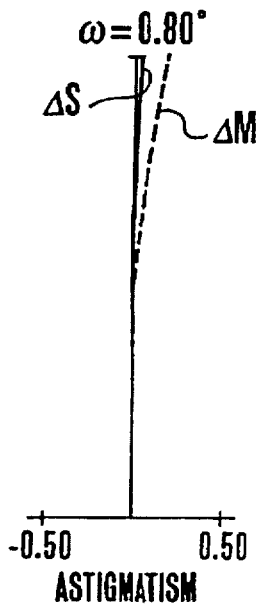 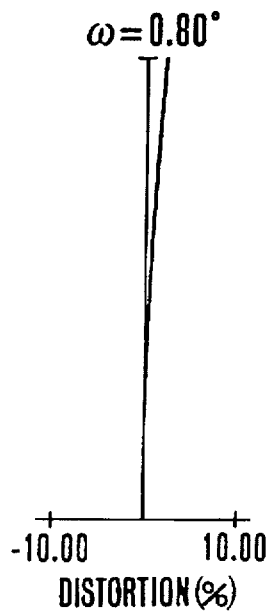
F I G.48A  F I G.48B  F I G.48C
f = 396.0
OBJECT DISTANCE: 2.0 m
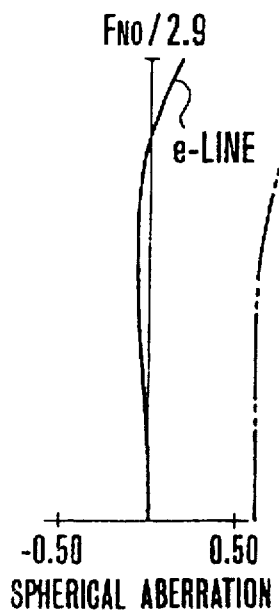 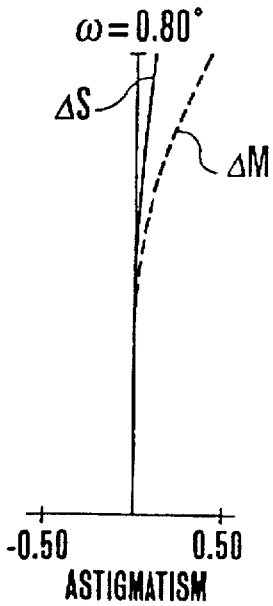 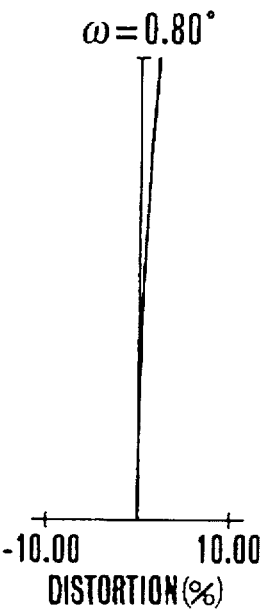
F I G.49A  F I G.49B  F I G.49C FIG.50
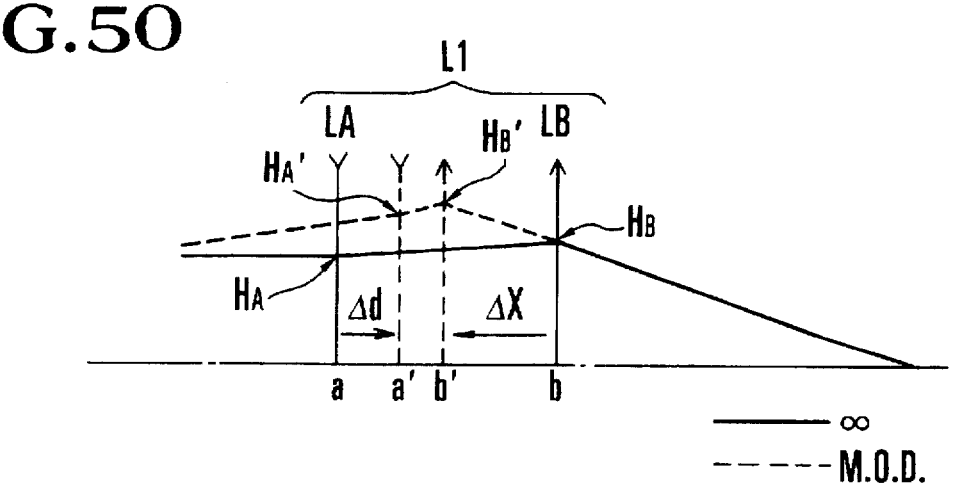
FIG.51(A) AT ∞
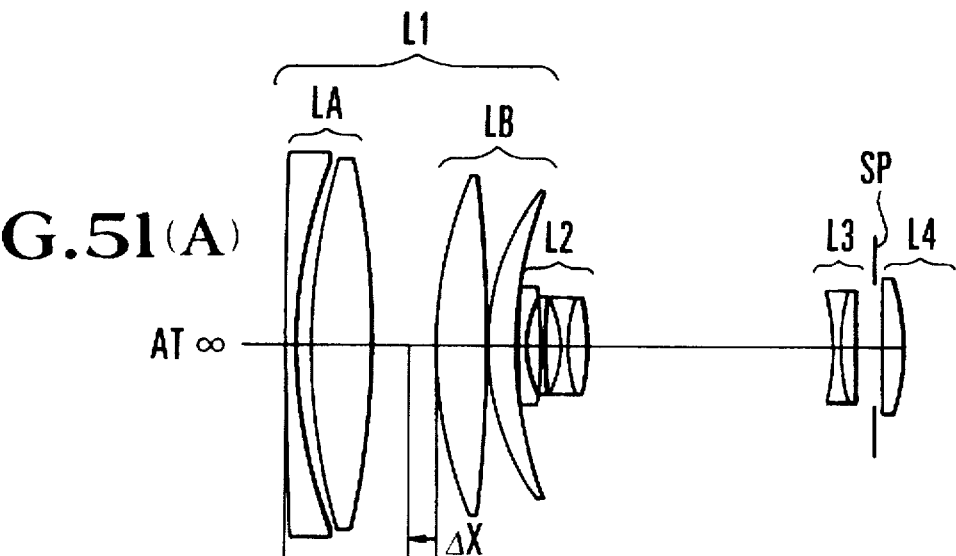
FIG.51(B) AT M.O.D.
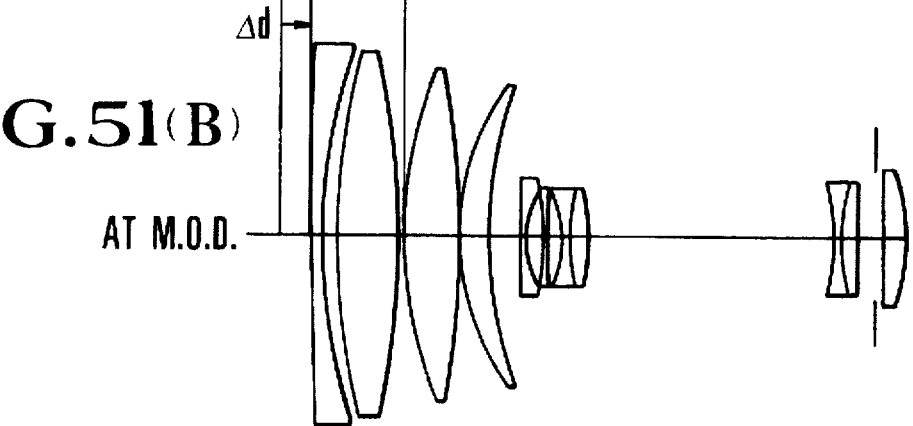

ZOOM LENS

BACKGROUND OF THE INVENTION

Field of the Invention

This invention relates to zoom lenses suited to television cameras, video cameras or photographic cameras and, more particularly, to zoom lenses which perform focusing by using part of the first lens unit or lens subunits, or employ the so-called inner focusing method or floating method. Still more particularly, it relates to large relative aperture, high range zoom lenses having an F-number of 1.7 at the shortest focal length and zoom ratios of 13 to 44 with a short minimum object distance.

Description of the Related Art

The trend of development of compact television cameras has led to a growing demand for zoom lenses of which the lens system is entirely decreased in size, while nonetheless getting a large relative aperture and a high range of variation of the focal length.

Of the types of zoom lenses, there is the one in which focusing is done by a lens unit that has its position on the object side of the varifocal lens units. The use of such a type allows zooming (variation of the focal length) and focusing to carry out independently of each other. Therefore, this type has merits that the operating mechanism can be simplified in structure, that no shift of the image plane with zooming does not take place and that for a given value of the object distance, focusing can be done by a constant movement which does not depend on the zooming position.

It is known to provide a zoom lens of such a type described above, comprising, from front to rear, a first lens unit of positive refractive power for focusing (focusing lens unit), a second lens unit of negative refractive power for varying the focal length (variator lens unit), a third lens unit of positive or negative refractive power for compensating for the image shift with zooming (compensator lens unit), an aperture stop and a fourth lens unit of positive refractive power for forming a real image (relay lens unit), totaling four lens units, or so-called 4-unit zoom lens, wherein a lens sub-unit constituting part of the first lens unit is made movable for focusing, or the so-called inner focusing method is employed, as, for example, proposed in Japanese Patent Publication No. Sho 59-4686.

In the same publication, the first lens unit is constructed with a first lens sub-unit of negative refractive power, a second lens sub-unit of positive refractive power and a third lens sub-unit of positive refractive power, totaling three lens sub-units, wherein as focusing goes from an infinitely distant object to an object at the minimum distance, the second lens sub-unit is made to move toward the image side. Being relevant to this, there is U.S. patent application Ser. No. 196,459 filed on Feb. 15, 1994.

Japanese Laid-Open Patent Applications Nos. Sho 52-109952, Sho 55-57815 and Sho 55-117119 and Japanese Patent Publications Nos. Sho 61-53696 and Sho 52-41068 also show 4-unit zoom lenses of which the first lens unit is divided into a plurality of lens sub-units, whereby the frontmost lens sub-unit is made stationary during focusing, and one of the other lens sub-units is made movable for focusing, when the inner focusing method is embodied.

Also, in Japanese Laid-Open Patent Application No. Sho 52-128153, the first lens unit is divided into two lens sub-units which move in such relation that their separation increases as focusing goes from an infinitely distant object to a finitely distant object.

In general, the zoom lens of the inner focus type has merits that the first lens unit gets a smaller effective diameter than that in the zoom lens of which focusing is performed by moving the first lens unit as a whole, thus making it easier to minimize the bulk and size of the entire lens system, that close-up photography, particularly super short focusing, becomes easier to carry out, and further that since the focusing lens unit is relatively small in size and light in weight, because the required power for driving the lens unit is weak, quick focus adjustment can be done.

With the zoom lens, when to simultaneously fulfill the requirements of having a large relative aperture (of, for example, 1.7 to 3.3 in F-number) and a high range (of, for example, 13 to 44 in zoom ratio) and of obtaining a high optical performance throughout the entire zooming range and throughout the entire focusing range, there is need to set forth appropriate rules of design for the refractive powers of all the lens units, the construction and arrangement of the constituent lenses in each lens unit and the achromatism shares of the lens units.

To maintain good stability of aberration correction throughout the entire zooming range and throughout the entire focusing range for the high optical performance, it becomes necessary in the general case either that the power of each lens unit is decreased to reduce the amount of aberrations each lens unit produces, or that the number of lens elements in each lens unit is increased to increase the degree of freedom on aberration correction. For this reason, a large relative aperture, high range zoom lens cannot be achieved at any rate without encountering a problem that the entire lens system becomes heavier and bulkier and longer, as the air separations between the lens units widen, or the number of lens elements increases.

Also, in the recent state of art of zoom lenses for broadcasting, it is desired to make ever wider the maximum angle of field and ever higher the zooming range. Further, the improved performance for short object distances and the shortened M.O.D. (for Minimum Object Distance) are becoming one of the important factors on the specification and the picture effect.

In the prior known zoom lenses for broadcasting, however, when focusing, all aberrations, particularly spherical aberration, longitudinal chromatic aberration and astigmatism, vary to prominent extent. So, it has been very difficult to maintain good stability of optical performance at the high level. In the general case, the longer the focal length and the smaller the F-number or the larger the relative aperture and the shorter the M.O.D., the wider the range of such variation of all aberrations tends to become.

With regard to the focusing method described before, the zoom lenses of Japanese Laid-Open Patent Applications Nos. Sho 52-109952, Sho 55-57815 and Sho 55-117119 have their first lens units, because of aberration correction, made up from a great number of constituent lenses. Thus, the entire lens system is caused to increase in size and its structure of construction to increase in complexity and its weight also to become heavy.

Though, in Japanese Patent Publication No. Sho 61-53696, the zoom lens has its first lens unit-made relatively simple in structure, but the air separation for infinite focusing between the first lens unit and the variator lens unit is widely open. Further, as the object distance shortens, the focusing lens unit, which is of negative refractive power, moves toward the image plane. Because of this, it is on the first lens unit that the height of incidence of the off-axial light ray becomes very high when zooming to the wide-angle end. Thus, the lens system is caused to get a large bulk and size.

The focusing method of moving the first lens unit as a whole is suitable for minimizing the size of the zoom lens, because the first lens unit can form in relatively simple structure. But, a wider range of variation of, in particular, spherical aberration and longitudinal chromatic aberration with focusing results. For example, as focusing is effected down, the spherical aberration inclines to under-correction, and the longitudinal chromatic aberration, too, inclines to under-correction.

The mechanism of such variation of aberrations is explained below.

FIG. 18 is a diagram to explain the first lens unit as a thin lens paraxial system comprising a front lens sub-unit L11 of negative refractive power and a rear lens sub-unit L12 of positive refractive power. FIGS. 19(A) and 19(B) are longitudinal section views of a typical example of the first lens unit L1 in the 4-unit zoom lens.

In FIG. 18, the solid vertical lines indicate the axial positions of the front and rear lens sub-units when focused on an infinitely distant object, while the dashed vertical lines indicate another axial positions of them when focused on an object at the M.O.D. For the infinite focusing, as shown by the solid line curve, a paraxial ray of light travels past the front lens sub-unit L11 and the rear lens sub-units L12 at heights ha and hb of incidence, respectively, and the angle of inclination between the front lens sub-unit and the rear lens sub-unit is denoted by $\alpha$. For the focusing to the M.O.D., as shown by a dashed line curve, the paraxial ray of light is incident on the front lens sub-unit and the rear lens subunits at heights ha' and hb', respectively, and the angle of inclination between the front lens sub-unit and the rear lens sub-unit is denoted by $\alpha'$. Since $\alpha'<\alpha$, the following relation is obtained:

$$hb-ha<hb'-ha'$$

Here, according to the 3rd order aberration theory, the longitudinal chromatic aberration has its coefficient L of 3rd order being proportional to the square of the height, h, of incidence of the paraxial ray, and the spherical aberration has its coefficient I of 3rd order being proportional to the fourth power of the height, h, of incidence of the paraxial ray. The use of this focusing method results in that the coefficient L is larger in the plus direction when the object is at infinity than when at the M.O.D. Hence, the longitudinal chromatic aberration changes to under-corrected one. The coefficient I, too, increases to the plus direction. Hence, the spherical aberration changes also to under-corrected one.

In the zoom lens of Japanese Patent Publication No. Sho 52-41068, as shown in FIGS. 21(A) and 21(B), the first lens unit Li is divided into two parts, of which the part on the object side, or front lens sub-unit L11, is given almost no power or a weak negative refractive power and made stationary during focusing. The part on the image side, or rear lens sub-unit L12 of positive refractive power is made movable for focusing.

This is shown as a thin lens or paraxial system in FIG. 20. Concerning the rear lens sub-unit alone, its movement is depicted in FIG. 20.

The solid line curve indicates a paraxial ray of light when focused on an infinitely distant object. At this time, it is incident on the front lens sub-unit L11 and the rear lens sub-unit L12 at heights hf and hm, respectively. When at the M.O.D., the paraxial ray shown by the dashed line curve is incident on the front lens sub-unit and the rear lens sub-unit at heights hf' and hm', respectively. As compared with FIG. 18 (the focusing method of entirely moving the first lens unit), $$hb-ha<hm-hf$$
$$hb'-ha'=hm'-hf'$$

are then obtained.

According to the zoom lens of the same publication, it is, therefore, made possible that the varied amounts of the spherical aberration coefficient I of 3rd order and of the longitudinal chromatic aberration coefficient L of 3rd order with focusing from infinity to the M.O.D. get smaller than when the focusing method of moving the first lens unit as a whole is used instead. Therefore, the range of variation of spherical aberration and longitudinal chromatic aberration with focusing can be improved over the focusing method of moving the first lens unit as a whole. However, this range is still not as much narrow as is satisfactory. So, further improvements are desired to make.

In the zoom lens of Japanese Laid-Open Patent Application No. Sho 52-128153, the first lens unit is divided into two lens sub-units, both of which are made movable for focusing, wherein the axial separation between these two lens sub-units is made to increase, as focusing is effected down to shorter object distances. Thus, the performance in the marginal zone is chiefly improved. However, for the near focusing, even the spherical aberration inclines to under-correction. So, the performance in the paraxial zone is conversely worsened.

SUMMARY OF THE INVENTION

A first object of the invention is to provide a zoom lens which employs the floating or inner focusing method of axially moving lens sub-units constituting part of a first lens unit thereof equivalent to the focusing lens unit of the 4-unit zoom lens.

When to achieve great increases of the relative aperture and the range of variation of the focal length, proper rules of design for the construction and arrangement of the constituent parts of each of the lens units are set forth.

Another object is, therefore, to provide a zoom lens which is corrected for a narrowed range of variation of spherical aberration, chromatic aberrations and others with zooming and focusing.

Still another object is to provide a large relative aperture and high range zoom lens having an F-number of about 1.7 at the wide-angle end and a range of about 13 to 44, while still maintaining good stability of optical performance at a high level throughout the entire zooming range and throughout the entire focusing range.

According to the invention, in an embodiment thereof, a zoom lens comprises, from front to rear, a first lens unit of positive refractive power and a plurality of lens units movable for zooming, wherein the first lens unit has a front lens sub-unit of negative refractive power, a first lens sub-unit of positive refractive power and a second lens sub-unit of positive refractive power, whereby when focusing to suit from an infinitely distant object to a near object, the first and second lens sub-units are made to axially move forward at different speeds from each other.

In another embodiment of the invention, a zoom lens comprises, in order from the object side, a front lens unit having a positive refractive power, the front lens unit having a front lens sub-unit of negative refractive power and a rear lens sub-unit of positive refractive power, and a plurality of lens units movable for zooming, wherein the front and rear lens sub-units axially move at different speeds from each other for focusing purposes.

Other features characteristic of the invention are to satisfy the following conditions:

$$MB2/MB1<1 \quad (1)$$

where MB1 and MB2 are the total focusing movements of the first and second lens sub-units, respectively, and $$1.05<FN1 \quad (2)$$

wherein $$FN1=(1/\phi1)/((1/\phi T)/FNT)$$

where $\phi T$ and FNT are the refractive power and F-number of the entire system in the telephoto end, respectively, and $\phi 1$ and FN1 are the refractive power and F-number of the first lens unit, respectively.

BRIEF DESCRIPTION OF THE DRAWINGS

FIGS. 7A, 7B, and 7C are graphic representations of the aberrations of the numerical example 1 of the invention in the telephoto end when the object distance is 0.9 meters.

FIGS. 8A, 8B, and 8C are graphic representations of the aberrations of the numerical example 2 of the invention in the telephoto end when the object distance is infinite.

FIGS. 11A, 11B, and 11C are graphic representations of the aberrations of the numerical example 3 of the invention in the telephoto end when the object distance is infinite.

FIGS. 12A, 12B, and 12C are graphic representations of the aberrations of the numerical example 3 of the invention in the telephoto end when the object distance is 10 meters.

FIG. 17 is a diagram to explain the paraxial refractive power arrangement of the first lens unit of the zoom lens of the invention.

FIGS. 26A, 26B, and 26C are graphic representations of the aberrations of the numerical example 5 of the invention when the focal length is 9.5 mm and the object distance is 3 m.

FIGS. 27A, 27B, and 27C are graphic representations of the aberrations of the numerical example 5 of the invention when the focal length is 30.04 mm and the object distance is 3 m.

FIGS. 28A, 28B, and 28C are graphic representations of the aberrations of the numerical example 5 of the invention when the focal length is 133 mm and the object distance is infinite.

FIGS. 29A, 29B, and 29C are graphic representations of the aberrations of the numerical example 5 of the invention when the focal length is 133 mm and the object distance is 3 m.

FIGS. 30A, 30B, and 30C are graphic representations of the aberrations of the numerical example 5 of the invention when the focal length is 133 mm and the object distance is 1.3 m.

FIGS. 31A, 31B, and 31C are graphic representations of the aberrations of the numerical example 5 of the invention when the focal length is 133 mm and the object distance is 0.9 m.

FIGS. 32A, 32B, and 32C are graphic representations of the aberrations of the numerical example 6 of the invention when the focal length is 9 mm and the object distance is 3 m.

FIGS. 33A, 33B, and 33C are graphic representations of the aberrations of the numerical example 6 of the invention when the focal length is 28.46 mm and the object distance is 3 m.

FIGS. 34A, 34B, and 34C are is graphic representations of the aberrations of the numerical example 6 of the invention when the focal length is 126 mm and the object distance is 3 infinite.

FIGS. 35A, 35B, and 35C are is graphic representations of the aberrations of the numerical example 6 of the invention when the focal length is 126 mm and the object distance is 3 m.

FIGS. 36A, 36B, and 36C are graphic representations of the aberrations of the numerical example 6 of the invention when the focal length is 126 mm and the object distance is 1.3 m.

FIGS. 37A, 37B, and 37C are graphic representations of the aberrations of the numerical example 7 of the invention when the focal length is 126 mm and the object distance is 0.8 m.

FIGS. 40A, 40B, and 40C are graphic representations of the aberrations of the numerical example 7 of the invention when the focal length is 440 mm and the object distance is infinite.

FIGS. 41A, 41B, and 41C are graphic representations of the aberrations of the numerical example 7 of the invention when the focal length is 440 mm and the object distance is 10 m.

FIGS. 48A, 48B, and 48C are graphic representations of the aberrations of the numerical example 8 of the invention when the focal length is 396 mm and the object distance is 3 m.

FIGS. 49A, 49B, and 49C are graphic representations of the aberrations of the numerical example 8 of the invention when the focal length is 396 mm and the object distance is 2 m.

FIG. 50 is a diagram of geometry to explain the paraxial refractive power arrangements of the first lens unit of another embodiment of a zoom lens according to the invention.

FIGS. 51(A) and 51(B) are diagrams to explain the focusing movements of the two lens sub-units in the first lens unit of the zoom lens of the embodiment of the invention shown in FIG. 50.

Figure 1:
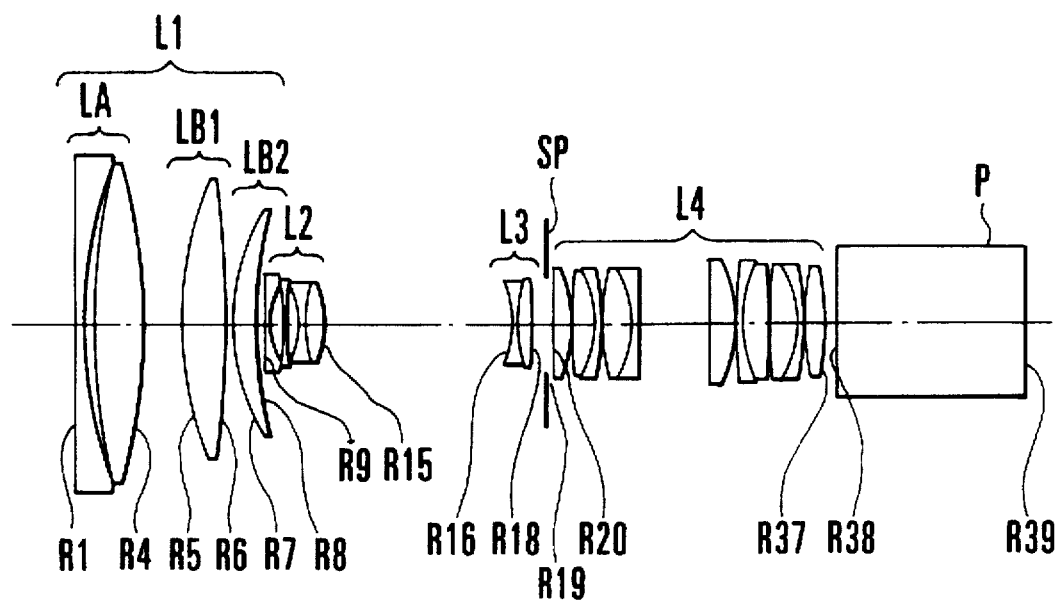
FIG. 1 is a lens block diagram of a numerical example 1 of the invention in the wide angle-end.

In these drawings, P represents the glass block, e stands for the spectral e-line, g for the spectral g-line, S for the sagittal image focus, and M for the meridional image focus.

DETAILED DESCRIPTION OF THE PREFERRED EMBODIMENTS

FIG. 1, FIG. 2, FIG. 3 and FIG. 4 are longitudinal section views of numerical examples 1, 2, 3 and 4 of zoom lenses of the invention, respectively, in the wide-angle end. FIG. 17 is a diagram of geometry to explain the variation of the paraxial refractive power arrangement of the first lens unit of the zoom lens of the invention.

In these drawings, reference character L1 denotes the first lens unit or the focusing lens unit of positive refractive power (or front lens unit) comprising a fixed front lens sub-unit LA of negative refractive power, a first lens sub-unit LB1 of positive refractive power movable for focusing and a second lens sub-unit LB2 of positive refractive power movable for focusing.

Focusing from an infinitely distant object to an object at the minimum distance is performed by moving the first lens sub-unit LB1 and the second lens sub-unit LB2 toward the object side independently of each other by different distances from each other. Reference character L2 denotes the second lens unit for varying the focal length or variator of negative refractive power. When zooming from the wide-angle end to the telephoto end, it moves axially toward the image side monotonously (monotonically).

The range of variation of the image magnification of the second lens unit L2 is made to contain unity (−1x).

Reference character L3 denotes the third lens unit or compensator of positive or negative refractive power. It compensates for the shift of an image plane with zooming. In the case of the negative refractive power, it moves while depicting a locus convex toward the object side. In the case of the positive refractive power, it moves toward the object side monotonously. SP stands for the stop. Reference character L4 denotes the fourth lens unit or relay lens unit of positive refractive power followed by a color separation prism and optical filters shown as a glass block P.

In general, the 4-unit zoom lenses employing the focusing method of moving the frontmost or first lens unit as a whole, or the so-called front focusing method, have the feature that for the same object distance, the distance the first lens unit moves forward from the position for infinite focusing remains constant at any value of the focal length, thus giving an advantage that the structure of construction of the operating mechanism becomes simple.

However, the refractive power of the first lens unit is positive. With a zoom lens whose maximum angle of field is wide, when focusing is effected down to shorter object distances at the wide-angle end, therefore, the first lens unit has to move toward the object side. To admit the off-axial light beam, the first lens unit gets a large effective diameter. Also, the first lens unit becomes relatively heavy. If the driving torque is not sufficiently strong, it is difficult to carry out quick focus adjustment.

For these reasons, it is in the invention that, for the zoom lens of the character described before, the inner focusing method is used in combination with the floating technique that moves the first lens sub-unit LB1 and the second lens sub-unit LB2 axially forward at different speeds from each other, when focusing is effected down to suit from an infinitely distant object to an object at the minimum distance. Thus, the weight of the parts movable for focusing is reduced in such a manner that good optical performance is obtained.

In more detail, according to the invention, as the object distance varies, focusing movement is imparted into a lens unit having therein a number of air spaces, whereby a certain arbitrary one of these spaces is made to expand or shrink. By utilizing such a floating technique, the variations of the angle and height at which the rays of light pass are controlled to well correct the variation of aberrations.

In particular, letting the total focusing movements of the first and second lens sub-units during focusing from an infinitely distance object to an object at the minimum object distance be denoted by MB1 and MB2, respectively, the refractive power and F-number of the entire system in the telephoto end by $\phi T$ and FNT, respectively, and the refractive power and F-number of the first lens unit by $\phi 1$ and FN1, respectively, the values of these parameters are determined so as to satisfy the before-described conditions (1) and (2). Thus, good stability of aberration correction is maintained throughout the entire focusing range. Hence, a high optical performance is obtained.

Next, the focusing function of the zoom lens of the invention by using the first lens sub-unit LB1 and the second lens sub-unit LB2 in the first lens unit L1 is optically analyzed by reference to FIG. 17.

The first lens unit L1 comprises, in order from the object side, a front lens sub-unit LA stationary during focusing, a first lens sub-unit LB1 movable for focusing and a second lens sub-unit LB2 movable for focusing. When focused on an infinitely distant object, the first lens sub-unit LB1 and the second lens subunit LB2 take axial positions b1 and b2, respectively, with the axial air separation, t, therebetween, and a paraxial ray of light shown by the solid line travels past the front lens sub-unit, the first lens sub-unit and the second lens sub-unit at heights Ha, Hb1 and Hb2, respectively. Meanwhile, when focused on an object at a finite distance, the first lens sub-unit and the second lens sub-unit are axially moved to respective positions b1' and b2' with the axial air separation, T, (t<T) therebetween, and the paraxial ray of light travels past the front lens sub-unit, the first lens sub-unit and the second lens sub-unit at heights Ha', Hb1' and Hb2', respectively.

Suppose that for the same finite distance, the first lens sub-unit and the second lens sub-unit are positioned in the same spaced relationship when the object distance is infinite, in other words, the air separation t is kept to be the same (t=T), then, their axial positions for the near focusing have to change. For the first lens sub-unit LB1, the position b1' must shift to the image side till a position b1". For the second lens sub-unit LB2, the position b2' must shift to the object side till a position b2". Now, the heights of incidence of the paraxial ray at these shifted positions are denoted by Ha", Hb1" and Hb2", respectively.

In the invention, as focusing is effected down, the first lens sub-unit and the second lens sub-unit are spaced apart by increasing separations, thereby decreasing the difference between the distance (Hb1-Ha) and, for example, the distance (Hb1'-Ha') for the finite object distance. Thus, at first, the variation of spherical aberration and longitudinal chromatic aberration is decreased to some extent.

Next, for the situations of t<T and t=T, on attention to the change of the heights of incidence of the paraxial ray on the first lens sub-unit and the second lens sub-unit, the following relations are obtained:

Hb1'>Hb1"

Hb2'<Hb2"

Therefore, as described before, the aberration coefficients of 3rd order for spherical aberration and longitudinal chromatic aberration change, as the first lens sub-unit and the second lens sub-unit produce different functions in the situation when t<T than in the situation when t=T as follows:

(i) The first lens sub-unit: The spherical aberration coefficient I of 3rd order changes to the plus direction and the longitudinal chromatic aberration coefficient L of 3rd order, too, changes to the plus direction. Hence, the spherical aberration changes to under-correct and the longitudinal chromatic aberration changes also to under-correct.

(ii) The second lens sub-unit: The spherical aberration coefficient I of 3rd order changes to the minus direction and the longitudinal chromatic aberration coefficient L of 3rd order, too, changes to the minus direction. Hence, the spherical aberration changes to over-correct and the longitudinal chromatic aberration changes also to over-correct.

In the invention, by skillfully utilizing the changes of the aberrations owing to the movements of the first lens sub-unit and the second lens sub-unit, the range of variation of the aberrations with focusing is made narrower.

At the M.O.D. or object distances near to it, the first lens sub-unit moves toward the object side. Therefore, the separation between the front lens sub-unit and the first lens sub-unit is narrowed. Thus, the difference between the height Hb1' and the height Ha', or Hb1'-Ha', in a situation when t<T becomes almost equal to the difference between the height Hb1" and the height Ha", or Hb1"-Ha" in another situation when t=T. Hence, the following relation is obtained:

Hb1'-Ha'=Hb1"-Ha"

Accordingly, the total sums of the spherical aberrations and the longitudinal chromatic aberrations the front lens sub-unit and the first lens sub-unit produce are also almost equal to each other. However, in the situation of t<T, the above-described function (ii) takes effect, thereby making it possible to reduce the amount of aberrations the second lens sub-unit produces. Thus, for the M.O.D. and near object distances, the under-corrected spherical aberration and the under-corrected longitudinal chromatic aberration are corrected.

Meanwhile, as the object distance is around infinity, the amount of forward focusing movement of the first lens sub-unit is small. For the object distances where the separation between the front lens sub-unit and the first lens sub-unit is relatively large, the above-described functions (i) and (ii) are possible to utilize at once in correcting aberrations. For example, as focusing goes from an infinitely distant object to a finitely distant object, the variation of aberrations results in over-correction of spherical aberration and in under-correction of longitudinal chromatic aberration. In such a case, the different effects of the above-described functions (i) and (ii) on spherical aberration and longitudinal chromatic aberration can be utilized so that the spherical aberration is corrected to the under side and the longitudinal chromatic aberration is corrected to the over side.

According to the invention, the relationship in which the first lens sub-unit and the second lens sub-unit move to vary their relative positions to each-other as the object distance varies is made to change when focusing. By this, mainly spherical aberration and longitudinal chromatic aberration are corrected well against variation. Along with this, the ways in which the first lens sub-unit and the second lens sub-unit move axially toward the object side as focusing is effected down from an infinitely distant object to an object at the M.O.D. are made to be monotonous throughout the entire focusing range under the condition (1). Thus, the requirements of preventing the physical length of the first lens unit from increasing and of suppressing the complexity of structure of the moving mechanism to a minimum can be fulfilled at once.

MB2/MB1<1 corresponds to the above-described situation when t<T. MB2/MB1=1 corresponds to the situation when t=T. For a case of MB2/MB1>1, the second lens sub-unit moves faster than the first lens sub-unit. To allow this to occur, a necessity arises to make surplus room in the separation between the first lens sub-unit and the second lens sub-unit when they are set to the infinite focusing. Therefore, the physical length and diameter of the first lens unit are caused to increase largely.

Yet another feature of the invention is that as fast a lens system as to satisfy the condition (2) is used in the first lens unit. Hence, despite the zoom lens having a range of from 13 to about 44 in zoom ratio, a great increase of the relative aperture is realized throughout the entire zooming range.

The above-described features of the invention suffice for obtaining a high optical performance. To achieve further improvements of the aberration correction for high optical performance throughout the entire focusing range and throughout the zooming range, additional features or conditions must be set forth.

The aforesaid front lens sub-unit has a negative lens and a positive lens, totaling two independent lenses. In here, the refractive power of the front lens sub-unit is denoted by $\phi A$, the refractive power and Abbe number of the material of the i-th lens in the front lens sub-unit are denoted by $\phi Ai$ and $vAi$, respectively, and the total sum of the ratios: $\phi Ai/vAi$ is denoted by $\Sigma A$.

The aforesaid first lens sub-unit includes at least one positive lens. In here, the refractive power of the first lens sub-unit is denoted by $\phi B1$, the refractive power and Abbe number of the material of the i-th lens in the first lens sub-unit are denoted by $\phi B1,i$ and $vB1,i$, respectively, and the total sum of the ratios: $\phi B1,i/vB1,i$ is denoted by $\Sigma B1$.

The aforesaid second lens sub-unit includes a first positive lens of meniscus form convex toward the object side. In here, the refractive power of the second lens sub-unit is denoted by $\phi B2$, the refractive power and Abbe number of the material of the first positive lens by $\phi B2,1$ and $vB2,1$ respectively, and the ratio: $\phi B2,1/vB2,1$ is denoted by $\Sigma B2$.

It is recommended that the parameters described or defined above satisfy the following conditions:

$$0.30 < \phi A/\phi 1 < -0.0095 \quad (3)$$

$$0.02 < \Sigma A/\phi 1 < -0.009 \quad (4)$$

$$1.22 < \Sigma A/(\Sigma B1 + \Sigma B2) < -0.77 \quad (5)$$

$$0.23 < \phi B2/\phi B1 < 0.95 \quad (6)$$

$$0.23 < \Sigma \phi B2/\Sigma \phi B1 < 1.40 \quad (7)$$

In the zoom lens of the invention, the axial beam passing through the first lens unit is highest in the telephoto end. Moreover, the aberrations produced from the first lens unit are enlarged by the magnifying powers of the second lens unit and those that follow. For the telephoto end, therefore, the spherical aberration and longitudinal chromatic aberration in the image plane depend largely on the produced amount of aberrations from the first lens unit. Particularly for the zoom lenses for broadcasting, there has been a growing demand for high specs and high performance. The necessity then arises to achieve great increases of the longest focal length and of the aperture ratio. Hence, the height of the marginal ray of the axial light beam increases extremely.

Therefore, the difficulty of maintaining good correction of spherical aberration, chromatic aberrations and other various aberrations against zooming and focusing is caused to increase largely. If this is coped with the routine design work by weakening the power of each lens unit and increasing the number of lens elements in each lens unit, the entire lens system will increase in size and the weight and production cost will rise.

So, the first lens unit is taken into account. Thus, the front lens sub-unit is made to be constructed with at least two lenses separated from each other by a relatively small air space, one of which has a negative refracting surface and is negative in refractive power, and the other of which is positive. By providing for the front lens unit with this air space, the degree of freedom of design is increased with an advantage of reducing the variation of aberrations. Thus, all aberrations are made easy to control in good balance. Further, the rear principal point of the first lens unit is pulled forward to thereby assure reduction of the size of the entire lens system.

The focusing first lens sub-unit and the focusing second lens sub-unit each are so constructed as to include at least one positive lens. Thus, the produced amount of aberrations is minimized and, at the same time, the residual of aberrations of the front lens sub-unit is canceled out. Particularly in the second lens sub-unit, the positive lens is formed to the meniscus shape convex toward the object side, thus minimizing the produced amount of spherical aberration in itself. At the same time, distortion and astigmatism, too, are corrected well. Incidentally, it is preferred that either the first lens sub-unit or the second lens sub-unit is provided with a negative lens, because aberrations become easier to correct.

The technical significance of each of the above-described conditions (3) to (7) is explained below.

The inequalities of condition (3) put limitations on the power of the front lens sub-unit that occupies part of the first lens unit. When the lower limit of the condition (3) is exceeded, as this means that the power is too strong, aberrations such as spherical aberration and coma of higher order are liable to arise. To correct the residual of these higher order aberrations, the movable lens sub-units, too, have their powers made to increase largely. So, the radii of curvature of their lens surfaces must be decreased. As a result, it becomes difficult to correct the variation of aberrations with zooming and focusing. When the upper limit is exceeded, as this means that it approaches almost no power, there results a small difference between the heights of the axial light beam on the front lens sub-unit and the first lens sub-unit when focused on an infinitely distant object. This makes it more difficult to well correct the variation of spherical aberration and longitudinal chromatic aberration with focusing.

The factor in the condition (4) represents the normalization of the achromatic condition by the power of the first lens unit. As the first lens unit is divided into one fixed or the front lens sub-unit and two movable lens sub-units for focusing, namely, the first lens subunit and the second lens sub-unit, the factor in the condition (5) defines the contributions of these sub-units to the achromatic condition. The conditions (4) and (5) both have a common aim to maintain good stability of longitudinal chromatic aberration throughout the entire focusing range.

To achromatize the first lens unit in itself, it is desirable to establish $\Sigma a \approx \Sigma b1 + \Sigma b2 \approx 0$. However, for the focusing lens sub-units, on consideration of the size of the first lens unit, it would be the common practice that they are constructed from positive lenses alone. The achromatic condition for the focusing lens sub-units would then give always a positive value. To cancel this out, the condition (4) gives a slightly negative value. When the lower limits of the conditions (4) and (5) are exceeded, over-correction results. Thus, longitudinal chromatic aberration remains over-corrected throughout the entire focusing range. When the upper limits are exceeded, conversely, undercorrection results. Thus, longitudinal chromatic aberration is left under-corrected.

The inequalities of conditions (6) and (7) are concerned with the floating and give ranges respectively for the contributions of the first and second lens subunits movable for focusing to the power and achromatism.

When the lower limit of the condition (6) is exceeded, as this means that the power of the second lens sub-unit is relatively weak, the function (ii) described before is lost. So, it becomes difficult to correct well the variation of spherical aberration and longitudinal chromatic aberration with focusing. When the upper limit is exceeded, as this means that the first lens sub-unit in turn is relatively weak in power, the function (i) described before is lost. So, the variation of spherical aberration and longitudinal chromatic aberration with focusing becomes difficult to correct well and the total focusing movement of the first lens unit increases to increase the physical length of the first lens unit or the bulk and size of the entire lens system objectionably.

When the lower limit of the condition (7) is exceeded, the function (i) described before operates to increase the tendency to under-correct longitudinal chromatic aberration and the function (ii) operates to decrease the tendency to over-correct it. Thus, the changed amount of longitudinal chromatic aberration to the under-corrected one increases objectionably. When the upper limit is exceeded, the converse effect results. That is, the changed amount of longitudinal chromatic aberration to the over-corrected one increases objectionably.

It will be appreciated from the foregoing that in the present invention, the first lens unit is divided into one fixed or front lens sub-unit and two movable lens sub-units for focusing. In view of suppressing the variation of aberrations with focusing, such division is determined, the focusing movements are regulated, and rules for the lens arrangement, the power shares and the achromatism shares are set forth. When these features are fulfilled, mainly spherical aberration and longitudinal chromatic aberration are well corrected for good stability.

Next, the form and the construction and arrangement of the constituent lenses of the numerical examples 1 to 4 of zoom lenses of the invention are described by reference to FIGS. 1 to 4.

FIG. 1 is a longitudinal section view of the numerical example 1 of the zoom lens of the invention in the wide-angle end. The aberrations in the telephoto end, when the object distance is infinite, 3.0 meters and 0.9 meters (M.O.D.) are shown in FIGS. 5A–5C, 6A–6C and 7A–7C, respectively.

In the numerical example 1, the zoom ratio is 13. Lens surfaces R1 to R8 form a first lens unit of positive refractive power. Of these, the surfaces R1 to R4 are assigned to the front lens sub-unit of negative refractive power, which is stationary during focusing and zooming. The surfaces R5 and R6 define a first lens subunit of positive refractive power and the surfaces R7 and R8 define a second lens sub-unit of positive refractive power.

Lens surfaces R9 to R15 form a second lens unit of negative refractive power for varying the focal length, which, when zooming from the wide-angle end to the telephoto end, axially moves toward the object side monotonously, while varying its lateral magnification past −1 times midway. Lens surfaces R16 to R18 form a third lens unit for compensating for the image shift with zooming, which axially moves while depicting a locus convex toward the object side as zooming from the wide-angle end to the telephoto end. R19 (SP) indicates the stop. Lens surfaces R20 to R37 form a fourth lens unit having the image forming function. Surfaces R38 and R39 define a glass block P equivalent to the color separation prism, trimming filter or the like.

As an indicator for the effect of increasing the aperture ratio, the F-number of the first lens unit is used as defined by $FN1=(1/\phi1)/((1/\phi T)/FNT)$. In the numerical example 1, $FN1=1.33$. With this, the first lens unit has to be corrected for spherical aberration and longitudinal chromatic aberration in itself. For this purpose, the front lens sub-unit is constructed from one positive and one negative lenses, and the two movable lens sub-units each are constructed with one positive lens. The aberration correction is thus made to share by these lenses.

With regard to the floating of the invention, the relationship between the moved amount MB1 of the first lens sub-unit and the moved amount MB2 of the second lens sub-unit when focused from an infinitely distant object to an object at a certain finite distance is then given by the following expression:

$$MB2=0.60564\ MB1+0.01174\ MB1^2$$

The values of these parameters for the object distances of 3.0 and 0.9 meters are listed in Table-1. In this case, MB2/MB1 takes a maximum value of 0.606 at infinity or thereabouts and a minimum value of 0.455 at the M.O.D.

In the numerical example 1, the rate of variation of the relative movement of the second lens sub-unit to that of the first lens sub-unit is made to decrease as it comes near the M.O.D., permitting the function (ii) described before to be used effectively in correcting the variation of spherical aberration and longitudinal chromatic aberration.

Moreover, in the front lens sub-unit, the positive lens and the negative lens are made from materials whose Abbe numbers differ from each other by as large as about 70. This is advantageous at correcting the chromatic aberrations of the first lens unit in itself. The first lens sub-unit is constructed with one positive lens of large Abbe number and the second lens sub-unit is constructed with one positive lens of high refractive index. This is advantageous at correcting chromatic aberrations and spherical aberration. In addition, to compensate for the degree of freedom for aberration correction, they share the power and achromatism with the boundaries at $\phi B2/\phi B1=0.929$ and $\Sigma B2/\Sigma B1=1.365$.

As can be seen from the aberration curves of FIG. 5A to FIG. 7C, the spherical aberration and longitudinal chromatic aberration are corrected especially well.

Figure 2:
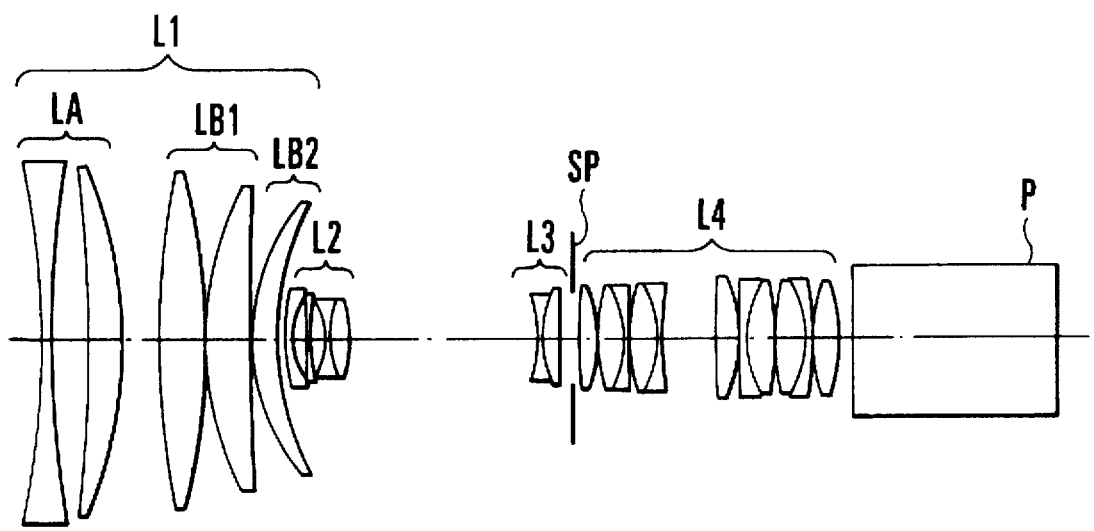
FIG. 2 is a lens block diagram of a numerical example 2 of the invention in the wide angle-end.

FIG. 2 is a longitudinal section view of the numerical example 2 of the zoom lens of the invention in the wide-angle end. The aberrations in the telephoto end, when the object distance is infinite, 3.0 meters and 0.8 meters (M.O.D.) are shown in FIGS. 8A–8C, 9A–9C and 10A–10C, respectively.

In the numerical example 2, the zoom lens, though almost similar in construction to the first numerical example 1, has as high a zoom ratio as 14 and as large a relative aperture as 1.9 in F-number. In addition, the M.O.D. is very shortened to 0.8 meters. The first lens unit itself is made very fast or FN1=1.07. For the purpose of correcting spherical aberration and chromatic aberration, the front lens sub-unit is constructed with one positive and one negative lenses. The first lens sub-unit is constructed with two positive lenses and the second lens sub-unit with one positive lens. So, the aberration correction can be made to share by these lenses.

The floating of the invention is performed in such a manner that, as focusing is effected down from an infinite distant object to an object at a certain finite distance, the moved amount MB1 of the first lens sub-unit and the moved amount MB2 of the second lens sub-unit fall in the following relationship:

$$MB2=0.40263\ MB1-0.02753\ MB1^2$$

The values of these parameters for the object distances of 3.0 and 0.8 meters are listed in Table-2. In this case, MB2/MB1 takes a maximum value of 0.712 at the M.O.D. and a minimum value of 0.403 at infinity or thereabouts.

It is, therefore, in the numerical example 2 that the rate of variation of the relative movement of the second lens sub-unit to that of the first lens sub-unit is made to increase as it comes near the M.O.D. This suppresses that increase of the diameter of the first lens unit to an acceptable range, which results from the fact that the focusing movement of the first lens unit amounts to be to large as it comes to the M.O.D. At the same time, the function (ii) described before is effectively used. Thus, good stability of correction of especially longitudinal chromatic aberration is maintained throughout the focusing range.

Despite such F-number and such M.O.D., the compact form has also to improve. For this purpose, the front lens sub-unit is made to be a strong diverging system with the result that the rear principal point of the first lens unit is pulled forward. To this end, the first lens sub-unit is constructed with two positive lenses and the second lens sub-unit with one positive lens. The degree of freedom for aberration correction is thus increased. In this case, $\phi A/\phi 1 = -0.298$, $\Sigma A/\phi 1 = -0.0184$, and $\Sigma A/(\Sigma B1+\Sigma B2) = -1.214$.

As can be seen from the aberration curves of FIG. 8A to FIG. 10C, not only good correction of longitudinal chromatic aberration results but also good correction of spherical aberration, too, results despite the shortening of the M.O.D. to 0.8 meters.

Figure 3:
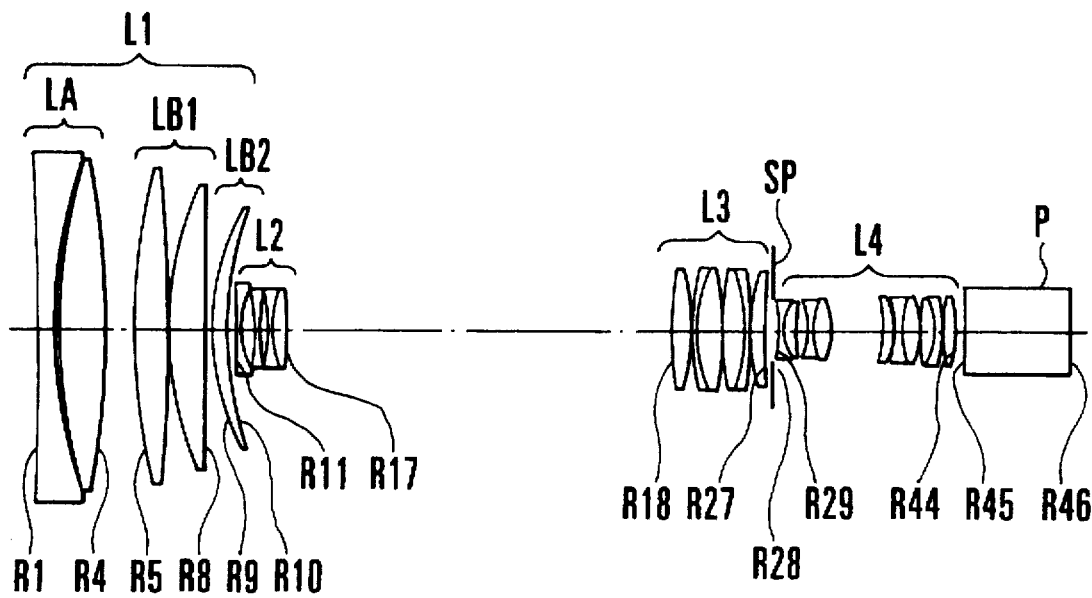
FIG. 3 is a lens block diagram of a numerical example 3 of the invention in the wide angle-end.

FIG. 3 is a longitudinal section view of the numerical example 3 of the zoom lens of the invention in the wide-angle end. The aberrations in the telephoto end when the object distance is infinite, 10.0 meters and 2.0 meters (M.O.D.) are shown in FIGS. 11A–11C, 12A–12C and 13A–13C, respectively.

In this numerical example 3, the zoom ratio is 44. Lens surfaces R1 to R10 form a first lens unit of positive refractive power. Of these, the surfaces R1 to R4 are assigned to the front lens sub-unit of negative refractive power, which is stationary during focusing and zooming. The surfaces R5 to R8 are assigned to the first lens sub-unit of positive refractive power, and the surfaces R9 and R10 to the second lens sub-unit of positive refractive power.

Lens surfaces R11 to R17 form a second lens unit of negative refractive power for varying the focal length, which, when zooming from the wide-angle end to the telephoto end, axially moves toward the image side monotonously while varying its lateral magnification past −1 times midway. Lens surfaces R18 to R27 form a third lens unit of positive refractive power for varying the focal length and compensating for the image shift with zooming, which, when zooming from the wide-angle end to the telephoto end, axially moves toward the object side monotonously, while varying its lateral magnification past −1 times midway. A surface R28 (SP) indicates a stop. Lens surfaces R29 to R44 form a fourth lens unit having the image forming function. Surfaces R45 and R46 define a glass block P equivalent to the color separation prism, a trimming filter or the like.

In this numerical example 3, despite the widening of the angular field as the shortest focal length decreases to 9.0 mm, the zoom ratio is very high, or 44. So, the focal length for the telephoto end amounts to 396.0 mm. With this, the first lens unit has to be corrected for spherical aberration and longitudinal chromatic aberration. To this end, the front lens sub-unit is constructed with one positive and one negative lenses, the first lens sub-unit with two positive lenses and the second lens sub-unit with one positive lens. The aberration correction is thus made to share by these lenses.

Concerning the floating of the invention, as focusing is effected down from an infinitely distant object to an object at a certain finite distance, the moved amount MB1 of the first lens sub-unit and the moved amount MB2 of the second lens sub-unit fall in the relationship given by the following equation:

$$MB2=0.0250\ MB1-0.05181\ MB1^2$$

The values of these parameters for the object distances of 10.0 and 2.0 meters are listed in Table-3. In this case, MB2/MB1 takes a maximum value of 0.995 at the M.O.D. and a minimum value of 0.025 at infinity or thereabouts.

It is, therefore, in the numerical example 3 that the rate of variation of the relative movement of the second lens sub-unit to that of the first lens sub-unit is made to increase as it comes near the M.O.D. In particular, for 10.0 meters, the value of the rate is made small or MB2/MB1=0.271. For the M.O.D. (2.0 meters), its value is made large or MB2/MB1=0.995. The reasons for these are as follows:

(a) On MB2/MB1=0.271 for 10.0 meters: What is characteristic of the long focal length zoom lens is that as focusing is effected down, spherical aberration and longitudinal chromatic aberration vary to over-corrected and under-corrected ones respectively in the region of from infinity to 10.0 meters. So, these are bravely corrected by using both of the functions. (i) and (ii).

(b) On MB2/MB1=0.995 for the M.O.D.: The increase of the diameter of the first lens unit resulting from the widening of the angular field is suppressed within an acceptable range by controlling the movement MB1 of the first lens sub-unit in a region terminating at the M.O.D.

In general, the higher the zoom ratio and the longer the longest focal length, the more difficult the correction of spherical aberration and longitudinal chromatic aberration becomes. So, in the numerical example 3, the first lens unit is constructed with the front lens sub-unit getting one positive and one negative lenses, the first lens sub-unit getting two positive lenses and the second lens sub-unit getting one positive lens, thus using five lenses in total, and all the positive lenses have their Abbe numbers made to be not less than 90. In addition, the first and second lens sub-units are made to share the power and achromatism with the boundaries at $\phi B2/\phi B1=0.239$ and $\Sigma B2/\Sigma B1=0.237$, respectively.

As can be seen from the aberration curves of FIG. 11A to FIG. 13C, good correction of spherical aberration results. Longitudinal chromatic aberration, though somewhat under-corrected at the M.O.D., is well corrected as viewed throughout.

Figure 4:
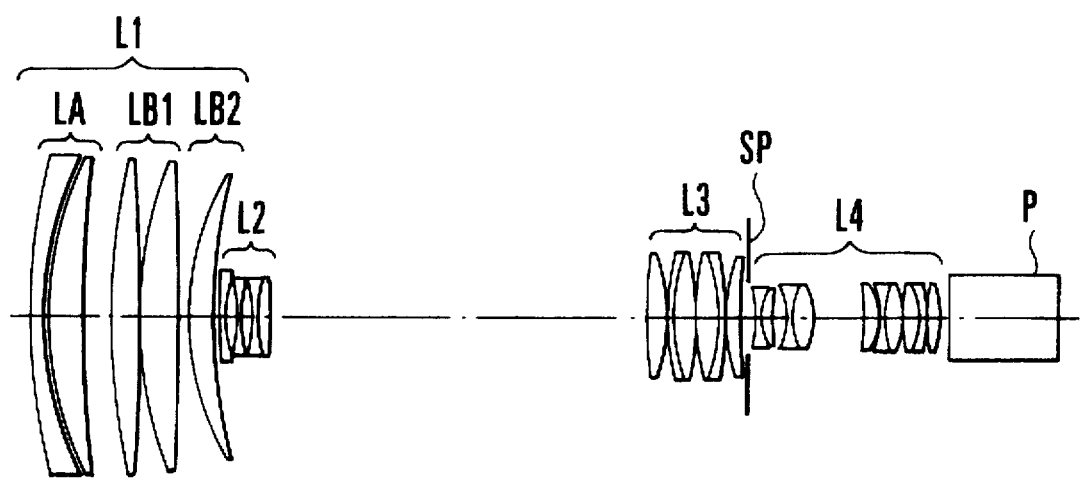
FIG. 4 is a lens block diagram of a numerical example 4 of the invention in the wide angle-end.
Figure 5A:
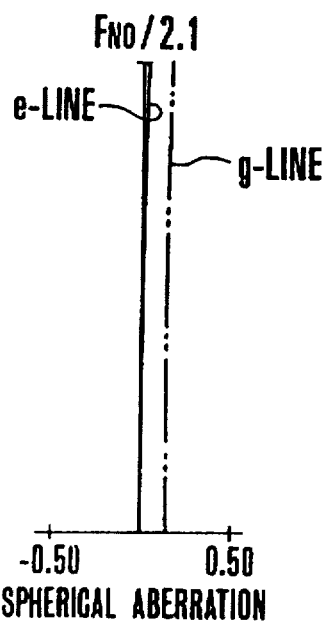
FIGS. 5A, 5B, and 5C are graphic representations of the aberrations of the numerical example 1 of the invention in the telephoto end when the object distance is infinite.
Figure 5B:
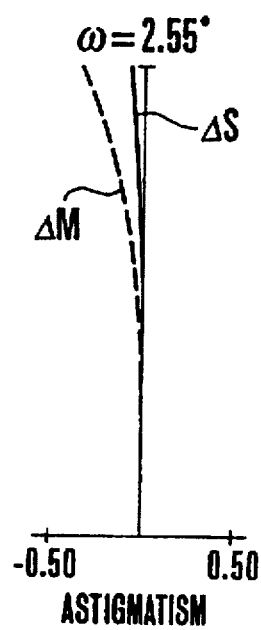
Figure 5C:
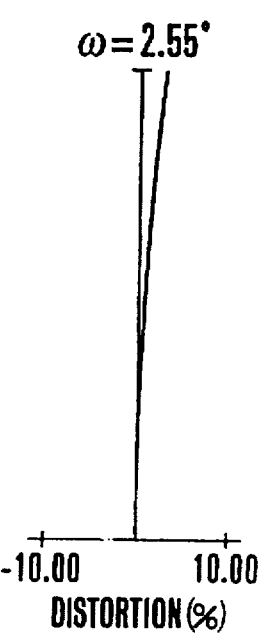
Figure 6A:
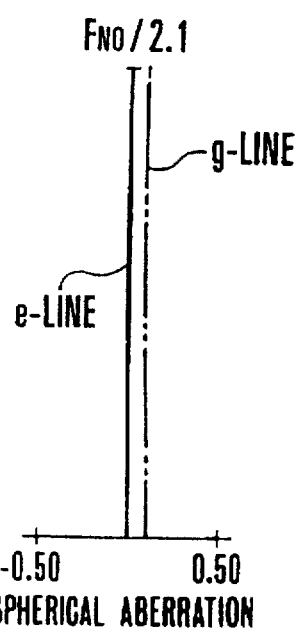
FIGS. 6A, 6B, and 6C are graphic representations of the aberrations of the numerical example 1 of the invention in the telephoto end when the object distance is 3 meters.
Figure 6B:
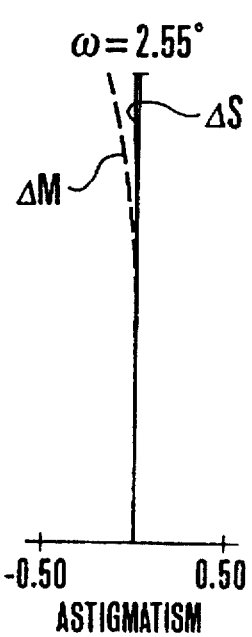
Figure 6C:
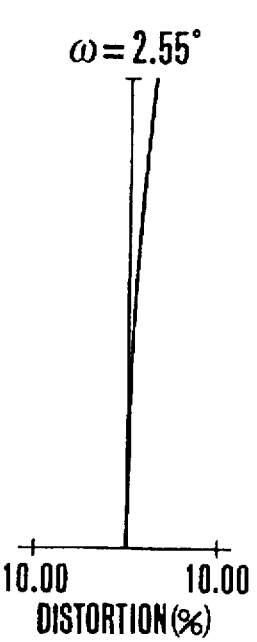
Figure 9A:
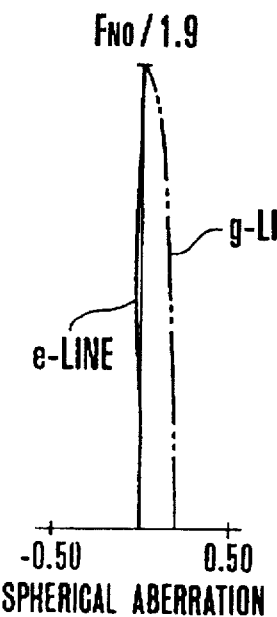
FIGS. 9A, 9B, and 9C are graphic representations of the aberrations of the numerical example 2 of the invention in the telephoto end when the object distance is 3 meters.
Figure 9B:
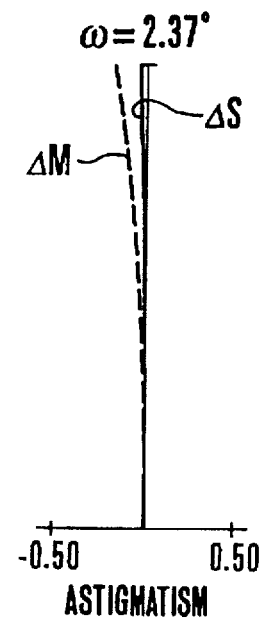
Figure 9C:
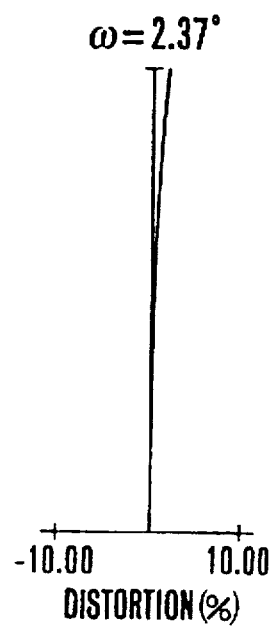
Figure 10A:
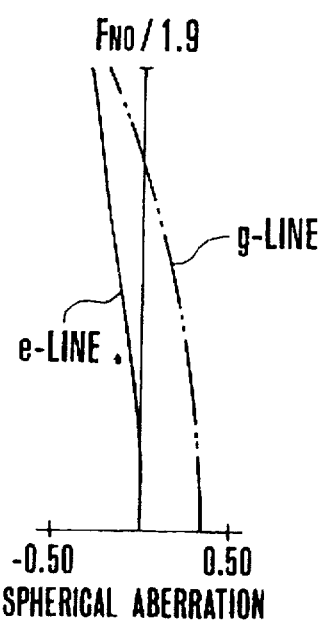
FIGS. 10A, 10B, and 10C are graphic representations of the aberrations of the numerical example 2 of the invention in the telephoto end when the object distance is 0.8 meters.
Figure 10B:
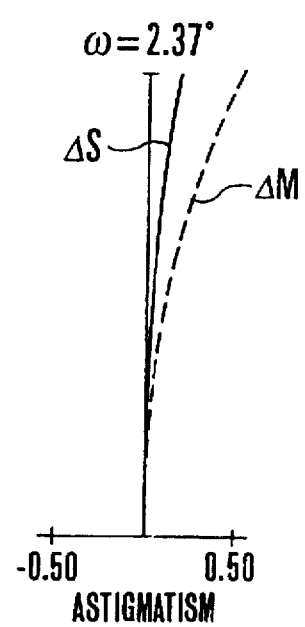
Figure 10C:
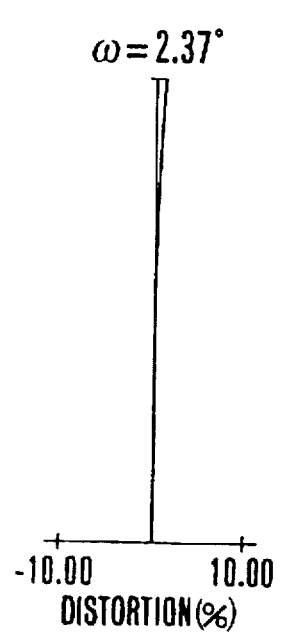
Figure 13A:
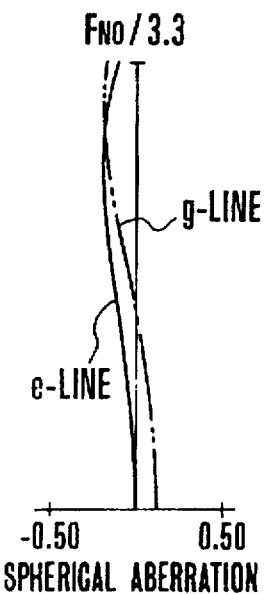
FIGS. 13A, 13B, and 13C are graphic representations of the aberrations of the numerical example 3 of the invention in the telephoto end when the object distance is 2 meters.
Figure 13B:
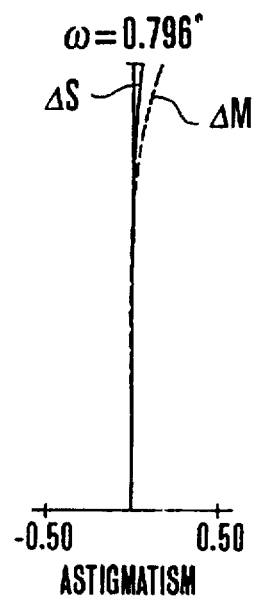
Figure 13C:
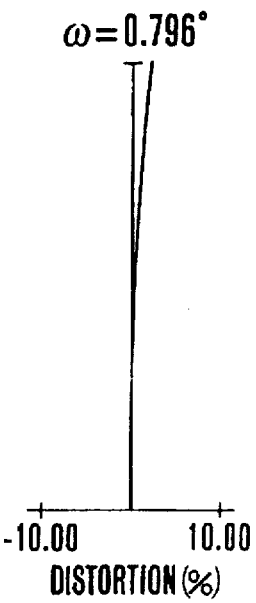
Figure 14A:
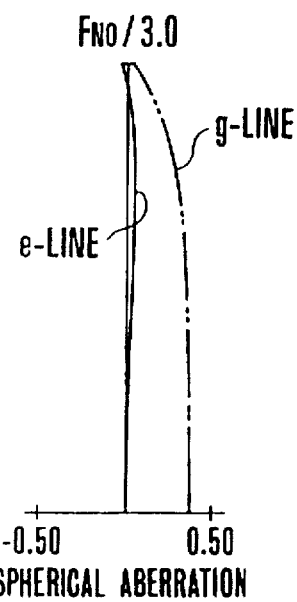
FIGS. 14A, 14B, and 14C are graphic representations of the aberrations of the numerical example 4 of the invention in the telephoto end when the object distance is infinite.
Figure 14B:
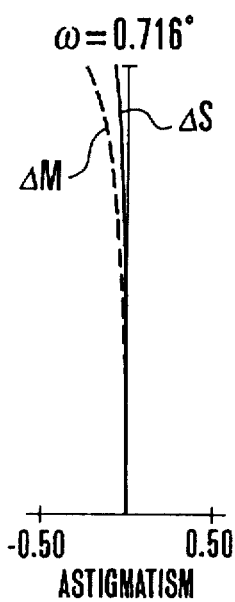
Figure 14C:
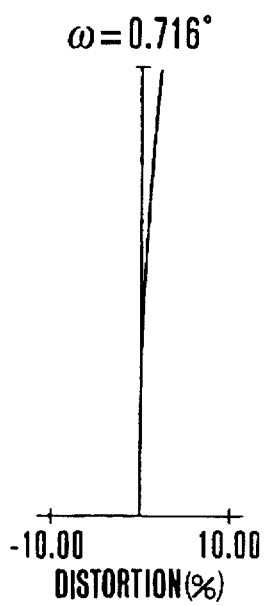
Figures 15A, 15B, 15C:
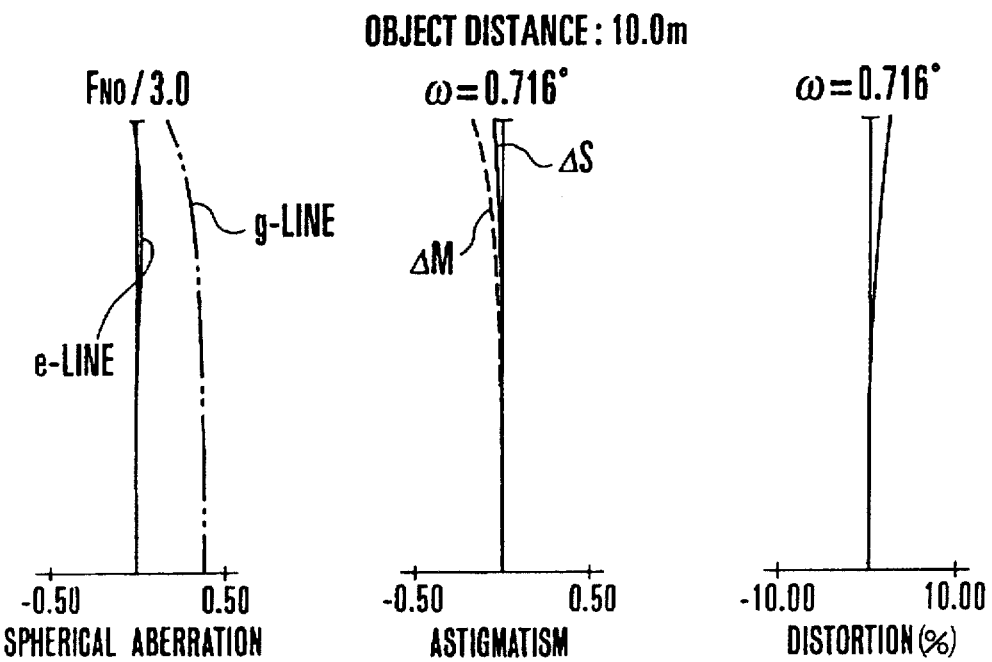
FIGS. 15A, 15B, and 15C are graphic representations of the aberrations of the numerical example 4 of the invention in the telephoto end when the object distance is 10 meters.
Figures 16A, 16B, 16C:
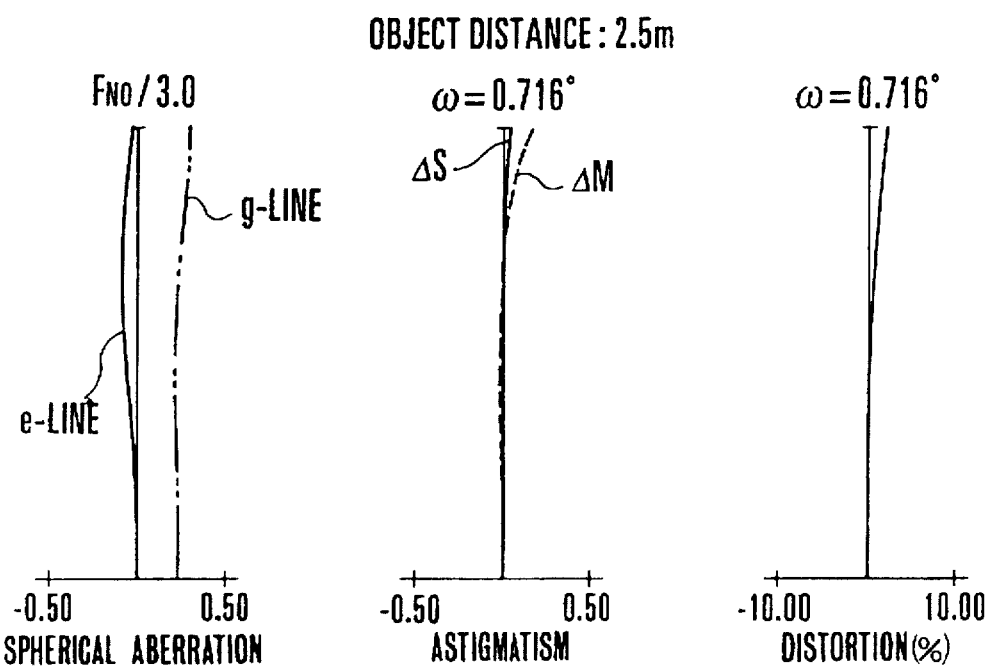
FIGS. 16A, 16B, and 16C are graphic representations of the aberrations of the numerical example 4 of the invention in the telephoto end when the object distance is 2.5 meters.

FIG. 4 is a longitudinal section view of the numerical example 4 of the zoom lens of the invention in the wide-angle end. The aberrations in the telephoto end when the object distance is infinite, 10.0 meters and 2.0 meters (M.O.D.) are shown in FIGS. 14A–14C, 15A–15C and 16A–16C, respectively.

In the numerical example 4, the room ratio is 44. Though similar in construction to the numerical example 3, the focal length for the telephoto end is shifted to a longer side or 440.0 mm. Nonetheless, the F-number for the telephoto end becomes faster or 3.0. Despite these, the first lens unit has to be corrected for spherical aberration and longitudinal chromatic aberration. To this end, the front lens sub-unit is constructed with one positive and one negative lenses, the first lens sub-unit with two positive lenses and the second lens sub-unit with one positive lens. Thus, the aberration correction is made to share by these lenses.

Concerning the floating of the invention, as focusing is effected down from an infinitely distant object to an object at a certain finite distance, the moved amount MB1 of the first lens sub-unit and the moved amount MB2 of the second lens sub-unit fall in the relationship given by the following equation:

$$MB2 = 0.15360\, MB1 - 0.02364\, MB1^2$$

The values of these parameters for the object distances of 10.0 and 2.0 meters are listed in Table-4. In this case, MB2/MB1 takes a maximum value of 0.598 at the M.O.D. and a minimum value of 0.1536 at infinity or thereabouts.

It is, therefore, in the numerical example 4 that the rate of variation of the relative movement of the second lens sub-unit to that of the first lens sub-unit is made to increase as it comes near the M.O.D. In particular, for 10.0 meters, its value is made small or MB2/MB1=0.287 from the same reason as in the numerical example 3. For the M.O.D. (2.5 meters), its value is made smaller or MB2/MB1=0.598 than that in the numerical example 3. This is because, as the focal length for the wide-angle end has shifted to the telephoto side till 10.0 mm, the increase of the diameter of the first lens unit is modulated, thus permitting effective utilization of the function (i) described before.

The difficulty of correcting spherical aberration and longitudinal chromatic aberration increases even when the F-number decreases. So, in the numerical example 4, the first lens unit is constructed with the front lens sub-unit getting one positive and one negative lenses, the first lens sub-unit getting two positive lenses and the second lens sub-unit getting one positive lens, thus using five lenses in total. In addition, the positive lenses in the front lens sub-unit and the first lens sub-unit all have their Abbe numbers made to be not less than 90 and the refractive index of the positive lens in the second lens sub-unit is made higher than those of the other positive lenses. In this case, $\phi A/\phi 1=-0.00987$, $\Sigma A/\phi 1=-0.00906$ and $\Sigma A/(\Sigma B1+\Sigma B2)=-0.794$ are taken.

As can be seen from the aberration curves of FIG. 14A to FIG. 16C, spherical aberration and longitudinal chromatic aberration both are well corrected throughout.

Incidentally, in each of the numerical examples described above, the floating equation of the relationship between the MB1 and MB2 has been expressed up to the term of second degree of MB1. The invention is not confined thereto. Up to terms of higher degree may be used. If so, the degree of freedom for aberration correction can be decreased.

TABLE 1

| $MB2 = 0.60564\, MB1 + 0.01174\, MB1^2$ | | | |
|---|---|---|---|
| Object Distance | Parameters | | |
| in Meter | MB1 | MB2 | MB2/MB1 |
| 3.0 | −3.075 | −1.751 | 0.569 |
| 0.9(M.O.D.) | −12.842 | −5.842 | 0.455 |

TABLE 2

| $MB2 = 0.40263\, MB1 - 0.02753\, MB1^2$ | | | |
|---|---|---|---|
| Object Distance | Parameters | | |
| in Meter | MB1 | MB2 | MB2/MB1 |
| 3.0 | −3.137 | −1.534 | 0.489 |
| 0.8(M.O.D.) | −11.228 | −7.991 | 0.712 |

TABLE 3

| $MB2 = 0.0250\, MB1 - 0.05181\, MB1^2$ | | | |
|---|---|---|---|
| Object Distance | Parameters | | |
| in Meter | MB1 | MB2 | MB2/MB1 |
| 10.0 | −4.748 | −1.287 | 0.271 |
| 2.0(M.O.D.) | −18.726 | −18.636 | 0.995 |

TABLE 4

| $MB2 = 0.15360\, MB1 - 0.02364\, MB1^2$ | | | |
|---|---|---|---|
| Object Distance | Parameters | | |
| in Meter | MB1 | MB2 | MB2/MB1 |
| 10.0 | −5.629 | −1.614 | 0.287 |
| 2.5(M.O.D.) | −18.808 | −11.252 | 0.598 |

Next, the numerical data for the numerical examples 1 to 4 are listed in the following tables, where R1 is the radius of curvature of the i-th lens surface, when counted from the object side, Di is the i-th axial thickness or air separation, when counted from the object side, and Ni and vi are respectively the refractive index and Abbe number for the spectral d-line of the glass of the i-th lens element, when counted from the object side. In the numerical examples, the last two lens surfaces define the face plate, filter or like glass block.

The values of the factors in the above-described conditions (1) to (7) for the numerical examples 1 to 4 are listed in Table-5.

| Numerical Example 1: | | | |
|---|---|---|---|
| f = 9.5–123.5 | Fno. = 1:1.7–2.1 | | 2ω = 60.1°–5.10° |
| R 1 = 2416.35 | D 1 = 2.50 | N 1 = 1.81265 | v 1 = 25.4 |
| R 2 = 132.40 | D 2 = 2.30 | | |
| R 3 = 184.73 | D 3 = 12.65 | N 2 = 1.43496 | v 2 = 95.1 |
| R 4 = −156.08 | D 4 = 13.84 | | |
| R 5 = 98.12 | D 5 = 11.61 | N 3 = 1.49845 | v 3 = 81.6 |
| R 6 = −307.33 | D 6 = 0.50 | | |

-continued

| | | | |
|---|---|---|---|
| R 7 = 61.69 | D 7 = 6.19 | N 4 = 1.69979 | ν 4 = 55.5 |
| R 8 = 129.64 | D 8 = Variable | | |
| R 9 = 599.24 | D 9 = 1.00 | N 5 = 1.88814 | ν 5 = 40.8 |
| R10 = 24.10 | D10 = 3.67 | | |
| R11 = −120.24 | D11 = 0.80 | N 6 = 1.82017 | ν 6 = 46.6 |
| R12 = 123.78 | D12 = 3.51 | | |
| R13 = −22.87 | D13 = 0.80 | N 7 = 1.77621 | ν 7 = 49.6 |
| R14 = 39.63 | D14 = 4.62 | N 8 = 1.85501 | ν 8 = 23.9 |
| R15 = −42.35 | D15 = Variable | | |
| R16 = −32.80 | D16 = 0.90 | N 9 = 1.82017 | ν 9 = 46.6 |
| R17 = 48.63 | D17 = 3.32 | N10 = 1.85501 | ν10 = 23.9 |
| R18 = −300.67 | D18 = Variable | | |
| R19 = (Stop) | D19 = 1.91 | | |
| R20 = 12579.43 | D20 = 5.10 | N11 = 1.70559 | ν11 = 41.2 |
| R21 = −34.16 | D21 = 0.10 | | |
| R22 = 118.95 | D22 = 6.39 | N12 = 1.51678 | ν12 = 54.7 |
| R23 = −29.86 | D23 = 1.40 | N13 = 1.83945 | ν13 = 42.7 |
| R24 = −128.11 | D24 = 0.10 | | |
| R25 = 52.29 | D25 = 8.51 | N14 = 1.52032 | ν14 = 59.0 |
| R26 = −27.92 | D26 = 1.50 | N15 = 1.82017 | ν15 = 46.6 |
| R27 = 811.08 | D27 = 20.04 | | |
| R28 = −546.10 | D28 = 6.51 | N16 = 1.51825 | ν16 = 64.2 |
| R29 = −37.49 | D29 = 0.15 | | |
| R30 = 191.65 | D30 = 1.50 | N17 = 1.83932 | ν17 = 37.2 |
| R31 = 31.05 | D31 = 6.80 | N18 = 1.48915 | ν18 = 70.2 |
| R32 = −246.48 | D32 = 0.15 | | |
| R33 = 215.34 | D33 = 6.68 | N19 = 1.51825 | ν19 = 64.2 |
| R34 = −34.23 | D34 = 1.40 | N20 = 1.83932 | ν20 = 37.2 |
| R35 = −86.47 | D35 = 0.15 | | |
| R36 = 53.33 | D36 = 5.40 | N21 = 1.48915 | ν21 = 70.2 |
| R37 = −95.33 | D37 = 3.40 | | |
| R38 = ∞ | D38 = 50.00 | N22 = 1.51825 | ν22 = 64.2 |
| R39 = ∞ | | | |

| Variable | Focal Length | | |
|---|---|---|---|
| Separations | 9.50 | 30.04 | 123.50 |
| D 8 | 1.14 | 33.14 | 51.98 |
| D15 | 51.42 | 14.28 | 3.24 |
| D18 | 4.50 | 9.64 | 1.84 |

Numerical Example 2:

f = 9.5–133.0  Fno. = 1:1.9  2ω = 60.1°–4.74°

| | | | |
|---|---|---|---|
| R 1 = −232.61 | D 1 = 2.50 | N 1 = 1.81264 | ν 1 = 25.4 |
| R 2 = 234.08 | D 2 = 8.73 | | |
| R 3 = −553.00 | D 3 = 8.31 | N 2 = 1.43496 | ν 2 = 95.1 |
| R 4 = −126.13 | D 4 = 12.02 | | |
| R 5 = 244.28 | D 5 = 12.39 | N 3 = 1.49845 | ν 3 = 81.6 |
| R 6 = −147.31 | D 6 = 0.15 | | |
| R 7 = 86.20 | D 7 = 11.67 | N 4 = 1.49845 | ν 4 = 81.6 |
| R 8 = 2257.02 | D 8 = 0.50 | | |
| R 9 = 56.58 | D 9 = 6.28 | N 5 = 1.69979 | ν 5 = 55.5 |
| R10 = 78.22 | D10 = Variable | | |
| R11 = 80.39 | D11 = 1.00 | N 6 = 1.82017 | ν 6 = 46.6 |
| R12 = 18.69 | D12 = 4.14 | | |
| R13 = −238.72 | D13 = 0.80 | N 7 = 1.80811 | ν 7 = 46.6 |
| R14 = 145.49 | D14 = 3.87 | | |
| R15 = −20.40 | D15 = 0.80 | N 8 = 1.77621 | ν 8 = 49.6 |
| R16 = 31.76 | D16 = 4.59 | N 9 = 1.85501 | ν 9 = 23.9 |
| R17 = −47.21 | D17 = Variable | | |
| R18 = −28.33 | D18 = 0.90 | N10 = 1.77621 | ν10 = 49.6 |
| R19 = 35.47 | D19 = 4.05 | N11 = 1.81265 | ν11 = 25.4 |
| R20 = −443.14 | D20 = Variable | | |
| R21 = (Stop) | D21 = 1.83 | | |
| R22 = 255.00 | D22 = 5.26 | N12 = 1.67000 | ν12 = 48.3 |
| R23 = −32.99 | D23 = 0.10 | | |
| R24 = 74.08 | D24 = 6.99 | N13 = 1.51678 | ν13 = 54.7 |
| R25 = −25.63 | D25 = 1.40 | N14 = 1.82017 | ν14 = 46.6 |
| R26 = −321.97 | D26 = 0.10 | | |
| R27 = 50.07 | D27 = 7.25 | N15 = 1.58482 | ν15 = 40.8 |
| R28 = −29.92 | D28 = 1.50 | N16 = 1.82017 | ν16 = 46.6 |
| R29 = 133.07 | D29 = 14.60 | | |
| R30 = 296.81 | D30 = 6.78 | N17 = 1.51825 | ν17 = 64.2 |
| R31 = −34.60 | D31 = 0.15 | | |
| R32 = −198.34 | D32 = 1.50 | N18 = 1.83932 | ν18 = 37.2 |
| R33 = 32.91 | D33 = 6.67 | N19 = 1.48915 | ν19 = 70.2 |
| R34 = −107.26 | D34 = 0.15 | | |
| R35 = 72.63 | D35 = 8.42 | N20 = 1.51825 | ν20 = 64.2 |
| R36 = −26.85 | D36 = 1.40 | N21 = 1.83932 | ν21 = 37.2 |
| R37 = −101.49 | D37 = 0.15 | | |
| R38 = 69.95 | D38 = 6.28 | N22 = 1.48915 | ν22 = 70.2 |
| R39 = −56.30 | D39 = 3.40 | | |
| R40 = ∞ | D40 = 55.50 | N23 = 1.51825 | ν23 = 64.2 |
| R41 = ∞ | | | |

| Variable | Focal Length | | |
|---|---|---|---|
| Separations | 9.50 | 30.04 | 133.00 |
| D10 | 2.60 | 34.38 | 53.98 |
| D17 | 50.76 | 14.61 | 2.21 |
| D20 | 4.00 | 8.37 | 1.17 |

Numerical Example 3:

f = 9.0–396.0  Fno. = 1:1.75–3.3  2ω = 62.9°–1.59°

| | | | |
|---|---|---|---|
| R 1 = −2535.35 | D 1 = 5.50 | N 1 = 1.62409 | ν 1 = 36.3 |
| R 2 = 220.34 | D 2 = 1.60 | | |
| R 3 = 234.37 | D 3 = 21.48 | N 2 = 1.43496 | ν 2 = 95.1 |
| R 4 = −557.29 | D 4 = 20.21 | | |
| R 5 = 311.46 | D 5 = 15.02 | N 3 = 1.43496 | ν 3 = 95.1 |
| R 6 = −615.77 | D 6 = 0.30 | | |
| R 7 = 160.85 | D 7 = 15.22 | N 4 = 1.43496 | ν 4 = 95.1 |
| R 8 = 2398.75 | D 8 = 1.00 | | |
| R 9 = 129.19 | D 9 = 6.55 | N 5 = 1.43985 | ν 5 = 95.0 |
| R10 = 187.50 | D10 = Variable | | |
| R11 = −2292.00 | D11 = 2.00 | N 6 = 1.82017 | ν 6 = 46.6 |
| R12 = 42.43 | D12 = 6.91 | | |
| R13 = −89.57 | D13 = 1.80 | N 7 = 1.77621 | ν 7 = 49.6 |
| R14 = 79.59 | D14 = 3.72 | | |
| R15 = −91.85 | D15 = 1.80 | N 8 = 1.77621 | ν 8 = 49.6 |
| R16 = 46.03 | D16 = 6.98 | N 9 = 1.93306 | ν 9 = 21.3 |
| R17 = −251.80 | D17 = Variable | | |
| R18 = 202.24 | D18 = 8.74 | N10 = 1.49845 | ν10 = 81.6 |
| R19 = −121.69 | D19 = 0.30 | | |
| R20 = 120.71 | D20 = 2.50 | N11 = 1.85501 | ν11 = 23.9 |
| R21 = 66.74 | D21 = 11.92 | N12 = 1.48915 | ν12 = 70.2 |
| R22 = −163.36 | D22 = 0.20 | | |
| R23 = 121.25 | D23 = 10.94 | N13 = 1.62032 | ν13 = 63.4 |
| R24 = −96.60 | D24 = 2.50 | N14 = 1.85501 | ν14 = 23.9 |
| R25 = −261.20 | D25 = 0.20 | | |
| R26 = 90.48 | D26 = 7.52 | N15 = 1.48915 | ν15 = 70.2 |
| R27 = 510.88 | D27 = Variable | | |
| R28 = (Stop) | D28 = 2.64 | | |
| R29 = −71.36 | D29 = 1.80 | N16 = 1.79013 | ν16 = 44.2 |
| R30 = 19.17 | D30 = 5.77 | N17 = 1.81265 | ν17 = 25.4 |
| R31 = 74.85 | D31 = 6.00 | | |
| R32 = −29.47 | D32 = 1.60 | N18 = 1.73234 | ν18 = 54.7 |
| R33 = 32.71 | D33 = 8.82 | N19 = 1.59911 | ν19 = 39.2 |
| R34 = −28.80 | D34 = 24.00 | | |
| R35 = −153.14 | D35 = 6.44 | N20 = 1.48915 | ν20 = 70.2 |
| R36 = −30.96 | D36 = 0.20 | | |
| R37 = −54.49 | D37 = 2.20 | N21 = 1.79013 | ν21 = 44.2 |
| R38 = 41.22 | D38 = 7.72 | N22 = 1.50349 | ν22 = 56.4 |
| R39 = −48.56 | D39 = 1.10 | | |
| R40 = 173.49 | D40 = 7.17 | N23 = 1.55099 | ν23 = 45.8 |
| R41 = −27.83 | D41 = 2.20 | N24 = 1.81265 | ν24 = 25.4 |
| R42 = −94.90 | D42 = 0.20 | | |
| R43 = 63.75 | D43 = 5.89 | N25 = 1.51977 | ν25 = 52.4 |
| R44 = −62.21 | D44 = 5.00 | | |
| R45 = ∞ | D45 = 50.00 | N26 = 1.51825 | ν26 = 64.2 |
| R46 = ∞ | | | |

-continued

| Variable | Focal Length | | |
|---|---|---|---|
| Separations | 9.00 | 61.75 | 396.00 |
| D10 | 2.72 | 96.72 | 127.94 |
| D17 | 181.02 | 68.99 | 1.27 |
| D27 | 3.30 | 21.33 | 57.83 |

Numerical Example 4:

f = 10.0–440.0   Fno. = 1:1.75–3.0   2ω = 57.6°–1.43°

| | | |
|---|---|---|
| R 1 = 335.04 | D 1 = 5.50 | N 1 = 1.74618   v 1 = 28.3 |
| R 2 = 176.61 | D 2 = 2.05 | |
| R 3 = 176.88 | D 3 = 15.75 | N 2 = 1.43496   v 2 = 95.1 |
| R 4 = 803.17 | D 4 = 20.11 | |
| R 5 = 390.22 | D 5 = 11.32 | N 3 = 1.43496   v 3 = 95.1 |
| R 6 = –1444.28 | D 6 = 0.30 | |
| R 7 = 193.35 | D 7 = 16.61 | N 4 = 1.43496   v 4 = 95.1 |
| R 8 = –3277.13 | D 8 = 1.00 | |
| R 9 = 137.02 | D 9 = 10.70 | N 5 = 1.49845   v 5 = 81.6 |
| R10 = 265.11 | D10 = Variable | |
| R11 = 20035.88 | D11 = 2.00 | N 6 = 1.82017   v 6 = 46.6 |
| R12 = 49.31 | D12 = 5.33 | |
| R13 = –151.12 | D13 = 1.80 | N 7 = 1.77621   v 7 = 49.6 |
| R14 = 60.83 | D14 = 5.04 | |
| R15 = –70.46 | D15 = 1.80 | N 8 = 1.77621   v 8 = 49.6 |
| R16 = 48.83 | D16 = 6.55 | N 9 = 1.93306   v 9 = 21.3 |
| R17 = –375.68 | D17 = Variable | |
| R18 = 282.65 | D18 = 8.70 | N10 = 1.49845   v10 = 81.6 |
| R19 = –100.57 | D19 = 0.30 | |
| R20 = 157.49 | D20 = 2.50 | N11 = 1.81265   v11 = 25.4 |
| R21 = 83.03 | D21 = 11.25 | N12 = 1.48915   v12 = 70.2 |
| R22 = –152.19 | D22 = 0.20 | |
| R23 = 139.97 | D23 = 10.57 | N13 = 1.62032   v13 = 63.4 |
| R24 = –97.64 | D24 = 2.50 | N14 = 1.85501   v14 = 23.9 |
| R25 = –253.50 | D25 = 0.20 | |
| R26 = 91.15 | D26 = 7.16 | N15 = 1.48915   v15 = 70.2 |
| R27 = 500.08 | D27 = Variable | |
| R28 = (Stop) | D28 = 4.07 | |
| R29 = –55.87 | D29 = 1.80 | N16 = 1.79013   v16 = 44.2 |
| R30 = 25.90 | D30 = 5.48 | N17 = 1.81265   v17 = 25.4 |
| R31 = 132.84 | D31 = 6.10 | |
| R32 = –30.14 | D32 = 1.60 | N18 = 1.73234   v18 = 54.7 |
| R33 = 32.18 | D33 = 10.57 | N19 = 1.59911   v19 = 39.2 |
| R34 = –27.39 | D34 = 24.00 | |
| R35 = –262.03 | D35 = 6.95 | N20 = 1.48915   v20 = 70.2 |
| R36 = –31.46 | D36 = 0.20 | |
| R37 = –53.85 | D37 = 2.20 | N21 = 1.79013   v21 = 44.2 |
| R38 = 41.01 | D38 = 7.81 | N22 = 1.50349   v22 = 56.4 |
| R39 = –52.46 | D39 = 1.10 | |
| R40 = 128.36 | D40 = 7.29 | N23 = 1.55099   v23 = 45.8 |
| R41 = –28.99 | D41 = 2.20 | N24 = 1.81265   v24 = 25.4 |
| R42 = –121.65 | D42 = 0.20 | |
| R43 = 73.01 | D43 = 5.52 | N25 = 1.51977   v25 = 52.4 |
| R44 = –66.47 | D44 = 5.00 | |
| R45 = ∞ | D45 = 50.00 | N26 = 1.51825   v26 = 64.2 |
| R46 = ∞ | | |

| Variable | Focal Length | | |
|---|---|---|---|
| Separations | 10.00 | 69.78 | 440.00 |
| D10 | 1.72 | 91.72 | 120.73 |
| D17 | 178.58 | 69.39 | 2.62 |
| D27 | 3.30 | 22.49 | 60.26 |

TABLE 5

| Factor | Numerical Example | | | |
|---|---|---|---|---|
| | 1 | 2 | 3 | 4 |
| MB2/MB1 | 0.606 | 0.712 | 0.995 | 0.598 |
| FN1 | 1.33 | 1.07 | 1.53 | 1.26 |
| øA/ø1 | –0.0396 | –0.298 | –0.0763 | –0.0099 |
| ΣA/ø1 | –0.0136 | –0.0184 | –0.0106 | –0.0091 |
| ΣA/(ΣB1 + ΣB2) | –0.907 | –1.214 | –0.956 | –0.794 |
| øB2/øB1 | 0.929 | 0.353 | 0.239 | 0.479 |
| ΣøB2/ΣøB1 | 1.365 | 0.515 | 0.237 | 0.555 |

According to the invention, as has been described above, a 4-unit zoom lens is constructed with inclusion of a first lens unit for focusing, wherein lens sub-units constituting part of the first lens unit are axially moved to effect focusing. With the use of such an inner focusing method, when to increase the relative aperture and the zooming range, appropriate rules of design for the first lens unit and its sub-units are set forth to reduce the variation of spherical aberration, longitudinal chromatic aberration and others with zooming and focusing to a minimum. Hence, it is made possible to achieve a large relative aperture, high range zoom lens having an F-number of about 1.7 at the wide-angle end and a zoom ratio of 13 to 44 or thereabout, while still permitting high optical performance to be maintained in good stability throughout the entire zooming range and throughout the entire focusing range.

Another embodiment of the zoom lens according to the invention in which the first lens is constructed with two lens sub-units which axially move at different speeds from each other is described below.

FIGS. 22(A) to 22(D), FIGS. 23(A) to 23(D), FIGS. 24(A) to 24(D) and FIGS. 25(A) to 25(D) are longitudinal section views of numerical examples 5 to 8 of zoom lenses of the invention in the telephoto end with an object at four different distances. FIG. 50 is a diagram to explain the variation of the paraxial refractive power arrangement of the first lens unit of the zoom lens of the present embodiment. FIGS. 51(A) and 51(B) are diagrams to explain the focusing method using the two lens sub-units of the first lens unit. In these drawings, reference character L1 denotes the first lens unit (front lens unit) as the focusing lens of positive refractive power having a front lens sub-unit LA of negative refractive power and a rear lens sub-unit LB of positive refractive power.

To perform focusing from an infinitely distant object to an object at the minimum distance (hereinafter sometimes also referred to as "M.O.D."), the rear lens sub-unit LB is made to axially move toward the object side monotonously. Along with this, the front lens sub-unit LA is made to axially move either toward the image side monotonously, or while depicting a locus convex toward the object side, so that it takes its focusing position for an object at the minimum distance on the image side of its focusing position for an infinitely distant object.

Reference character L2 denotes the second lens unit for varying the focal length, or variator, of negative refractive power. When zooming from the wide-angle end to the telephoto end, it moves axially toward the image side monotonously.

The image magnification of the second lens unit L2 is made to vary in a range containing unity (–1x).

Reference character L3 denotes the third lens unit for compensating for the image shift with zooming, or compensator, of positive or negative refractive power. In the case of the negative refractive power, it moves axially, while depicting a locus convex toward the object side. In the case of the positive refractive power, it moves toward the object side monotonously. SP stands for a stop. Reference character L4 denotes the fourth lens unit, or relay lens, of positive refractive power. P indicates the color separation prism, optical filter or the like shown, in the drawings, as a glass block. IP stands for the image plane.

The 4-unit zoom lenses generally employ the focusing method of moving the frontmost or first lens unit as a whole, or the so-called "front" focusing method. For the same object distance, the moved amount of the first lens unit is constant at any zooming station. Therefore, this method has a merit that the operating mechanism becomes simple in structures.

With the zoom lens whose first lens unit is positive in refractive power and which includes a wide angular field, however, when focusing down to suit to the minimum object distance, the first lens unit moves toward the object side. To admit of the off-axial light beam in the wide-angle end, the effective diameter of the first lens unit increases largely. Also, because the first lens unit is relatively heavy, the required driving torque for moving it gets large. So, quick focus adjustment becomes difficult to perform. Particularly, when the zoom lens is held in the tilted position, as this means that the focusing lens unit moves against gravity, an especial increase of the torque results.

So, in the present embodiment applied to the before described type of zoom lens, focusing from an infinitely distant object to an object at the minimum distance is performed by moving the two lens sub-units LA and LB in the first lens unit LI in such relation as described before, that is, the floating focusing method is employed. Since the lens sub-units LA and LB move in opposite directions to each other when focusing to infinity or M.O.D. Thus, the increase of the torque due to the tilting of the zoom lens is minimized and good optical performance is obtained.

In the latter connection, it should be pointed out that the present embodiment utilizes the floating technique also in maintaining good stability of aberration correction against focusing. For this purpose, an appropriate one of the spaces in the focusing lens unit is selected to change the angles and heights at which the rays of light pass therethrough, as the selected space expand or shrink as focusing goes in either direction.

Next, as, in the present embodiment, the zoom lens has its first lens unit L1 provided with that variable space between the front lens sub-unit LA of negative refractive power and the rear lens sub-unit LB of positive refractive power, the optical effects of the focusing function are explained by reference to FIG. 50 and FIGS. 51(A) and 51(B).

In FIG. 50, when focused on an infinitely distant object, as shown by a solid line curve, a paraxial ray of light travels past the front and rear lens sub-units LA and LB of axial positions a and b at heights $H_A$ and $H_B$, respectively. Meanwhile, the paraxial ray for a certain finite object distance (M.O.D.) is shown by a dashed line curve. In this case, the front and rear lens sub-units take their axial positions at a' and b' and the paraxial ray travels past them at heights $H_A'$ and $H_B'$, respectively.

Figure 18:
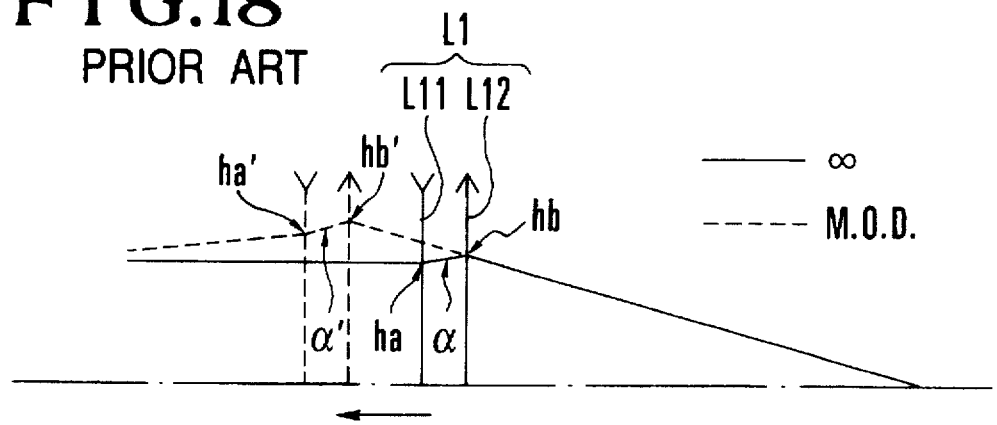
FIG. 18 is a diagram to explain the paraxial refractive power arrangement of the first lens unit of the prior known 4-unit zoom lens.
Figure 19A:
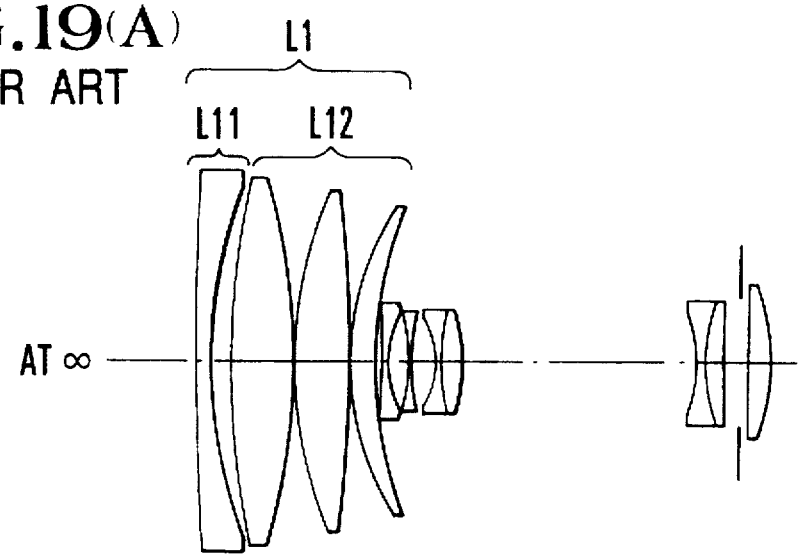
FIGS. 19(A) and 19(B) are lens block diagrams of the first lens unit of the prior known 4-unit zoom lens.
Figure 19B:
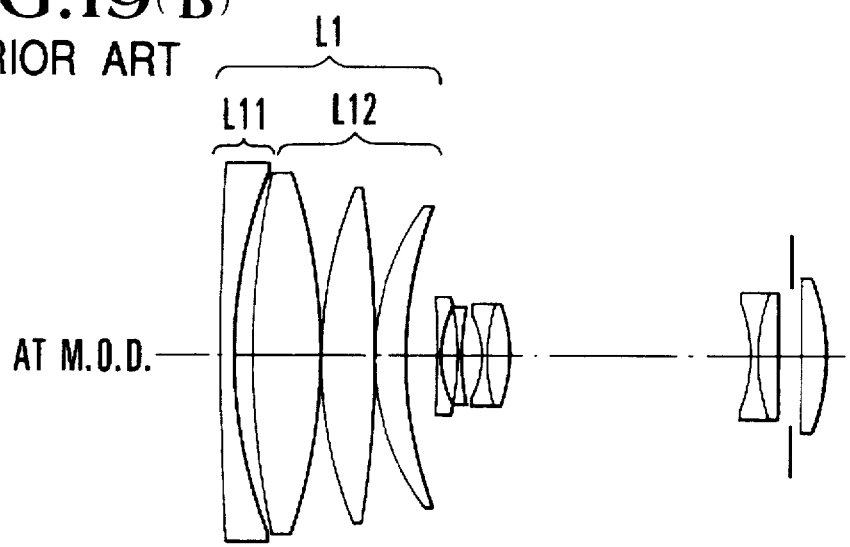
Figure 20:
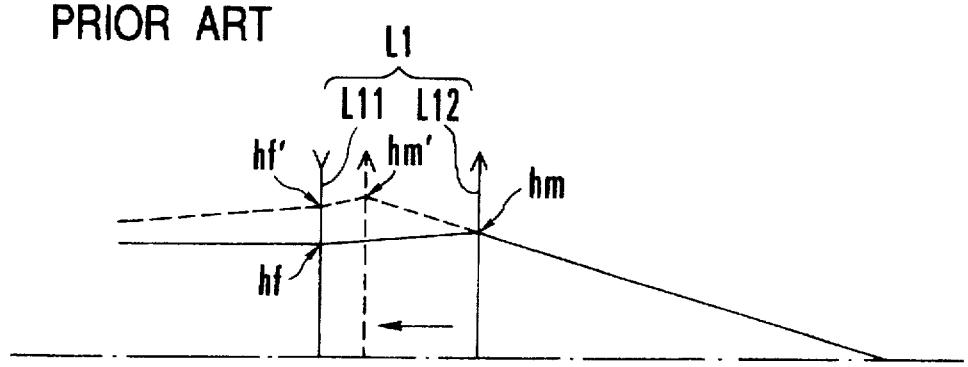
FIG. 20 is a diagram to explain the paraxial refractive power arrangement of the first lens unit of the prior known 4-unit zoom lens.
Figure 21A:
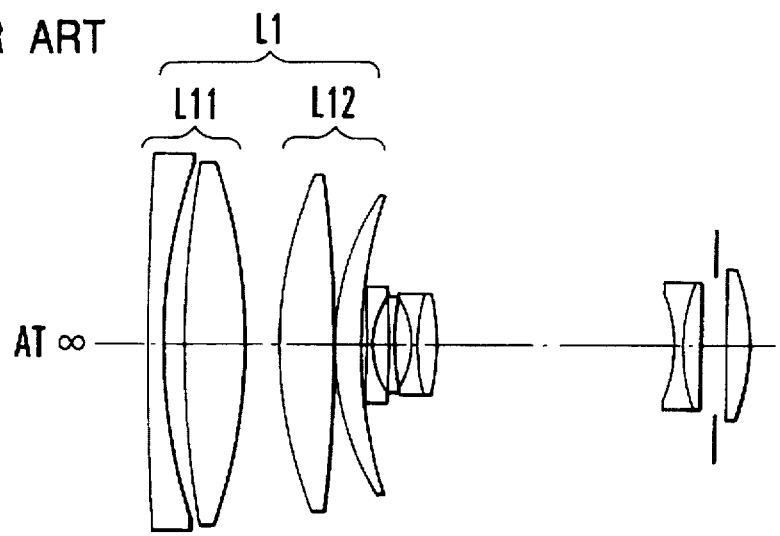
FIGS. 21(A) and 21(B) are lens block diagrams of the first lens unit of the prior known 4-unit zoom lens.
Figure 21B:
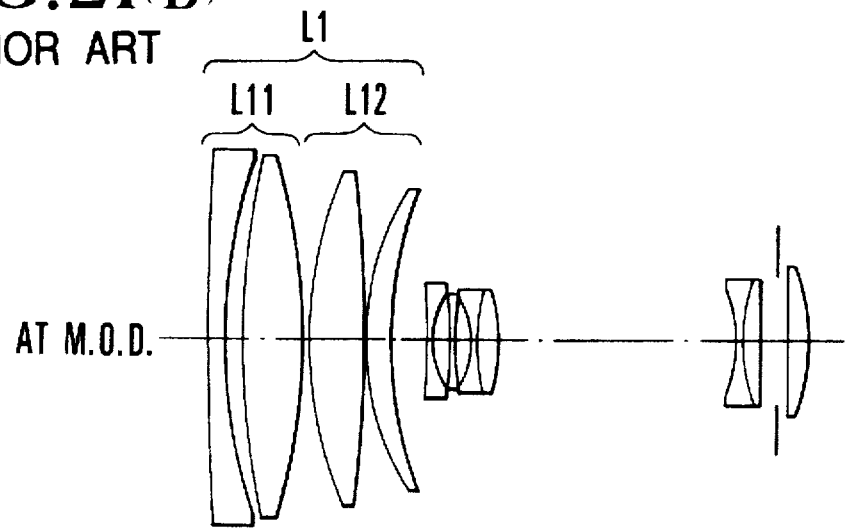
Figure 22A:
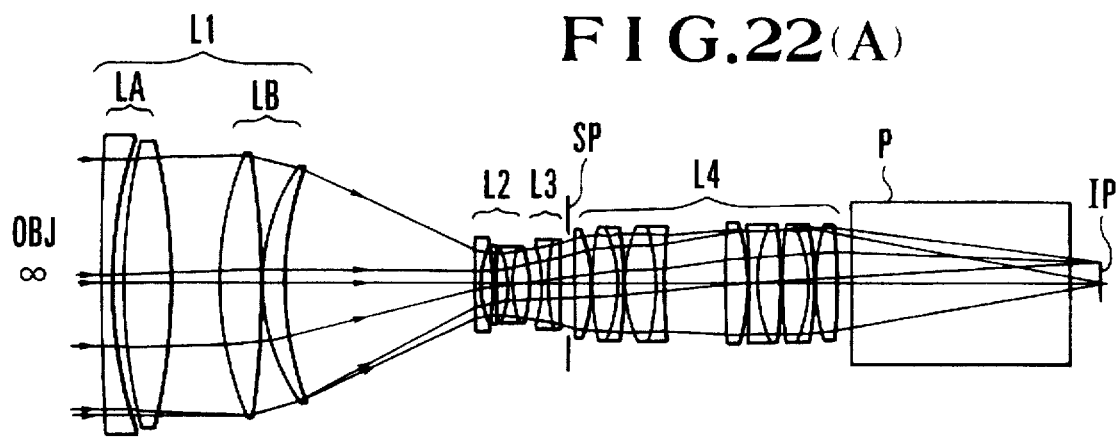
FIGS. 22(A) to 22(D) are lens block diagrams of a numerical example 5 of the invention in the telephoto end.
Figure 22B:
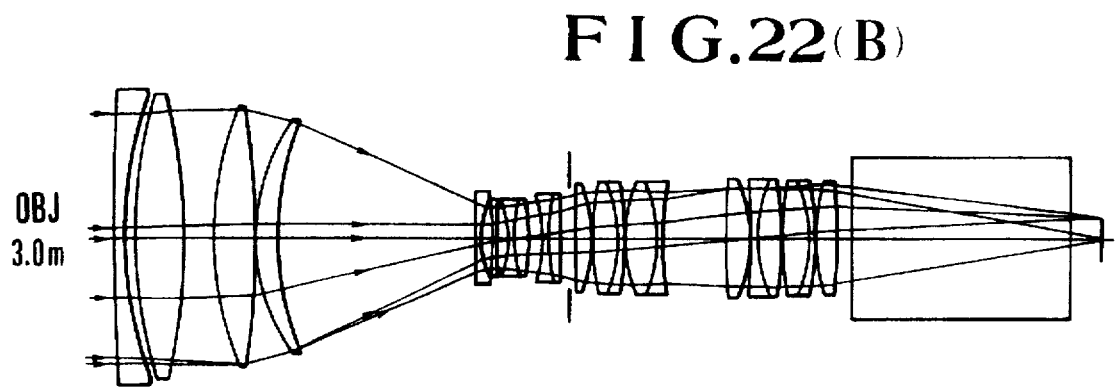
Figure 22C:
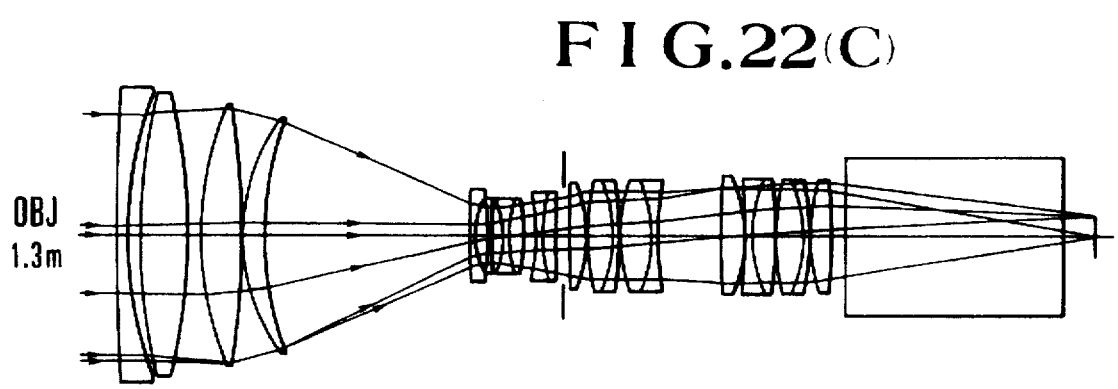
Figure 22D:
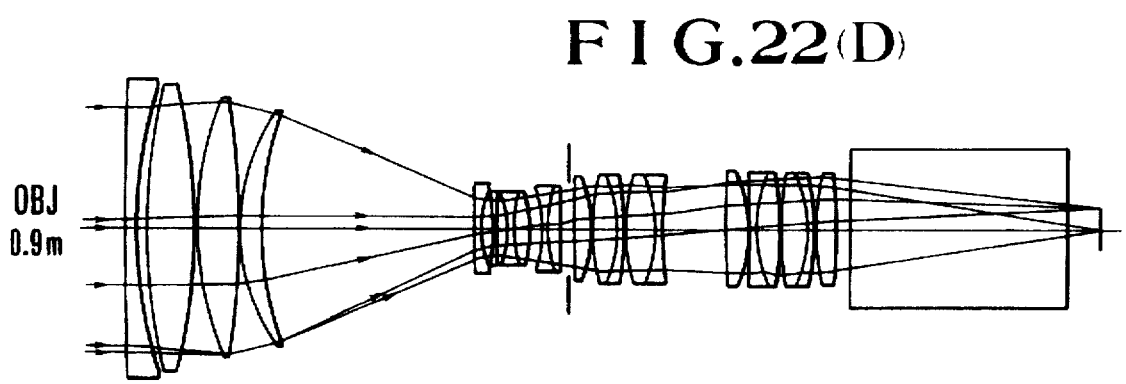
Figure 23A:
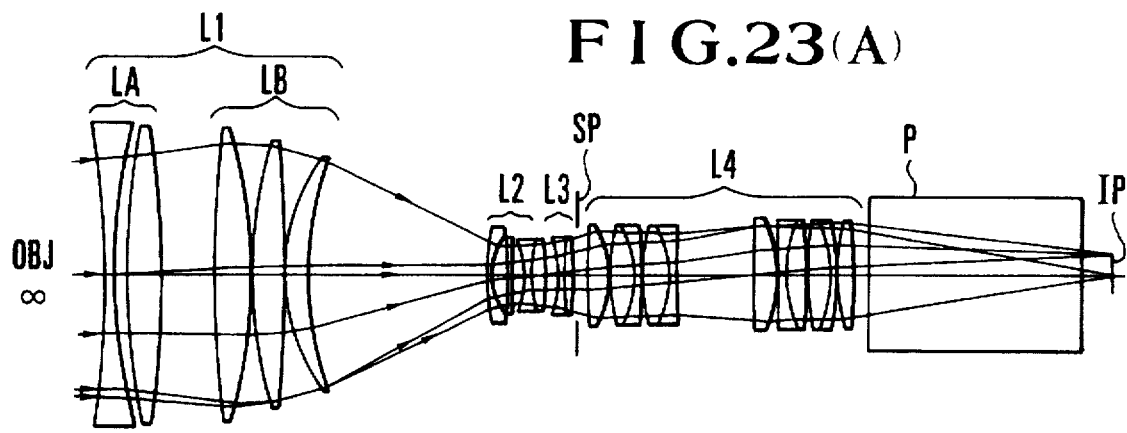
FIGS. 23(A) to 23(D) are lens block diagrams of a numerical example 6 of the invention in the telephoto end.
Figure 23B:
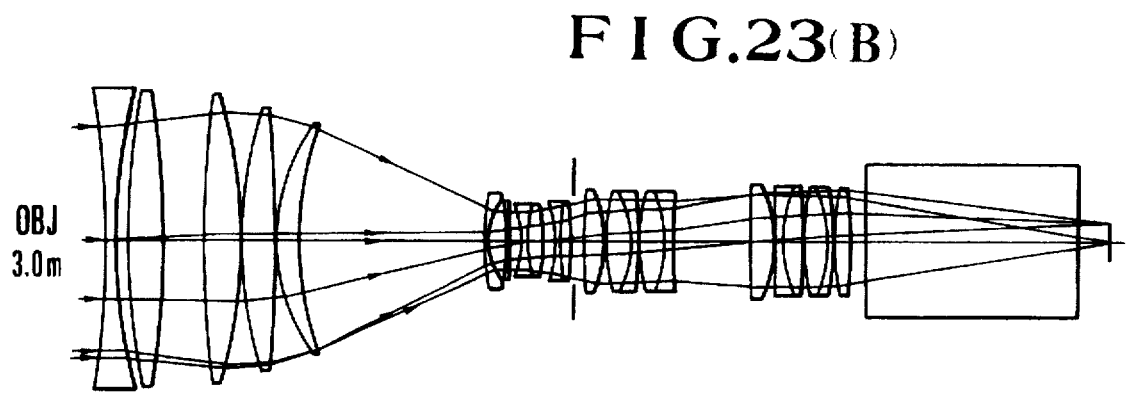
Figure 23C:
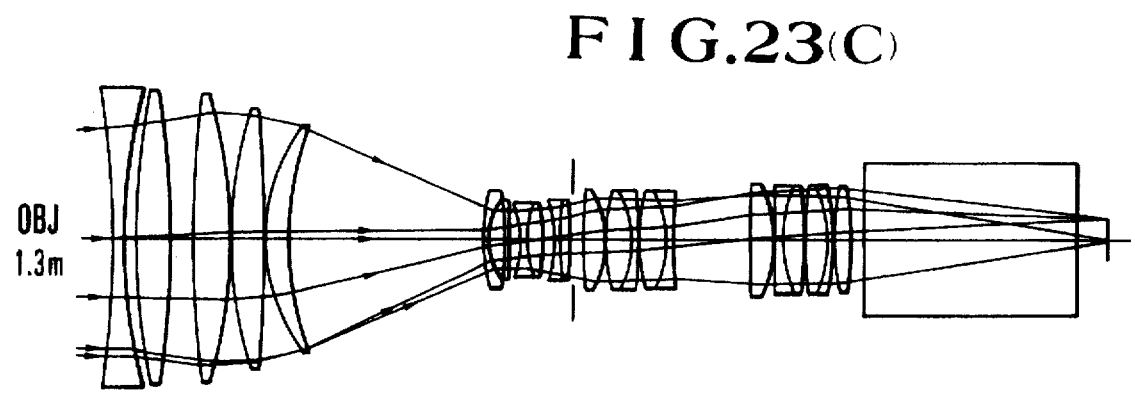
Figure 23D:
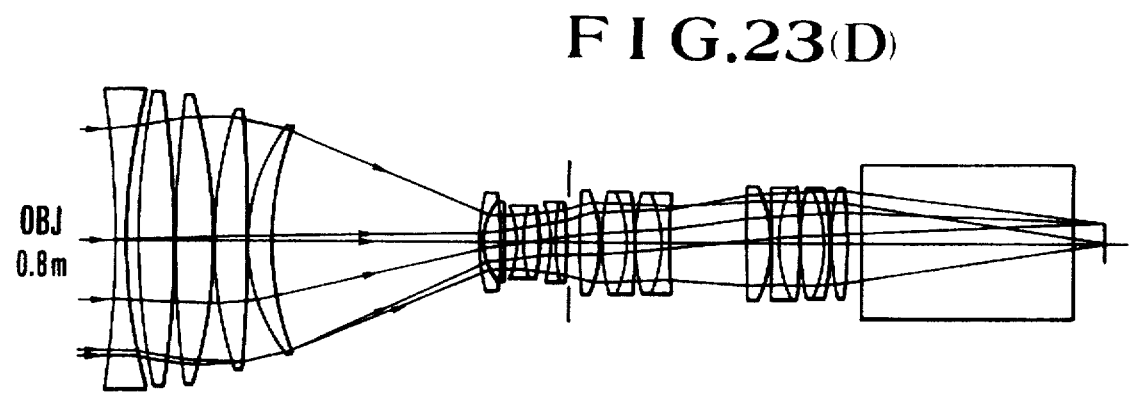
Figure 24A:
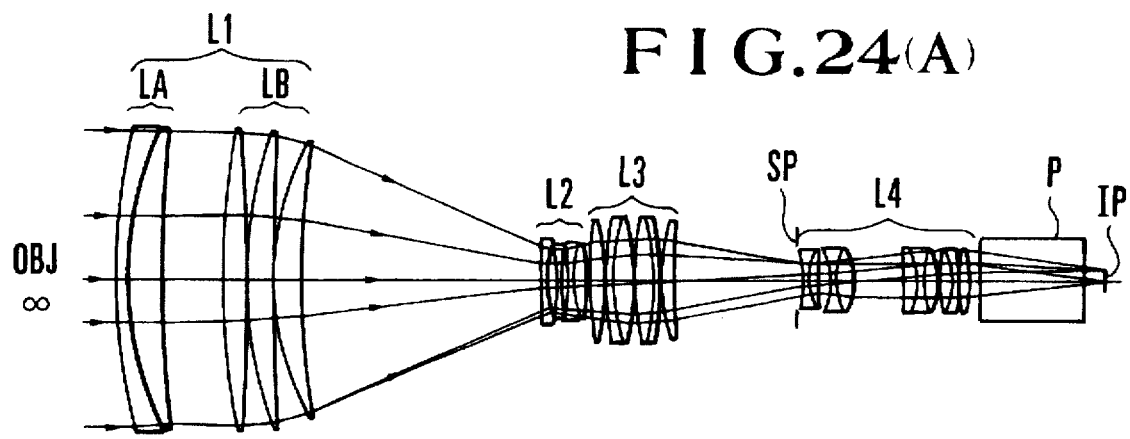
FIGS. 24(A) to 24(D) are lens block diagrams of a numerical example 7 of the invention in the telephoto end.
Figure 24B:
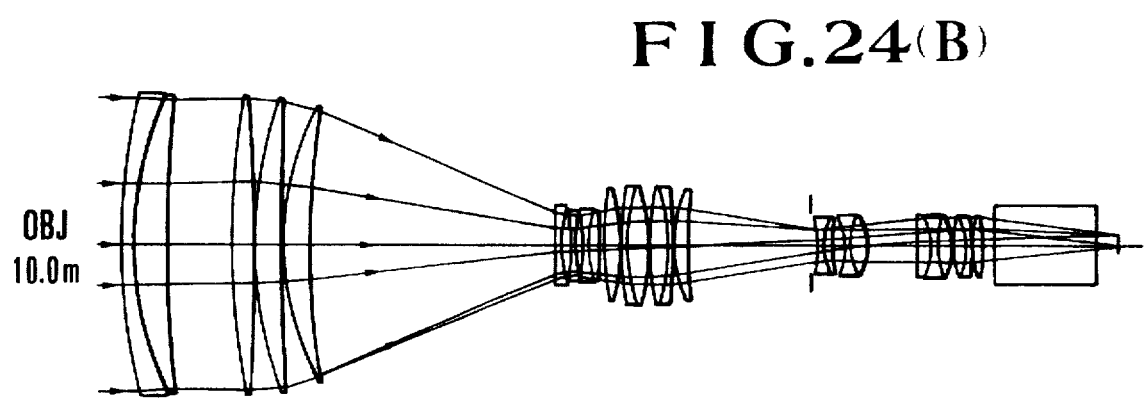
Figure 24C:
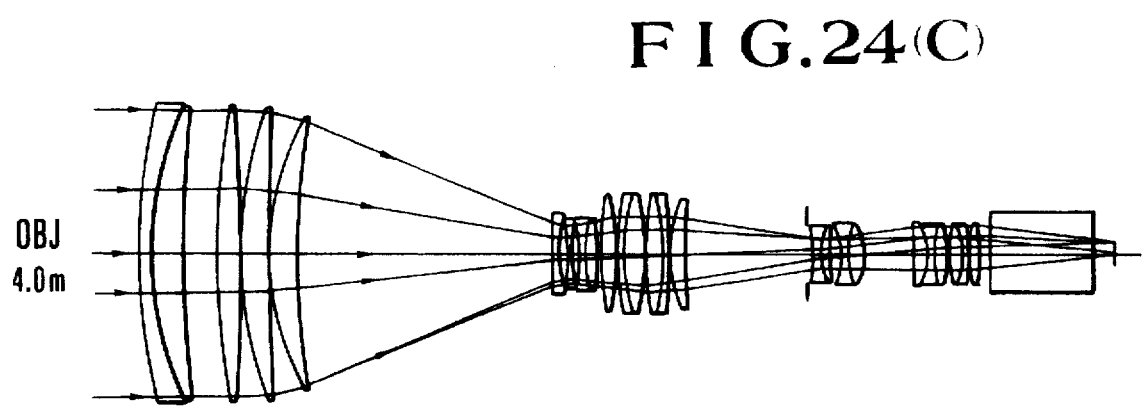
Figure 24D:
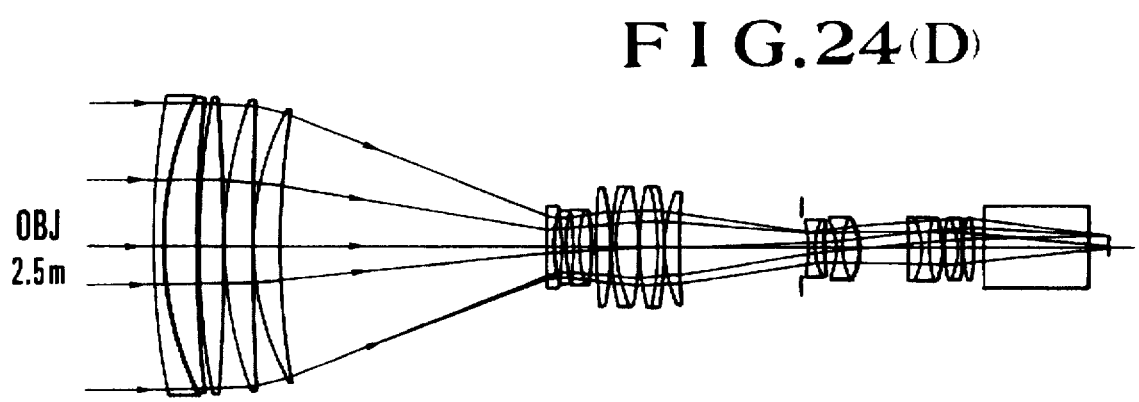
Figure 25A:
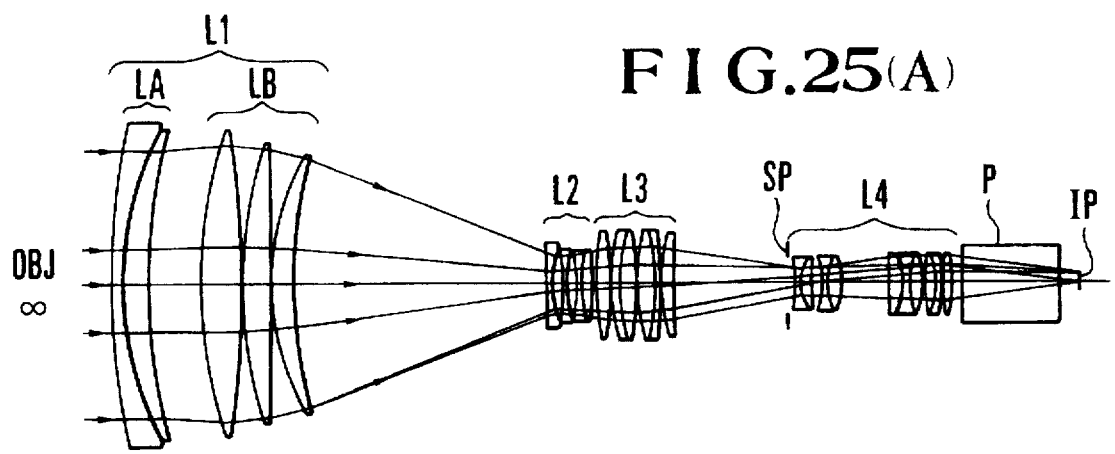
FIGS. 25(A) to 25(D) are lens block diagrams of a numerical example 8 of the invention in the telephoto end.
Figure 25B:
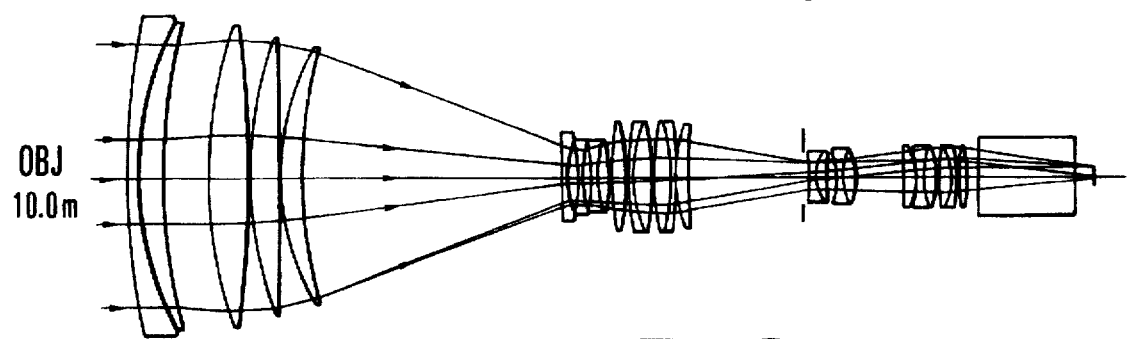
Figure 25C:
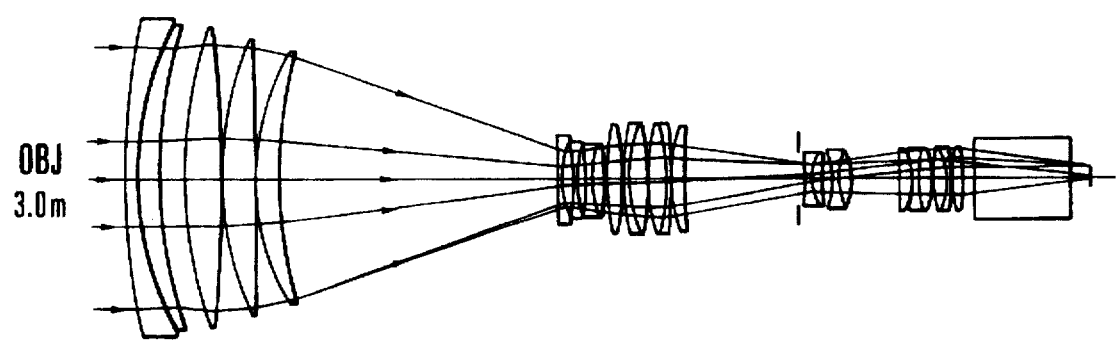
Figure 25D:
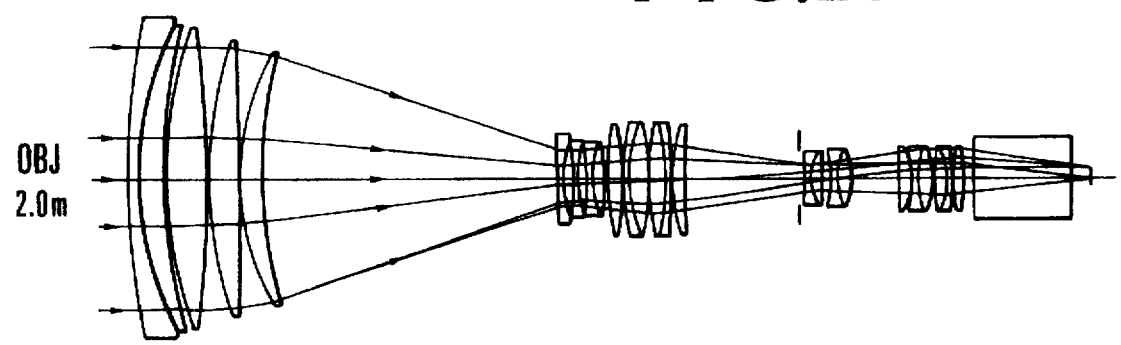
Figures 38A, 38B, 38C:
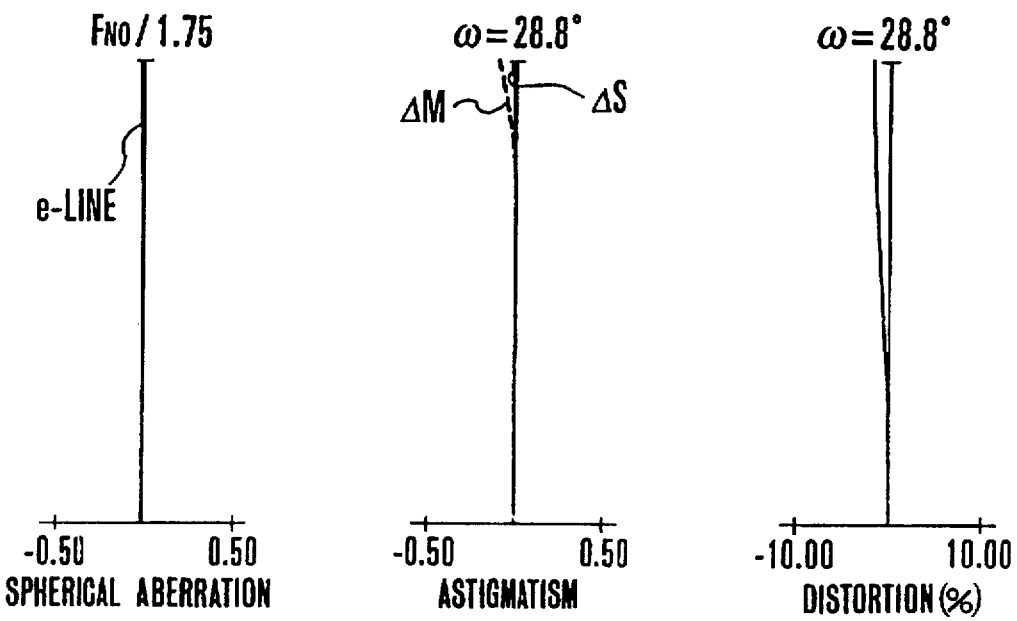
FIGS. 38A, 38B, and 38C are graphic representations of the aberrations of the numerical example 7 of the invention when the focal length is 10 mm and the object distance is 10 m.
Figures 39A, 39B, 39C:
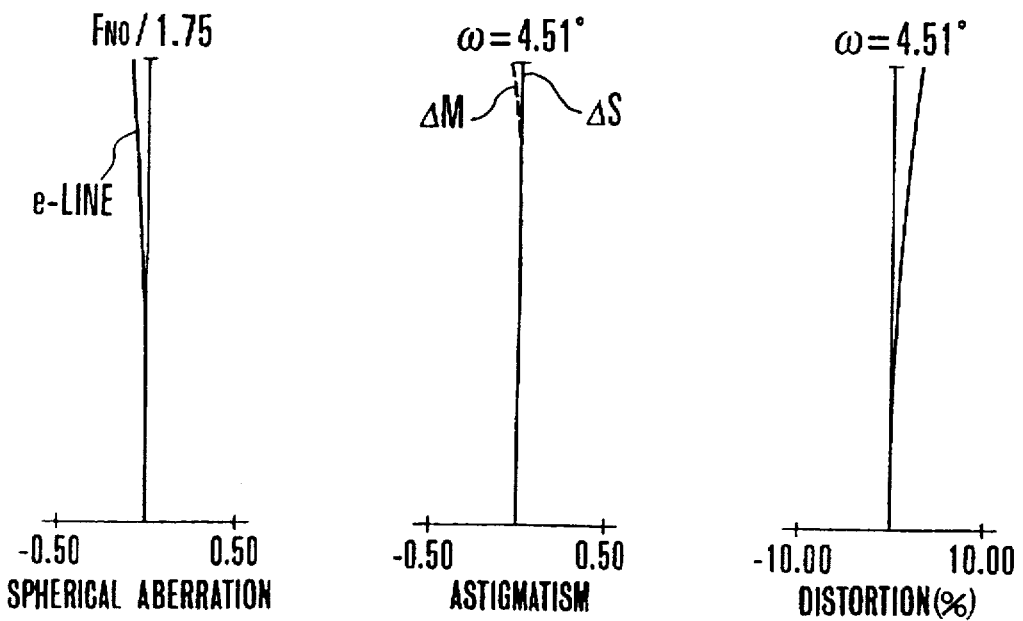
FIGS. 39A, 39B, and 39C are graphic representations of the aberrations of the numerical example 7 of the invention when the focal length is 69.78 mm and the object distance is 10 m.
Figures 42A, 42B, 42C:
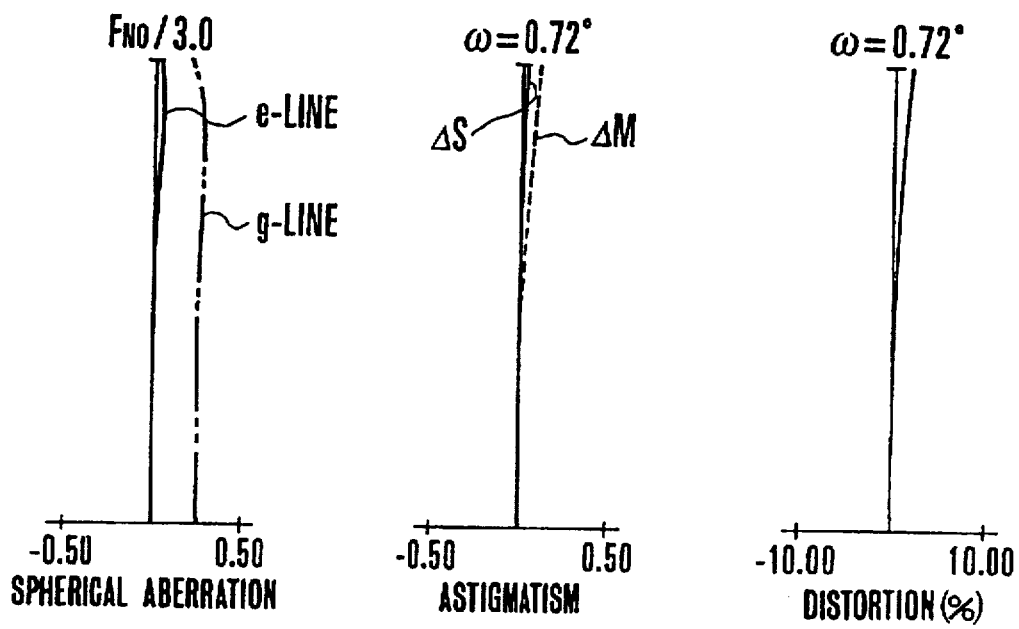
FIGS. 42A, 42B, and 42C are graphic representations of the aberrations of the numerical example 7 of the invention when the focal length is 440 mm and the object distance is 4 m.
Figures 43A, 43B, 43C:
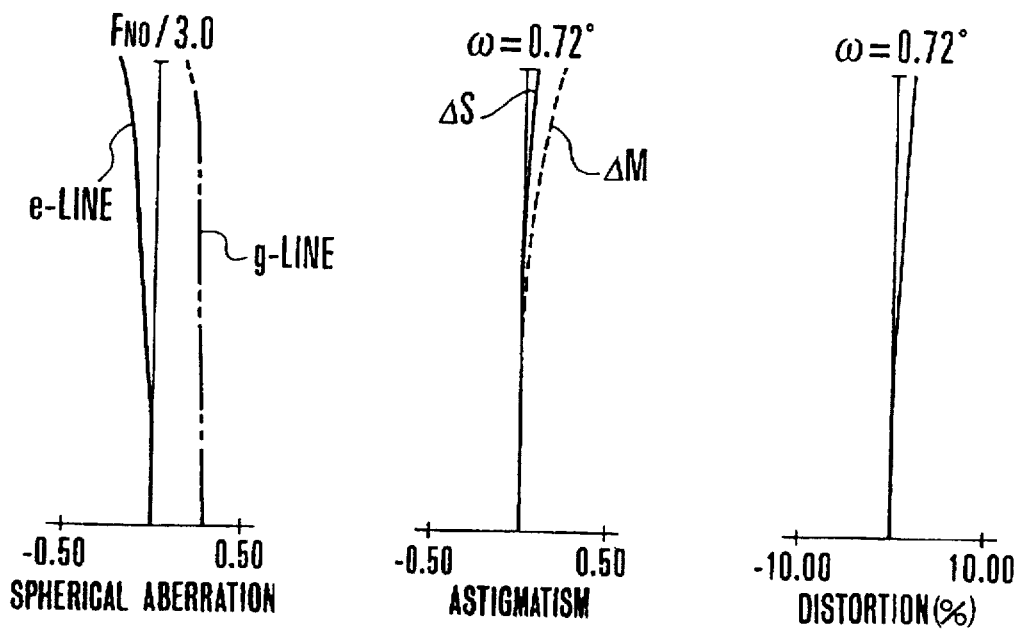
FIGS. 43A, 43B, and 43C are graphic representations of the aberrations of the numerical example 7 of the invention when the focal length is 440 mm and the object distance is 2.5 m.
Figures 44A, 44B, 44C:
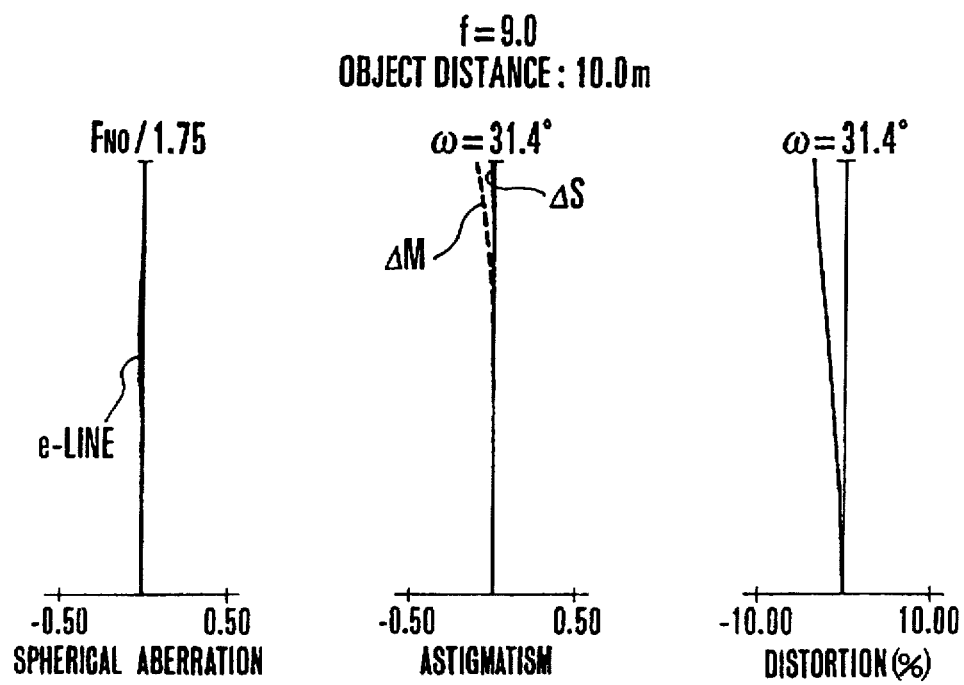
FIGS. 44A, 44B, and 44C are graphic representations of the aberrations of the numerical example 8 of the invention when the focal length is 9 mm and the object distance is 10 m.
Figures 45A, 45B, 45C:
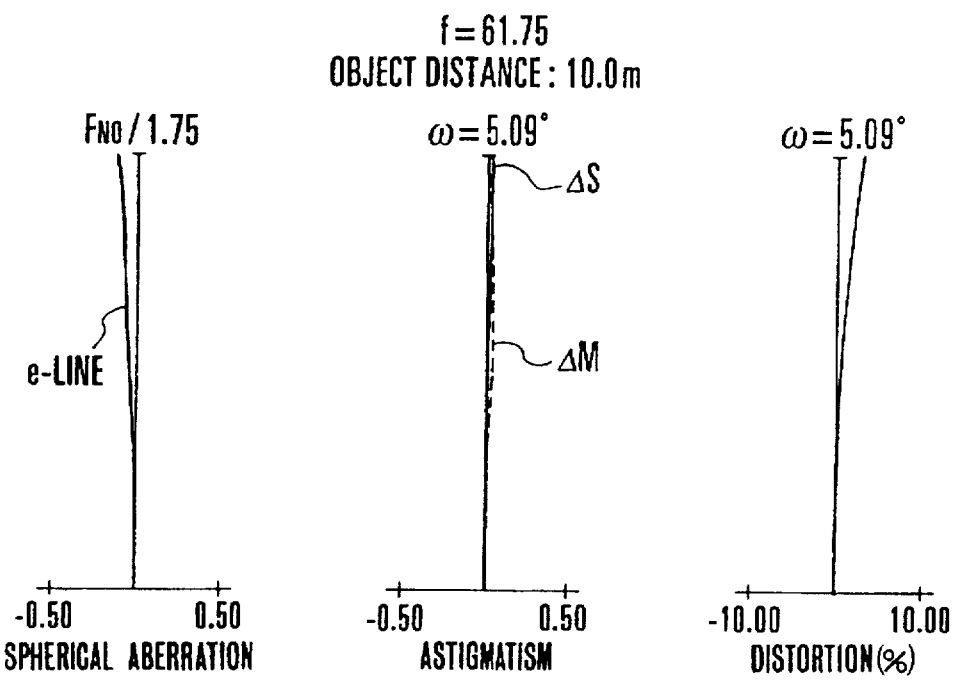
FIGS. 45A, 45B, and 45C are graphic representations of the aberrations of the numerical example 8 of the invention when the focal length is 61.75 mm and the object distance is 10 m.
Figures 46A, 46B, 46C:
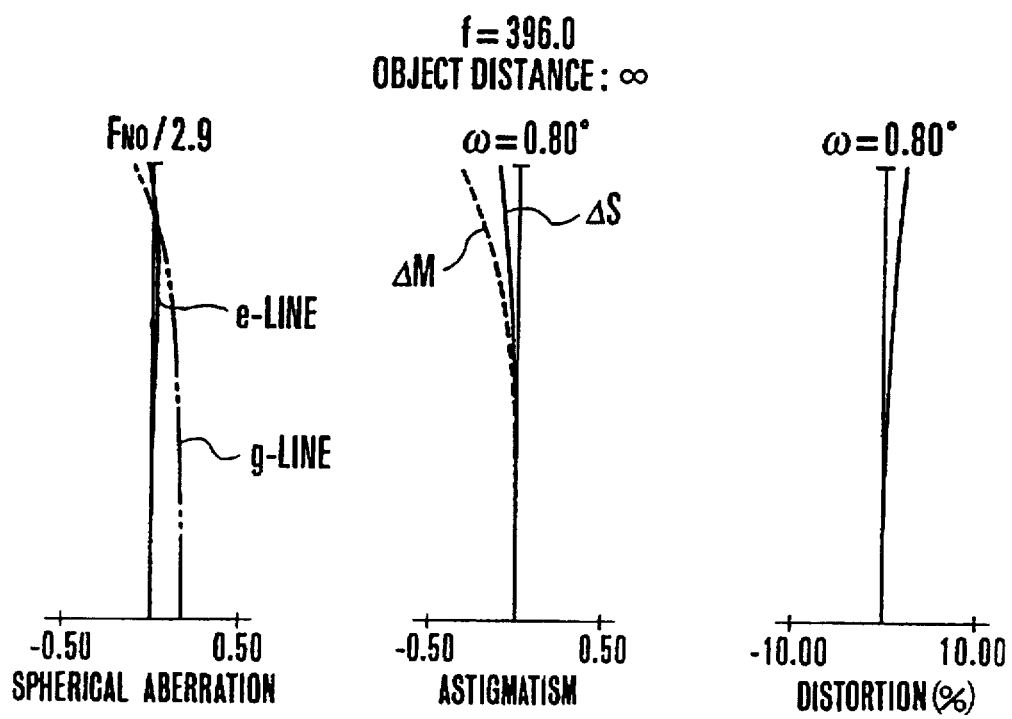
FIGS. 46A, 46B, and 46C are graphic representations of the aberrations of the numerical example 8 of the invention when the focal length is 396 mm and the object distance is infinite.
Figures 47A, 47B, 47C:
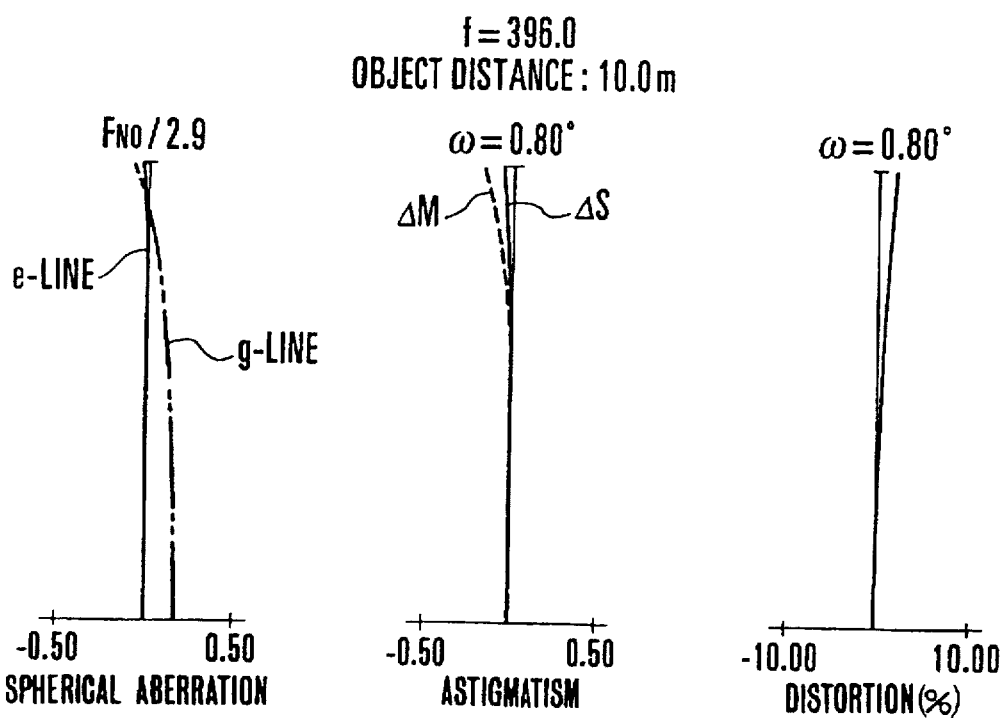
FIGS. 47A, 47B, and 47C are graphic representations of the aberrations of the numerical example 8 of the invention when the focal length is 396 mm and the object distance is 10 m.
Figure 52:
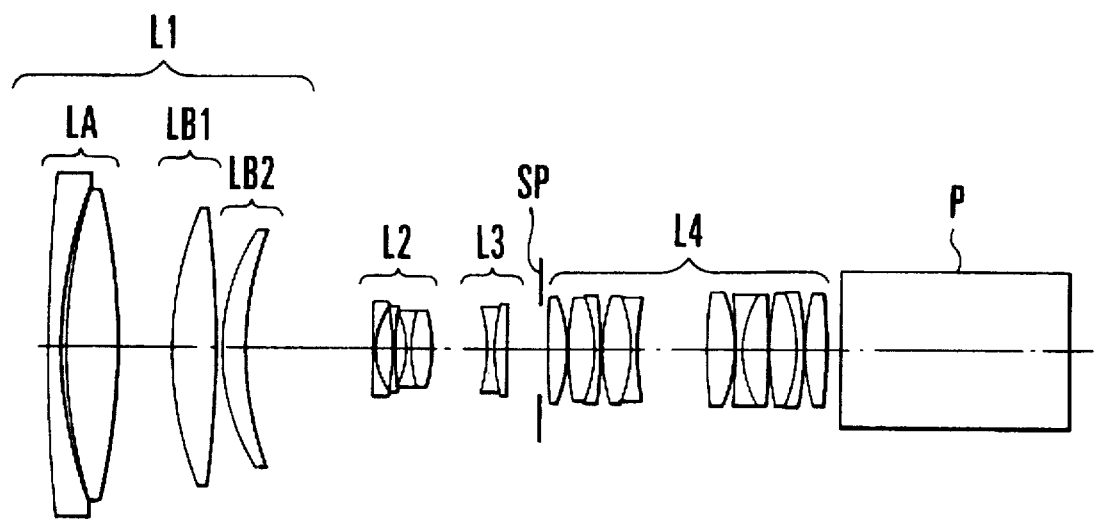
FIG. 52 is a lens block diagram of a numerical example 9 of the invention.
Figure 53:
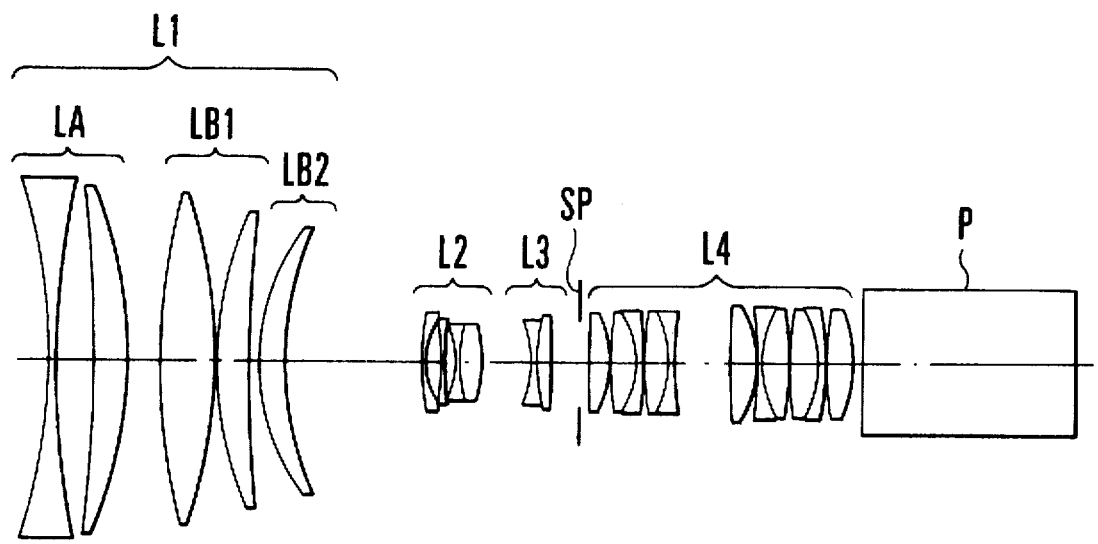
FIG. 53 is a lens block diagram of a numerical example 10 of the invention.
Figure 54:
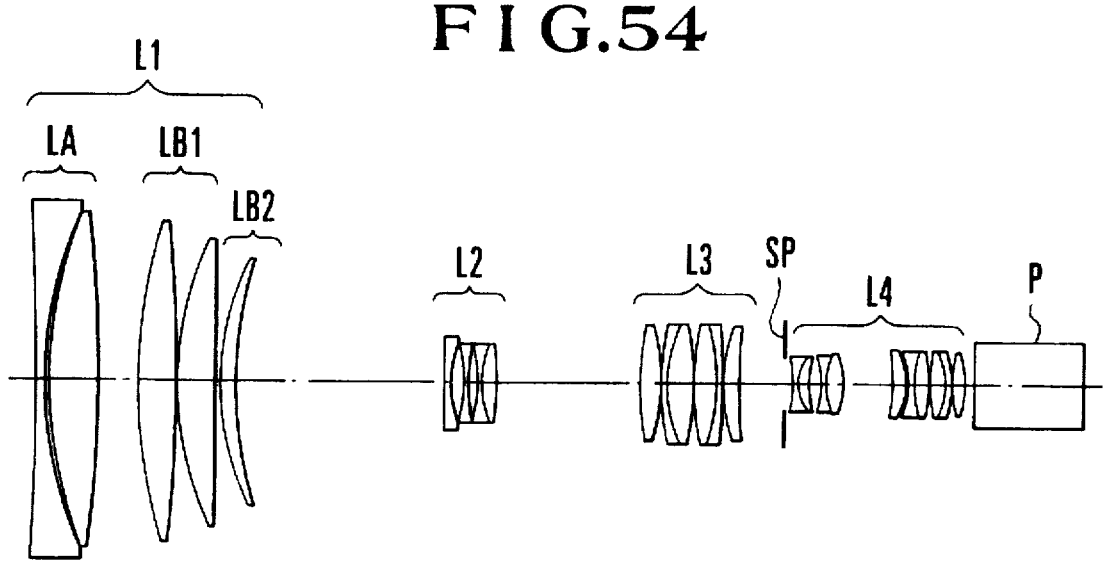
FIG. 54 is a lens block diagram of a numerical example 11 of the invention.
Figure 55:
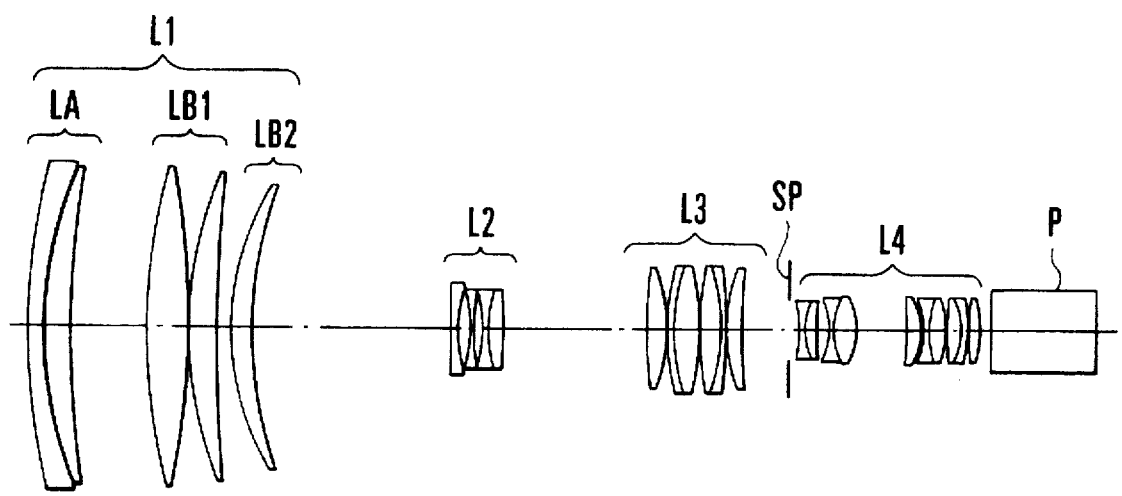
FIG. 55 is a lens block diagram of a numerical example 12 of the invention.

The present embodiment is next explained in connection with the heights of incidence of the light ray in either focusing position as compared with the prior known focusing method shown in FIGS. 18 and 20.

In the present embodiment, when focusing is effected down to the minimum object distance, the front lens sub-unit and the rear lens sub-unit are made closer to each other than when focused on an infinitely distant object. In this event, the heights of incidence are as follows:

$$H_B'-H_A'=h_m'-h_f'=h_b'-h_a'$$

When to focus on an infinitely distant object, the front lens sub-unit moves toward the object side from the position for the minimum object distance. Therefore, the heights of incidence become as follows:

$$H_B-H_A>h_m-h_f>h_b-h_a$$

In the present embodiment, the value of the distance $(H_B-H_A)$ for infinite focusing is made large so that it differs from the value of the distance $(H_B'-H_A')$ for near focusing by a decreased amount.

The difference between the values for infinite and near focusing of each of the spherical aberration coefficient I and chromatic aberration coefficient L is thus decreased. This leads to reduce the range of variation of spherical aberration and longitudinal chromatic aberration with focusing in the terms of lower order for aberration correction.

Next, in the present embodiment, as focusing goes on, the front lens sub-unit in the first lens unit depicts a locus as is described below.

In a case where, in the zooming positions of the telephoto side, as focusing is effected from an infinitely distant object to the M.O.D., spherical aberration and longitudinal chromatic aberration both vary monotonously from the over-corrected to the under-corrected, the front lens sub-unit is moved so that the height of incidence $H_A$ of the paraxial ray on the front lens sub-unit varies monotonously. In other words, when focusing down from an infinitely distant object to the M.O.D., it is moved toward the image side monotonously.

In another case where, on the telephoto side, as focusing goes from one of the terminal ends of the range of movement to the other, spherical aberration varies so as to have an inflection point, for example, from the under-corrected past the over-corrected to the under-corrected, the front lens sub-unit is moved in such a way that the height of incidence $H_A$ of the paraxial ray on the front lens sub-unit varies so as to have an inflection point. In other words, the front lens sub-unit moves axially, while depicting a locus convex toward the object side with the vertex at a point coincident with the inflection point.

The foregoing features suffice for obtaining a high optical performance. To maintain good stability of high optical performance throughout the entire focusing range and throughout the entire zooming range, the present embodiment sets forth additional conditions as follows.

The aforesaid front lens sub-unit includes a negative first lens and a positive second lens, or at least independent two lenses. In here, the refractive power of the front lens sub-unit is denoted by $\phi A$ and the total sum of ratios of the refractive power $\phi Ai$ and the Abbe number $vAi$ of the material of the i-th lens in the front lens sub-unit is denoted by $\Sigma A=\phi Ai/vAi$. The aforesaid rear lens sub-unit includes a positive first lens and a positive second lens, or at least two independent lenses. In here, the refractive power of the rear lens sub-unit is denoted by $\phi B$ and the total sum of ratios of the refractive power $\phi Bi$ and the Abbe number $vBi$ of the material of the i-th lens in the rear lens sub-unit is denoted by $\Sigma B=\phi Bi/vBi$. The axial difference between the focusing positions for an infinitely distant object and an object at the minimum distance of the front lens sub-unit or the rear lens sub-unit is denoted by Δd, or ΔX, respectively. The first lens unit when focused on an infinitely distant object has a refractive power φ.

The values of these parameters lie within the ranges given by the following conditions:

$$0.3 < \phi A/\phi < -0.02 \quad (8)$$

$$0.018 < \Sigma A/\phi < -0.008 \quad (9)$$

$$1.15 < \Sigma A/\Sigma B < -0.75 \quad (10)$$

$$0.08 < |\Delta d/\Delta X| < 1.10 \quad (11)$$

In the present embodiment, the on-axial light beam passing through the zoom lens is highest on the first lens unit in the telephoto end. Moreover, the aberrations produced from the first lens unit are enlarged by the magnifying powers of the second lens unit and those that follow. For the telephoto end, therefore, the spherical aberration and longitudinal chromatic aberration in the image plane depend largely on the produced amount of aberrations from the first lens unit. Particularly, to the zoom lenses for broadcasting, there are demanded high specs and high performance. The necessity then arises to achieve great increase of the focal length for the telephoto end and of the relative aperture. To meet the demands, therefore, the height of the on-axial light beam is caused to increase extremely.

Good stability of correction of spherical aberration, chromatic aberrations and others against zooming and focusing is, therefore, difficult to maintain. If this is coped with the routine design such that the power of each lens unit is weakened or that the number of lens elements in each lens unit is increased, the entire lens system will increase in size and the weight and production cost will increase too.

On this account, the front lens sub-unit of the first lens unit is constructed with at least two lenses, of which the first lens has a negative refracting surface and is negative in refractive power and is followed, after a relatively short air space, by the second lens of positive refractive power. By making the provision of this air space, the degree of freedom of the design is increased to decrease the variation of aberrations. Thus, the correction of all aberrations becomes easier to control in good balance. Further, the rear principal point of the first lens unit is pulled forward to thereby assure minimization of the size of the entire lens system.

The rear lens sub-unit is so constructed as to include at least two positive lenses. Thus, the produced amount of aberrations is minimized and, at the same time, the residual of aberrations of the front lens sub-unit is canceled out. Particularly, in a case where the first lens is of bi-convex form and the second lens is of meniscus form convex toward the object side, the produced amount of spherical aberration is minimized in the rear lens sub-unit by itself alone. At the same time, distortion and astigmatism, too, are corrected well.

The technical significance of each of the above-described conditions (8) to (11) is explained below.

The inequalities of condition (8) lay limitations on the proportion of the power of the front lens sub-unit to the power of the first lens unit. When the lower limit of the condition (8) is exceeded, as this means that the power of the front lens sub-unit is too strong, aberrations such as spherical aberration and comatic aberration of higher order are liable to be produced. To correct the residual of these higher order aberrations, the rear lens sub-unit, too, must have its power made to increase largely. So, the radii of curvature of its lens surfaces are decreased. As a result, it becomes difficult to correct the variation of aberrations with zooming and focusing. When the upper limit is exceeded, as this means that almost no power is approached, a smaller difference between the heights of the paraxial ray of light for the front lens sub-unit and the rear lens sub-unit results when focused on an infinitely distant object. This makes it more difficult to well correct the variation of spherical aberration and longitudinal chromatic aberration with focusing.

This variation of aberrations becomes possible to correct somewhat well, when the separation between the front lens sub-unit and the rear lens sub-unit is widened. However, the total length of the entire lens system is then caused to elongate objectionably.

The factor in the condition (9) represents the normalization of the achromatic condition by the power of the first lens unit. The factor in the condition (10) defines the contributions of the front and rear lens sub-units to the acrhomatic condition, since the first lens unit is divided into these sub-units. The conditions (9) and (10) cooperate to maintain the variation of longitudinal chromatic aberration in good balance throughout the entire focusing range.

On the achromatic condition for the front lens sub-unit and the rear lens sub-unit, $\Sigma A \approx \Sigma B \approx 0$ is desirable. However, if the size of the first lens unit is taken into account, the rear lens sub-unit is usually constructed with positive lenses only. The achromatic condition for the rear lens sub-unit is always to have a positive value. To cancel this out, the condition (9) gives a range of slightly negative values. When the lower limits of the conditions (9) and (10) are exceeded, over-correction results. Thus, longitudinal chromatic aberration remains over-corrected throughout the entire focusing range. When the upper limits are exceeded, conversely, under-correction results. Thus, longitudinal chromatic aberration is left under-corrected.

The inequalities of condition (11) are concerned with the ratio of the axial differences from the positions for an infinitely distant object of the front lens sub-unit and the rear lens sub-unit to the positions for an object at the minimum distance as they move with focusing, and have an aim chiefly to correct spherical aberration and longitudinal chromatic aberration in good balance throughout the entire focusing range. When the lower limit of the condition (11) is exceeded, it becomes difficult to reduce the variation of spherical aberration and longitudinal chromatic aberration with focusing. When the upper limit is exceeded, the total length of the entire lens system comes to increase objectionably.

It will be appreciated from the foregoing that in the second embodiment of the invention, the first lens unit is divided into two lens sub-units, namely the front lens sub-unit and the rear lens sub-unit, so that the range of variation of aberrations with focusing can be suppressed to a minimum. In addition, the movements of all the lens sub-units are regulated, and the rules for the lens arrangement, the power shares and the achromatism shares are set forth. When these features are fulfilled, good stability of correction of mainly spherical aberration and longitudinal chromatic aberration is maintained throughout the entire focusing range.

Next, the form and the construction and arrangement of the constituent lenses of numerical examples 5 to 8 of zoom lenses of the invention are described below.

FIGS. 22(A) to 22(D) are longitudinal section views of the numerical example 5 of the invention in the telephoto end when the object distance is infinite, 3.0, 1.3 and 0.9 (M.O.D.) meters, respectively.

In the numerical example 5, the zoom ratio is 14. Lens surfaces R1 to R8 form a first lens unit of positive refractive power. Of these, the surfaces R1 to R4 are assigned to the front lens sub-unit of negative refractive power and the surfaces R5 to R8 to the rear lens sub-unit of positive refractive power.

Lens surfaces R9 to R15 form a second lens unit of negative refractive power for varying the focal length. When zooming from the wide-angle end to the telephoto end, it moves toward the image side monotonously while its lateral magnification passes −1 times midway. Lens surfaces R16 to R18 form a third lens unit for compensating for the image shift with zooming. When zooming from the wide-angle end to the telephoto end, it moves in a locus convex toward the object side. A surface R19 (SP) indicates a stop. Lens surfaces R20 to R37 form a fourth lens unit having the image forming function. Surfaces R38 and R39 define a glass block equivalent to the color separation prism, trimming filter or the like.

In the numerical example 5, when focusing down from an infinitely distant object to the M.O.D., the front lens sub-unit moves toward the image side monotonously, while the rear lens sub-unit moves toward the object side monotonously.

Again, in the numerical example 5, for the M.O.D. of 0.9 meters, $\phi_A/\phi=-0.022$. The power of the front lens sub-unit is thus decreased to decrease the produced amount of aberrations. The rear lens sub-unit is constructed with the necessary minimum number of lenses, or only two positive lenses and cancels the produced aberrations from the front lens sub-unit. Moreover, the movement of the front lens sub-unit is increased to $|\Delta d/\Delta X|=0.868$. In turn, the distance $(H_B-H_A)$ is increased to decrease the variation of spherical aberration and longitudinal chromatic aberration with focusing.

As can be seen from FIGS. 28A to 31C, the variation of longitudinal chromatic aberration is left more or less appreciable, but spherical aberration is well corrected at or near the M.O.D.

FIGS. 23(A) to 23(D) are longitudinal section views of the numerical example 6 of the zoom lens of the invention in the telephoto end when the object distance is infinite, 3.0, 1.3 and 0.8 (M.O.D.) meters, respectively.

In this numerical example 6, the zoom ratio is 14. Lens surfaces R1 to R10 form a first lens unit of positive refractive power. Of these, the lens surfaces R1 to R4 are assigned to the front lens sub-unit of negative refractive power and the lens surfaces R5 to R10 to the rear lens sub-unit of positive refractive power.

Lens surfaces R11 to R17 form a second lens unit of negative refractive power for varying the focal length. When zooming from the wide-angle end to the telephoto end, it moves toward the image side monotonously while its lateral magnification passes −1x midway. Lens surfaces R18 to R20 form a third lens unit for compensating for the image shift with zooming. It moves in a locus convex toward the object side over the range of from the wide-angle end to the telephoto end. A surface R21 (SP) indicates a stop. Lens surfaces R22 to R39 form a fourth lens unit having the image forming function. Surfaces R40 and R41 define a glass block equivalent to the color separation prism, trimming filter or the like.

In this numerical example 6, when focusing from an infinitely distant object to the M.O.D., the front lens sub-unit moves toward the image side monotonously, while the rear lens sub-unit moves toward the object side monotonously.

Again, in this numerical example 6, as compared with the numerical example 5, the M.O.D. is shorter or 0.8 meters and the maximum angle of field is widened to f=9.0 mm in shortest focal length. So, the so-called "retro" ratio is made to increase, thus suppressing the increase of the lens diameter due to the shortening of the M.O.D. and the widening of the maximum angle of field. Along with this, the power of the front lens sub-unit is increased to $\phi_A/\phi=-0.263$. In turn, the distance $(H_B-H_A)$ too is increased. To cancel the increased aberrations the front lens sub-unit of increased power produces, three positive lenses are used in the rear lens sub-unit. The variation of spherical aberration and longitudinal chromatic aberration with focusing is thus reduced. In this case, $\Sigma A/\phi=-0.0173$ and $\Sigma A/\Sigma B=-1.078$.

As can be seen from FIG. 34A to FIG. 37C, spherical aberration and longitudinal chromatic aberration both are corrected well.

FIGS. 24(A) to 24(D) are longitudinal section views of the numerical example 7 of the zoom lens of the invention in the telephoto end when the object distance is infinite, 10.0, 4 and 2.5 (M.O.D.) meters, respectively.

In this numerical example 7, the zoom ratio is 44. Lens surfaces R1 to R10 form a first lens unit of positive refractive power. Of these, the lens surfaces R1 to R4 are assigned to the front lens sub-unit of negative refractive power and the lens surfaces R5 to R10 to the positive rear lens sub-unit.

Lens surfaces R11 to R17 form a second lens unit of negative refractive power for varying the focal length. When zooming from the wide-angle end to the telephoto end, it moves toward the image side monotonously while its lateral magnification passes −1x midway. Lens surfaces R18 to R27 form a third lens unit of positive refractive power having the function of varying the focal length and the function of compensating for the image shift with zooming. It moves toward the object side monotonously, while its lateral magnification passes −1x midway. A surface R28 (SP) indicates a stop. Lens surfaces R29 to R44 form a fourth lens unit having the image forming function. Surfaces R45 and R46 define a glass block equivalent to the color separation prism, trimming filter or the like.

In this numerical example 7, the zoom lens has a very high zoom ratio of 44 and a longest focal length of 440 mm. Nonetheless, the first lens unit has to be well corrected for spherical aberration and longitudinal chromatic aberration. For this purpose, the front lens sub-unit is constructed with one positive and one negative lenses and the rear lens sub-unit is constructed with three positive lenses. Thus, the aberration correction is made to share by these lenses.

In this numerical example 7, when focusing down from an infinitely distant object to the M.O.D., the rear lens sub-unit moves toward the object side monotonously, while the front lens sub-unit moves in a locus convex toward the object side. In more detail, the front lens sub-unit moves toward the object side in a region of from infinity to 10 meters and then moves toward the image side in a region of from 10 to 2.5 meters.

Again, in this numerical example 7, despite the very long focal length for the telephoto end of f=440 mm, the relative aperture too is increased to 3.0 in F-number. Therefore, the aberrations the first lens unit produces have to minimize. So, the power of the front lens sub-unit is decreased to $\phi_A=-0.023$, thus suppressing the aberrations from increasing. Along with this, the movement of the front lens sub-unit is increased to $|\Delta d/\Delta X|=1.013$. In turn, the distance $(H_B-H_A)$ is increased to thereby decrease the variation of spherical aberration and longitudinal chromatic aberration with focusing.

As can be seen from FIG. 40A to FIG. 43C, the variation of spherical aberration and longitudinal chromatic aberration is good over the entire focusing range.

FIGS. 25(A) to 25(D) are longitudinal section views of the numerical example 8 of the zoom lens of the invention in the telephoto end when the object distance is infinite, 10.0, 3.0 and 2.0 (M.O.D.) meters, respectively.

In this numerical example 8, the zoom ratio is 44. Though similar in construction to the numerical example 7, the focal length for the wide-angle end is shifted to wider angles of field or 9.0 mm. The M.O.D. too is shortened to 2.0 meters.

In this numerical example 8, similarly to the numerical example 7, the front lens sub-unit moves toward the object side in a region of from infinity to 10 meters and then moves toward the image side in a region of from 10 to 2.0 meters. As compared with the numerical example 7, the maximum angle of field is widened and the M.O.D. is shortened. To achieve these, the retro ratio of the first lens unit is increased, thus suppressing the lens diameter from increasing. Along with this, the power of the front lens sub-unit is increased to $\phi_A/\phi = -0.24$. In turn, the distance $(H_B - H_A)$ is increased to thereby decrease the variation of spherical aberration and longitudinal chromatic aberration with focusing. In this case, $\Sigma A/\phi = -0.0122$ and $\Sigma A/\Sigma B = -0.913$.

As can be seen from FIG. 46A to FIG. 49C, spherical aberration and longitudinal chromatic aberration are more or less over-corrected at or near the M.O.D., but good as a whole.

Next, the numerical data for the numerical examples 5 to 8 are shown in the following tables, where R1 is the radius of curvature of the i-th lens surface, when counted from the object side, Di is the i-th axial lens thickness or air separation, when counted from the object side, and Ni and vi are respectively the refractive index and Abbe number for the spectral d-line of the glass of the i-th lens element, when counted from the object side. The values of the factors in the above-described conditions (8) to (11) for the numerical examples 5 to 8 are listed in Table-6.

Numerical Example 5:

f = 9.5–133.0    Fno. = 1:1.9–2.1    2ω = 60.1°–4.74°

| | | | |
|---|---|---|---|
| R 1 = 724.84 | D 1 = 2.50 | N 1 = 1.81265 | ν 1 = 25.4 |
| R 2 = 108.23 | D 2 = 2.84 | | |
| R 3 = 143.62 | D 3 = 12.53 | N 2 = 1.43496 | ν 2 = 95.1 |
| R 4 = −152.05 | D 4 = 12.20 | | |
| R 5 = 87.51 | D 5 = 10.64 | N 3 = 1.49845 | ν 3 = 81.6 |
| R 6 = −229.67 | D 6 = 0.15 | | |
| R 7 = 50.93 | D 7 = 5.75 | N 4 = 1.69979 | ν 4 = 55.5 |
| R 8 = 85.79 | D 8 = Variable | | |
| R 9 = 370.85 | D 9 = 1.00 | N 5 = 1.88814 | ν 5 = 40.8 |
| R10 = 19.78 | D10 = 3.41 | | |
| R11 = −154.42 | D11 = 0.80 | N 6 = 1.80811 | ν 6 = 46.6 |
| R12 = 107.19 | D12 = 3.56 | | |
| R13 = −19.33 | D13 = 0.80 | N 7 = 1.77621 | ν 7 = 49.6 |
| R14 = 30.74 | D14 = 4.36 | N 8 = 1.85501 | ν 8 = 23.9 |
| R15 = −38.62 | D15 = Variable | | |
| R16 = −30.99 | D16 = 0.90 | N 9 = 1.77621 | ν 9 = 49.6 |
| R17 = 37.64 | D17 = 3.35 | N10 = 1.81265 | ν10 = 25.4 |
| R18 = −466.74 | D18 = Variable | | |
| R19 = (Stop) | D19 = 1.85 | | |
| R20 = 41537.97 | D20 = 4.59 | N11 = 1.72794 | ν11 = 38.0 |
| R21 = −37.34 | D21 = 0.10 | | |
| R22 = 61.38 | D22 = 6.77 | N12 = 1.50014 | ν12 = 65.0 |
| R23 = −30.45 | D23 = 1.40 | N13 = 1.88814 | ν13 = 40.8 |
| R24 = −97.37 | D24 = 0.10 | | |
| R25 = 41.81 | D25 = 7.56 | N14 = 1.51356 | ν14 = 51.0 |
| R26 = −38.58 | D26 = 1.50 | N15 = 1.80811 | ν15 = 46.6 |
| R27 = 92.95 | D27 = 15.78 | | |
| R28 = 201.91 | D28 = 6.60 | N16 = 1.48915 | ν16 = 70.2 |
| R29 = −37.26 | D29 = 0.15 | | |
| R30 = −144.87 | D30 = 1.50 | N17 = 1.83932 | ν17 = 37.2 |
| R31 = 33.24 | D31 = 6.64 | N18 = 1.48915 | ν18 = 70.2 |
| R32 = −91.55 | D32 = 0.15 | | |
| R33 = 112.24 | D33 = 6.90 | N19 = 1.51314 | ν19 = 60.5 |
| R34 = −32.94 | D34 = 1.40 | N20 = 1.83932 | ν20 = 37.2 |
| R35 = −67.83 | D35 = 0.15 | | |
| R36 = 55.78 | D36 = 5.37 | N21 = 1.48915 | ν21 = 70.2 |
| R37 = −126.67 | D37 = 3.40 | | |
| R38 = ∞ | D38 = 55.50 | N22 = 1.51825 | ν22 = 64.2 |
| R39 = ∞ | | | |

| Variable | Focal Length | | |
|---|---|---|---|
| Separations | 9.50 | 30.04 | 133.00 |
| D 8 | 0.79 | 29.95 | 47.39 |
| D15 | 48.77 | 14.36 | 3.54 |
| D18 | 3.30 | 8.55 | 1.93 |

| Object Distance (m) | Focusing Movement of Rear Sub-Unit (mm) | D4 Separation (mm) |
|---|---|---|
| Infinite | 0 | 12.20 |
| 3.0 | −1.71 | 8.99 |
| 1.3 | −4.06 | 3.14 |
| 0.9 | −5.99 | 1.00 |

Numerical Example 6:

f = 9.0–126.0    Fno. = 1:1.9–2.1    2ω = 62.9°–5.00°

| | | | |
|---|---|---|---|
| R 1 = −268.28 | D 1 = 2.50 | N 1 = 1.76859 | ν 1 = 26.5 |
| R 2 = 155.18 | D 2 = 3.25 | | |
| R 3 = 218.67 | D 3 = 9.08 | N 2 = 1.43496 | ν 2 = 95.1 |
| R 4 = −245.12 | D 4 = 13.18 | | |
| R 5 = 273.95 | D 5 = 9.66 | N 3 = 1.49845 | ν 3 = 81.6 |
| R 6 = −152.54 | D 6 = 0.15 | | |
| R 7 = 110.93 | D 7 = 8.65 | N 4 = 1.49845 | ν 4 = 81.6 |
| R 8 = −470.97 | D 8 = 0.15 | | |
| R 9 = 50.11 | D 9 = 6.22 | N 5 = 1.69979 | ν 5 = 55.5 |
| R10 = 83.23 | D10 = Variable | | |
| R11 = 52.49 | D11 = 1.00 | N 6 = 1.88814 | ν 6 = 40.8 |
| R12 = 16.08 | D12 = 4.89 | | |
| R13 = −184.06 | D13 = 0.80 | N 7 = 1.80811 | ν 7 = 46.6 |
| R14 = 312.48 | D14 = 3.84 | | |
| R15 = −19.58 | D15 = 0.80 | N 8 = 1.77621 | ν 8 = 49.6 |
| R16 = 24.90 | D16 = 4.63 | N 9 = 1.85501 | ν 9 = 23.9 |
| R17 = −52.52 | D17 = Variable | | |
| R18 = −25.33 | D18 = 0.90 | N10 = 1.77621 | ν10 = 49.6 |
| R19 = 78.18 | D19 = 2.71 | N11 = 1.81265 | ν11 = 25.4 |
| R20 = −135.54 | D20 = Variable | | |
| R21 = (Stop) | D21 = 2.99 | | |
| R22 = 192.33 | D22 = 5.85 | N12 = 1.72794 | ν12 = 38.0 |
| R23 = −29.38 | D23 = 0.10 | | |
| R24 = 62.90 | D24 = 7.03 | N13 = 1.48915 | ν13 = 70.2 |
| R25 = −25.31 | D25 = 1.40 | N14 = 1.88814 | ν14 = 40.8 |
| R26 = −133.09 | D26 = 0.10 | | |
| R27 = 54.58 | D27 = 7.19 | N15 = 1.51678 | ν15 = 54.7 |
| R28 = −27.97 | D28 = 1.50 | N16 = 1.82017 | ν16 = 46.6 |
| R29 = 109.75 | D29 = 20.13 | | |
| R30 = 432.94 | D30 = 6.58 | N17 = 1.53430 | ν17 = 48.9 |
| R31 = −35.06 | D31 = 0.15 | | |
| R32 = −225.50 | D32 = 1.50 | N18 = 1.83932 | ν18 = 37.2 |
| R33 = 32.91 | D33 = 5.88 | N19 = 1.48915 | ν19 = 70.2 |
| R34 = −180.72 | D34 = 0.15 | | |
| R35 = 93.34 | D35 = 6.22 | N20 = 1.48915 | ν20 = 70.2 |
| R36 = −34.43 | D36 = 1.40 | N21 = 1.83932 | ν21 = 37.2 |
| R37 = −66.84 | D37 = 0.15 | | |
| R38 = 60.13 | D38 = 4.88 | N22 = 1.48915 | ν22 = 70.2 |
| R39 = −100.76 | D39 = 3.40 | | |
| R40 = ∞ | D40 = 55.50 | N23 = 1.51825 | ν23 = 64.2 |
| R41 = ∞ | | | |

| Variable | Focal Length | | |
|---|---|---|---|
| Separations | 9.00 | 28.46 | 126.00 |
| D10 | 0.90 | 29.87 | 47.33 |
| D17 | 47.50 | 13.91 | 3.56 |
| D20 | 3.30 | 7.92 | 0.81 |

| Object Distance (m) | Focusing Movement of Rear Sub-Unit (mm) | D4 Separation (mm) |
|---|---|---|
| Infinite | 0 | 13.18 |
| 3.0 | −1.77 | 10.37 |
| 1.3 | −4.42 | 5.51 |
| 0.8 | −7.72 | 0.45 |

Numerical Example 7:

$f = 10.0–440.0$    Fno. = 1:1.75–3.0    $2\omega = 57.6°–1.43°$

| | | | |
|---|---|---|---|
| R 1 = 351.25 | D 1 = 5.50 | N 1 = 1.74618 | ν 1 = 28.3 |
| R 2 = 176.54 | D 2 = 0.70 | | |
| R 3 = 173.22 | D 3 = 16.10 | N 2 = 1.43496 | ν 2 = 95.1 |
| R 4 = 783.98 | D 4 = 30.06 | | |
| R 5 = 428.99 | D 5 = 11.36 | N 3 = 1.43496 | ν 3 = 95.1 |
| R 6 = −1169.74 | D 6 = 0.30 | | |
| R 7 = 205.95 | D 7 = 14.38 | N 4 = 1.43496 | ν 4 = 95.1 |
| R 8 = 2658.30 | D 8 = 0.30 | | |
| R 9 = 138.07 | D 9 = 14.07 | N 5 = 1.49845 | ν 5 = 81.6 |
| R10 = 386.01 | D10 = Variable | | |
| R11 = 2124.62 | D11 = 2.00 | N 6 = 1.82017 | ν 6 = 46.6 |
| R12 = 43.15 | D12 = 5.13 | | |
| R13 = −193.71 | D13 = 1.80 | N 7 = 1.77621 | ν 7 = 49.6 |
| R14 = 60.83 | D14 = 5.06 | | |
| R15 = −70.86 | D15 = 1.80 | N 8 = 1.77621 | ν 8 = 49.6 |
| R16 = 48.78 | D16 = 6.62 | N 9 = 1.93306 | ν 9 = 21.3 |
| R17 = −304.69 | D17 = Variable | | |
| R18 = 209.91 | D18 = 8.62 | N10 = 1.49845 | ν10 = 81.6 |
| R19 = −110.14 | D19 = 0.30 | | |
| R20 = 169.61 | D20 = 2.50 | N11 = 1.81265 | ν11 = 25.4 |
| R21 = 80.28 | D21 = 11.39 | N12 = 1.48915 | ν12 = 70.2 |
| R22 = −148.81 | D22 = 0.20 | | |
| R23 = 136.18 | D23 = 10.25 | N13 = 1.62032 | ν13 = 63.4 |
| R24 = −102.91 | D24 = 2.50 | N14 = 1.85501 | ν14 = 23.9 |
| R25 = −257.73 | D25 = 0.20 | | |
| R26 = 84.20 | D26 = 6.98 | N15 = 1.48915 | ν15 = 70.2 |
| R27 = 362.30 | D27 = Variable | | |
| R28 = (Stop) | D28 = 3.37 | | |
| R29 = −62.09 | D29 = 1.80 | M16 = 1.79013 | ν16 = 44.2 |
| R30 = 24.88 | D30 = 5.75 | N17 = 1.81265 | ν17 = 25.4 |
| R31 = 121.72 | D31 = 6.20 | | |
| R32 = −31.02 | D32 = 1.60 | N18 = 1.73234 | ν18 = 54.7 |
| R33 = 32.37 | D33 = 10.58 | N19 = 1.59911 | ν19 = 39.2 |
| R34 = −28.24 | D34 = 24.00 | | |
| R35 = −206.06 | D35 = 6.89 | N20 = 1.48915 | ν20 = 70.2 |
| R36 = −31.47 | D36 = 0.20 | | |
| R37 = −53.12 | D37 = 2.20 | N21 = 1.79013 | ν21 = 44.2 |
| R38 = 42.38 | D38 = 7.83 | N22 = 1.50349 | ν22 = 56.4 |
| R39 = −50.80 | D39 = 1.10 | | |
| R40 = 113.61 | D40 = 7.33 | N23 = 1.55099 | ν23 = 45.8 |
| R41 = −29.41 | D41 = 2.20 | N24 = 1.81265 | ν24 = 25.4 |
| R42 = −140.30 | D42 = 0.20 | | |
| R43 = 71.53 | D43 = 5.33 | N25 = 1.51977 | ν25 = 52.4 |
| R44 = −67.54 | D44 = 5.00 | | |
| R45 = ∞ | D45 = 50.00 | N26 = 1.51825 | ν26 = 64.2 |
| R46 = ∞ | | | |

| Variable Separations | Focal Length | | |
|---|---|---|---|
| | 10.00 | 69.78 | 440.00 |
| D10 | 1.61 | 91.61 | 120.62 |
| D17 | 178.20 | 69.01 | 2.23 |
| D27 | 3.30 | 22.49 | 60.26 |

| Object Distance (m) | Focusing Movement of Rear Sub-Unit (mm) | D4 Separation (mm) |
|---|---|---|
| Infinite | 0 | 30.06 |
| 10.0 | −3.39 | 28.45 |
| 4.0 | −8.72 | 16.37 |
| 2.5 | −14.44 | 1.00 |

Numerical Example 8:

$f = 9.0–396.0$    Fno. = 1:1.75–2.9    $2\omega = 62.9°–1.59°$

| | | | |
|---|---|---|---|
| R 1 = 407.15 | D 1 = 5.50 | N 1 = 1.72311 | ν 1 = 29.5 |
| R 2 = 178.51 | D 2 = 0.70 | | |
| R 3 = 179.05 | D 3 = 10.78 | N 2 = 1.43496 | ν 2 = 95.1 |
| R 4 = 296.67 | D 4 = 25.50 | | |
| R 5 = 243.76 | D 5 = 19.77 | N 3 = 1.43496 | ν 3 = 95.1 |
| R 6 = −616.16 | D 6 = 0.30 | | |
| R 7 = 209.13 | D 7 = 14.71 | N 4 = 1.43496 | ν 4 = 95.1 |
| R 8 = 9704.09 | D 8 = 0.30 | | |
| R 9 = 128.46 | D 9 = 11.94 | N 5 = 1.49845 | ν 5 = 81.6 |
| R10 = 260.17 | D10 = Variable | | |
| R11 = 4023.52 | D11 = 2.00 | N 6 = 1.82017 | ν 6 = 46.6 |
| R12 = 45.38 | D12 = 6.48 | | |
| R13 = −126.52 | D13 = 1.80 | N 7 = 1.77621 | ν 7 = 49.6 |
| R14 = 62.77 | D14 = 5.48 | | |
| R15 = −82.20 | D15 = 1.80 | N 8 = 1.77621 | ν 8 = 49.6 |
| R16 = 49.76 | D16 = 6.55 | N 9 = 1.93306 | ν 9 = 21.3 |
| R17 = −265.81 | D17 = Variable | | |
| R18 = 188.04 | D18 = 8.14 | N10 = 1.49845 | ν10 = 81.6 |
| R19 = −114.16 | D19 = 0.30 | | |
| R20 = 146.94 | D20 = 2.50 | N11 = 1.85501 | ν11 = 23.9 |
| R21 = 75.16 | D21 = 10.57 | N12 = 1.48915 | ν12 = 70.2 |
| R22 = −154.73 | D22 = 0.20 | | |
| R23 = 132.35 | D23 = 9.51 | N13 = 1.62032 | ν13 = 63.4 |
| R24 = −101.15 | D24 = 2.50 | N14 = 1.85501 | ν14 = 23.9 |
| R25 = −261.67 | D25 = 0.20 | | |
| R26 = 85.31 | D26 = 6.80 | N15 = 1.48915 | ν15 = 70.2 |
| R27 = 437.21 | D27 = Variable | | |
| R28 = (Stop) | D28 = 3.71 | | |
| R29 = −67.77 | D29 = 1.80 | M16 = 1.79013 | ν16 = 44.2 |
| R30 = 19.80 | D30 = 5.95 | N17 = 1.81265 | ν17 = 25.4 |
| R31 = 82.24 | D31 = 5.95 | | |
| R32 = −30.36 | D32 = 1.60 | N18 = 1.73234 | ν18 = 54.7 |
| R33 = 30.50 | D33 = 9.09 | N19 = 1.59911 | ν19 = 39.2 |
| R34 = −29.62 | D34 = 24.00 | | |
| R35 = −265.91 | D35 = 6.95 | N20 = 1.48915 | ν20 = 70.2 |
| R36 = −31.29 | D36 = 0.20 | | |
| R37 = −53.44 | D37 = 2.20 | N21 = 1.79013 | ν21 = 44.2 |
| R38 = 42.93 | D38 = 7.93 | N22 = 1.50349 | ν22 = 56.4 |
| R39 = −46.33 | D39 = 1.10 | | |
| R40 = 154.81 | D40 = 7.15 | N23 = 1.55099 | ν23 = 45.8 |
| R41 = −28.84 | D41 = 2.20 | N24 = 1.81265 | ν24 = 25.4 |
| R42 = −111.80 | D42 = 0.20 | | |
| R43 = 68.31 | D43 = 5.68 | N25 = 1.51977 | ν25 = 52.4 |
| R44 = −64.11 | D44 = 5.00 | | |
| R45 = ∞ | D45 = 50.00 | N26 = 1.51825 | ν26 = 64.2 |

| Variable Separations | Focal Length | | |
|---|---|---|---|
| | 9.00 | 61.75 | 396.00 |
| D10 | 2.77 | 96.77 | 127.99 |
| D17 | 181.60 | 69.57 | 1.85 |
| D27 | 3.30 | 21.33 | 57.83 |

| Object Distance (m) | Focusing Movement of Rear Sub-Unit (mm) | D4 Separation (mm) |
|---|---|---|
| Infinite | 0 | 25.50 |
| 10.0 | −3.72 | 22.28 |
| 3.0 | −13.54 | 10.95 |
| 2.0 | −21.69 | 1.82 |

TABLE 6

| Condition No. | Factor | Numerical Example | | | |
|---|---|---|---|---|---|
| | | 5 | 6 | 7 | 8 |
| (8) | ϕA/ϕ | −0.022 | −0.263 | −0.023 | −0.240 |
| (9) | ΣA/ϕ | −0.0135 | −0.0173 | −0.0096 | −0.0122 |
| (10) | ΣA/ΣB | −0.935 | −1.078 | −0.821 | −0.913 |

TABLE 6-continued

| Condition | | Numerical Example | | | |
|---|---|---|---|---|---|
| No. | Factor | 5 | 6 | 7 | 8 |
| (11) | |Δd/ΔX| | 0.868 | 0.649 | 1.013 | 0.092 |

Further, in the above-described numerical examples 1 to 4, the front lens sub-unit is made stationary during focusing. However, the front lens sub-unit may be made to move during focusing, as exemplified in the following numerical examples 9 to 12. Lens block diagrams of the numerical examples 9 to 12 are shown in FIGS. 52 to 55, respectively. In the following numerical data for the numerical examples 9 to 12, MA, MB1 and MB2 indicate the amounts of movement of the front lens sub-unit LA, the first lens su-unit LB1 and the second lens sub-unit LB1, respectively, during focusing.

Numerical Example 9:

f = 9.5–133.0   Fno. = 1:1.9–2.1   2ω = 60.1°–4.74°

| | | | |
|---|---|---|---|
| R1 = 533.214 | D1 = 2.50 | N1 = 1.81265 | ν 1 = 25.4 |
| R2 = 106.173 | D2 = 1.55 | | |
| R3 = 127.661 | D3 = 12.26 | N2 = 1.43496 | ν 2 = 95.1 |
| R4 = –189.161 | D4 = 19.58 | | |
| R5 = 91.123 | D5 = 11.25 | N3 = 1.49845 | ν 3 = 81.6 |
| R6 = –244.448 | D6 = 0.50 | | |
| R7 = 53.821 | D7 = 6.12 | N4 = 1.69979 | ν 4 = 55.5 |
| R8 = 99.000 | D8 = Variable | | |
| R9 = 370.858 | D9 = 1.00 | N5 = 1.88814 | ν 5 = 40.8 |
| R10 = 19.784 | D10 = 3.41 | | |
| R11 = –154.420 | D11 = 0.80 | N6 = 1.80811 | ν 6 = 46.6 |
| R12 = 107.191 | D12 = 3.56 | | |
| R13 = –19.339 | D13 = 0.80 | N7 = 1.77621 | ν 7 = 49.6 |
| R14 = 30.741 | D14 = 4.36 | N8 = 1.85501 | ν 8 = 23.9 |
| R15 = –38.624 | D15 = Variable | | |
| R16 = –30.995 | D16 = 0.90 | N9 = 1.77621 | ν 9 = 49.6 |
| R17 = 37.640 | D17 = 3.35 | N10 = 1.81265 | ν 10 = 25.4 |
| R18 = –466.740 | D18 = Variable | | |
| R19 = (Stop) | D19 = 1.82 | | |
| R20 = 601.154 | D20 = 4.57 | N11 = 1.72794 | ν 11 = 38.0 |
| R21 = –38.250 | D21 = 0.10 | | |
| R22 = 64.791 | D22 = 6.49 | N12 = 1.50014 | ν 12 = 65.0 |
| R23 = –30.582 | D23 = 0.40 | N13 = 1.88814 | ν 13 = 40.8 |
| R24 = –105.189 | D24 = 0.10 | | |
| R25 = 41.709 | D25 = 7.33 | M14 = 1.51356 | ν 14 = 51.0 |
| R26 = –38.422 | D26 = 1.50 | N15 = 1.80811 | ν 15 = 46.6 |
| R27 = 96.078 | D27 = 17.02 | | |
| R28 = 210.096 | D28 = 6.49 | N16 = 1.489.15 | ν 16 = 70.2 |
| R29 = –37.387 | D29 = 0.15 | | |
| R30 = –149.350 | D30 = 1.50 | N17 = 1.83932 | ν 17 = 37.2 |
| R31 = 32.198 | D31 = 6.57 | N18 = 1.48915 | ν 18 = 70.2 |
| R32 = –98.679 | D32 = 0.15 | | |
| R33 = 111.174 | D33 = 6.84 | N19 = 1.51314 | ν 19 = 60.5 |
| R34 = –32.975 | D34 = 1.40 | N20 = 1.83932 | ν 20 = 37.2 |
| R35 = –69.428 | D35 = 0.15 | | |
| R36 = 49.514 | D36 = 5.25 | N21 = 1.48915 | ν 21 = 70.2 |
| R37 = –124.399 | D37 = 3.40 | | |
| R38 = ∞ | D38 = 55.50 | N22 = 1.51825 | ν 22 = 64.2 |
| R39 = ∞ | | | |

| Variable | Focal Length | | |
|---|---|---|---|
| Separations | 9.50 | 30.04 | 133.00 |
| D8 | 1.13 | 30.28 | 47.73 |
| D15 | 48.77 | 14.36 | 3.54 |
| D18 | 3.30 | 8.55 | 1.93 |

MB2 = 0.83035MB1 + 0.11110MB1² + 0.00966MB1³
MA = –1.48735MB1 + 0.00331MB1² + 0.00535MB1³

| Object Distance | MA | MB1 | MB2 | MB2/MB1 | Δd/Δx |
|---|---|---|---|---|---|
| 3.0 m | 3.623 | –2.477 | –1.522 | 0.614 | — |
| 0.9 m(M.O.D.) | 9.720 | –8.870 | –5.366 | 0.605 | –1.096 |

Numerical Example 10:

f = 9.5–133.0   Fno. = 1:1.9   2ω = 60.1°–4.74°

| | | | |
|---|---|---|---|
| R1 = 195.633 | D1 = 2.50 | N1 = 1.81264 | ν 1 = 25.4 |
| R2 = 265.594 | D2 = 9.45 | | |
| R3 = –426.292 | D3 = 9.71 | N2 = 1.43496 | ν 2 = 95.1 |
| R4 = –111.834 | D4 = 11.06 | | |
| R5 = 204.485 | D5 = 13.84 | N3 = 1.49845 | ν 3 = 81.6 |
| R6 = –138.386 | D6 = 0.15 | | |
| R7 = 93.703 | D7 = 9.20 | N4 = 1.49845 | ν 4 = 81.6 |
| R8 = 423.556 | D8 = 0.50 | | |
| R9 = 58.185 | D9 = 6.91 | N5 = 1.69979 | ν 5 = 55.5 |
| R10 = 87.331 | D10 = Variable | | |
| R11 = 80.391 | D11 = 1.00 | N6 = 1.82017 | ν 6 = 46.6 |
| R12 = 18.692 | D12 = 4.14 | | |
| R13 = –238.720 | D13 = 0.80 | N7 = 1.80811 | ν 7 = 46.6 |
| R14 = 145.498 | D14 = 3.87 | | |
| R15 = –20.408 | D15 = 0.80 | N8 = 1.77621 | ν 8 = 49.6 |
| R16 = 31.768 | D16 = 4.59 | N9 = 1.85501 | ν 9 = 23.9 |
| R17 = –47.214 | D17 = Variable | | |
| R18 = –28.330 | D18 = 0.90 | N10 = 1.77621 | ν 10 = 49.6 |
| R19 = 35.471 | D19 = 4.05 | N11 = 1.81265 | ν 11 = 25.4 |
| R20 = –443.149 | D20 = Variable | | |
| R21 = (Stop) | D21 = 1.83 | | |
| R22 = 255.001 | D22 = 5.26 | N12 = 1.67000 | ν 12 = 48.3 |
| R23 = –32.996 | D23 = 0.10 | | |
| R24 = 74.089 | D24 = 6.99 | N13 = 1.51678 | ν 13 = 54.7 |
| R25 = –25.634 | D25 = 1.40 | N14 = 1.82017 | ν 14 = 46.6 |
| R26 = –321.971 | D26 = 0.10 | | |
| R27 = 50.076 | D27 = 7.25 | N15 = 1.58482 | ν 15 = 40.8 |
| R28 = –29.928 | D28 = 1.50 | N16 = 1.82017 | ν 16 = 46.6 |
| R29 = 133.074 | D29 = 14.60 | | |
| R30 = 296.818 | D30 = 6.78 | N17 = 1.51825 | ν 17 = 64.2 |
| R31 = –34.609 | D31 = 0.15 | | |
| R32 = –198.343 | D32 = 1.50 | N18 = 1.83932 | ν 18 = 37.2 |
| R33 = 32.919 | D33 = 6.67 | N19 = 1.48915 | ν 19 = 70.2 |
| R34 = –107.263 | D34 = 0.15 | | |
| R35 = 72.631 | D35 = 8.42 | N20 = 1.51825 | ν 20 = 64.2 |
| R36 = –26.857 | D36 = 1.40 | N21 = 1.83932 | ν 21 = 37.2 |
| R37 = –101.491 | D37 = 0.15 | | |
| R38 = 69.958 | D38 = 6.28 | N22 = 1.48915 | ν 22 = 70.2 |
| R39 = –56.304 | D39 = 3.40 | | |
| R40 = ∞ | D40 = 55.50 | N23 = 1.51825 | ν 23 = 64.2 |
| R41 = ∞ | | | |

| Variable | Focal Length | | |
|---|---|---|---|
| Separations | 9.50 | 30.04 | 133.00 |
| D10 | 4.04 | 35.82 | 55.42 |
| D17 | 50.76 | 14.61 | 2.21 |
| D20 | 4.00 | 8.37 | 1.17 |

MB2 = 0.66467MB1 + 0.11372MB1² + 0.01025MB1³
MA = 0.14832MB1 – 0.09759MB1² – 0.00897MB1³

| Object Distance | MA | MB1 | MB2 | MB2/MB1 | Δd/Δx |
|---|---|---|---|---|---|
| 3.0 m | –1.294 | –3.428 | –1.355 | 0.395 | — |
| 0.8 m(M.O.D.) | –1.127 | –11.362 | –7.906 | 0.696 | 0.099 |

Numerical Example 11:

f = 9.0–396.0   Fno. = 1:1.75–3.3   2ω = 62.9°–1.59°

| | | | |
|---|---|---|---|
| R1 = –12195.181 | D1 = 5.50 | N1 = 1.62409 | ν 1 = 36.3 |
| R2 = 205.281 | D2 = 1.42 | | |
| R3 = 215.639 | D3 = 21.06 | N2 = 1.43496 | ν 2 = 95.1 |
| R4 = –761.401 | D4 = 25.68 | | |
| R5 = 303.002 | D5 = 16.10 | N3 = 1.43496 | ν 3 = 95.1 |

-continued

| | | | |
|---|---|---|---|
| R6 = −635.930 | D6 = 0.30 | | |
| R7 = 167.675 | D7 = 16.11 | N4 = 1.43496 | ν 4 = 95.1 |
| R8 = 4194.020 | D8 = 1.00 | | |
| R9 = 133.825 | D9 = 7.07 | N5 = 1.43985 | ν 5 = 95.0 |
| R10 = 206.204 | D10 = Variable | | |
| R11 = −2292.006 | D11 = 2.00 | N6 = 1.82017 | ν 6 = 46.6 |
| R12 = 42.438 | D12 = 6.91 | | |
| R13 = −89.578 | D13 = 1.80 | N7 = 1.77621 | ν 7 = 49.6 |
| R14 = 79.593 | D14 = 3.72 | | |
| R15 = −91.851 | D15 = 1.80 | N8 = 1.77621 | ν 8 = 49.6 |
| R16 = 46.032 | D16 = 6.98 | N9 = 1.93306 | ν 9 = 21.3 |
| R17 = −251.802 | D17 = Variable | | |
| R18 = 202.243 | D18 = 8.74 | N10 = 1.49845 | ν 10 = 81.6 |
| R19 = −121.699 | D19 = 0.30 | | |
| R20 = 120.712 | D20 = 2.50 | N11 = 1.85501 | ν 11 = 23.9 |
| R21 = 66.746 | D21 = 11.92 | N12 = 1.48915 | ν 12 = 70.2 |
| R22 = −163.367 | D22 = 0.20 | | |
| R23 = 121.255 | D23 = 10.94 | N13 = 1.62032 | ν 13 = 63.4 |
| R24 = −96.607 | D24 = 2.50 | N14 = 1.85501 | ν 14 = 23.9 |
| R25 = −261.202 | D25 = 0.20 | | |
| R26 = 90.484 | D26 = 7.52 | N15 = 1.48915 | ν 15 = 70.2 |
| R27 = 510.884 | D27 = Variable | | |
| R28 = (Stop) | D28 = 2.64 | | |
| R29 = −71.361 | D29 = 1.80 | N16 = 1.79013 | ν 16 = 44.2 |
| R30 = 19.175 | D30 = 5.77 | N17 = 1.81265 | ν 17 = 25.4 |
| R31 = 74.856 | D31 = 6.00 | | |
| R32 = −29.479 | D32 = 1.60 | N18 = 1.73234 | ν 18 = 54.7 |
| R33 = 32.711 | D33 = 8.82 | N19 = 1.59911 | ν 19 = 39.2 |
| R34 = −28.807 | D34 = 24.00 | | |
| R35 = −153.141 | D35 = 6.44 | N20 = 1.48915 | ν 20 = 70.2 |
| R36 = −30.966 | D36 = 0.20 | | |
| R37 = −54.491 | D37 = 2.20 | N21 = 1.79013 | ν 21 = 44.2 |
| R38 = 41.225 | D38 = 7.72 | N22 = 1.50349 | ν 22 = 56.4 |
| R39 = −48.561 | D39 = 1.10 | | |
| R40 = 173.495 | D40 = 7.17 | N23 = 1.55099 | ν 23 = 45.8 |
| R41 = −27.830 | D41 = 2.20 | N24 = 1.81265 | ν 24 = 25.4 |
| R42 = −94.901 | D42 = 0.20 | | |
| R43 = 63.753 | D43 = 5.89 | N25 = 1.51977 | ν 25 = 52.4 |
| R44 = −62.214 | D44 = 5.00 | | |
| R45 = ∞ | D45 = 50.00 | N26 = 1.51825 | ν 26 = 64.2 |
| R46 = ∞ | | | |

| Variable Separations | Focal Length | | |
|---|---|---|---|
| | 9.00 | 61.75 | 396.00 |
| D10 | 2.20 | 96.20 | 127.42 |
| D17 | 181.02 | 68.99 | 1.27 |
| D27 | 3.30 | 21.33 | 57.83 |

$MB2 = 0.47921MB1 + 0.05718MB1^2 + 0.00351MB1^3$
$MA = 0.08385MB1 − 0.04012MB1^2 − 0.00207MB1^3$

| Object Distance | MA | MB1 | MB2 | MB2/MB1 | Δd/Δx |
|---|---|---|---|---|---|
| 10.0 m | −1.109 | −4.833 | −1.377 | 0.285 | — |
| 1.7 m(M.O.D.) | 1.605 | −22.676 | −22.391 | 0.987 | −0.071 |

Numerical Example 12:

f = 10.0 − 440.0   Fno. = 1:1.75 − 3.0   2ω = 57.60° − 1.43°

| | | | |
|---|---|---|---|
| R1 = 379.828 | D1 = 5.50 | N1 = 1.74618 | ν 1 = 28.3 |
| R2 = 186.863 | D2 = 0.56 | | |
| R3 = 184.777 | D3 = 13.12 | N2 = 1.43496 | ν 2 = 95.1 |
| R4 = 582.434 | D4 = 39.94 | | |
| R5 = 320.718 | D5 = 17.27 | N3 = 1.43496 | ν 3 = 95.1 |
| R6 = −493.373 | D6 = 0.30 | | |
| R7 = 189.386 | D7 = 14.52 | N4 = 1.43496 | ν 4 = 95.1 |
| R8 = 1332.151 | D8 = 1.00 | | |
| R9 = 121.356 | D9 = 11.01 | N5 = 1.49845 | ν 5 = 81.6 |
| R10 = 194.765 | D10 = Variable | | |
| R11 = 20035.887 | D11 = 2.00 | N6 = 1.82017 | ν 6 = 46.6 |
| R12 = 49.319 | D12 = 5.33 | | |
| R13 = −151.124 | D13 = 1.80 | N7 = 1.77621 | ν 7 = 49.6 |
| R14 = 60.835 | D14 = 5.04 | | |
| R15 = −70.464 | D15 = 1.80 | N8 = 1.77621 | ν 8 = 49.6 |
| R16 = 48.837 | D16 = 6.55 | N9 = 1.93306 | ν 9 = 21.3 |
| R17 = −375.689 | D17 = Variable | | |
| R18 = 282.657 | D18 = 8.70 | N10 = 1.49845 | ν 10 = 81.6 |
| R19 = −100.571 | D19 = 0.30 | | |
| R20 = 157.499 | D20 = 2.50 | N11 = 1.81265 | ν 11 = 25.4 |
| R21 = 83.038 | D21 = 11.25 | N12 = 1.48915 | ν 12 = 70.2 |
| R22 = −152.190 | D22 = 0.20 | | |
| R23 = 139.976 | D23 = 10.57 | N13 = 1.62032 | ν 13 = 63.4 |
| R24 = −97.647 | D24 = 2.50 | N14 = 1.85501 | ν 14 = 23.9 |
| R25 = −253.501 | D25 = 0.20 | | |
| R26 = 91.150 | D26 = 7.16 | N15 = 1.48915 | ν 15 = 70.2 |
| R27 = 500.080 | D27 = Variable | | |
| R28 = (Stop) | D28 = 4.07 | | |
| R29 = −55.871 | D29 = 1.80 | N16 = 1.79013 | ν 16 = 44.2 |
| R30 = 25.902 | D30 = 5.48 | N17 = 1.81265 | ν 17 = 25.4 |
| R31 = 132.845 | D31 = 6.10 | | |
| R32 = −30.146 | D32 = 1.60 | N18 = 1.73234 | ν 18 = 54.7 |
| R33 = 32.186 | D33 = 10.57 | N19 = 1.59911 | ν 19 = 39.2 |
| R34 = −27.399 | D34 = 24.00 | | |
| R35 = −262.034 | D35 = 6.95 | N20 = 1.48915 | ν 20 = 70.2 |
| R36 = −31.464 | D36 = 0.20 | | |
| R37 = −53.855 | D37 = 2.20 | N21 = 1.79913 | ν 21 = 44.2 |
| R38 = 41.011 | D38 = 7.81 | N22 = 1.50349 | ν 22 = 56.4 |
| R39 = −52.466 | D39 = 1.10 | | |
| R40 = 128.364 | D40 = 7.29 | N23 = 1.55099 | ν 23 = 45.8 |
| R41 = −28.992 | D41 = 2.20 | N24 = 1.81265 | ν 24 = 25.4 |
| R42 = −121.651 | D42 = 0.20 | | |
| R43 = 73.014 | D43 = 5.52 | N25 = 1.51977 | ν 25 = 52.4 |
| R44 = −66.471 | D44 = 5.00 | | |
| R45 = ∞ | D45 = 50.00 | N26 = 1.51825 | ν 26 = 64.2 |
| R46 = ∞ | | | |

| Variable Separations | Focal Length | | |
|---|---|---|---|
| | 10.00 | 69.78 | 440.00 |
| D10 | 2.65 | 92.65 | 121.65 |
| D17 | 178.58 | 69.39 | 2.62 |
| D27 | 3.30 | 22.49 | 60.26 |

$MB2 = 0.58265MB1 + 0.05363MB1^2 + 0.00368MB1^3$
$MA = −0.19904MB1 − 0.05107MB1^2 − 0.00450MB1^3$

| Object Distance | MA | MB1 | MB2 | MB2/MB1 | Δd/Δx |
|---|---|---|---|---|---|
| 10.0 m | 0.281 | −4.993 | −2.030 | 0.407 | — |
| 2.0 m(M.O.D.) | 18.270 | −19.642 | −18.641 | 0.949 | −0.930 |

According to the invention, as is understandable from the foregoing, a 4-unit zoom lens is constructed with inclusion of a first lens unit for focusing. This lens unit is divided into two lens sub-units, both of which are axially moved to effect focusing. With the use of such a floating focusing method, when to increase the relative aperture and the zooming range, rules of design are set forth for the form and the construction and arrangement of the constituent lenses. When these rules are fulfilled, the variation of spherical aberration and longitudinal chromatic aberration with focusing is reduced. Hence, it is made possible to achieve a large relative aperture, high range zoom lens having an F-number of about 1.75 at the wide-angle end and a zoom ratio of 14 to 44 or thereabouts, while still permitting good stability of high optical performance to be maintained throughout the entire zooming range and throughout the entire focusing range.

What is claimed is:

1. A zoom lens comprising, from front to rear, a lens unit having a positive refractive power, said lens unit having a front lens sub-unit of negative refractive power, a first lens sub-unit of positive refractive power and a second lens sub-unit of positive refractive power; and a plurality of lens units movable for zooming, wherein separation between each adjacent two of said front, first and second lens sub-units varies during focusing and wherein said front lens sub-unit of negative refractive power stands still, and said first and second lens sub-units move toward an object side during focusing from an infinitely distant object to an object at a minimum distance.

2. A zoom lens according to claim 1, satisfying the following condition:

$$MB2/MB1<1$$

where MB1 and MB2 are amounts of movement of said first lens sub-unit and said second lens sub-unit, respectively, during focusing.

3. A zoom lens according to claim 1, satisfying the following condition:

$$1.05<FN1$$

where FN1 $(1/\phi 1)/((1/\phi T)/FNT)$ wherein $\phi T$ and FNT are a refractive power and an F-number of the entire system in a telephoto end, respectively and $\phi 1$ and FN1 are a refractive power and an F-number of said first lens unit, respectively.

4. A zoom lens according to claim 1, wherein said front lens sub-unit has a negative lens and a positive lens, where a refractive power of said front lens sub-unit is denoted by $\phi A$, and a total sum of ratios of refractive powers $\phi Ai$ and Abbe numbers $vAi$ of materials of all lenses contained in said front lens sub-unit is denoted by $\Sigma A=\phi Ai/vAi$; said first lens sub-unit has at least one positive lens, where a refractive power of said first lens sub-unit is denoted by $\phi B1$, and a total sum of ratios of refractive powers $\phi B1,i$ and Abbe numbers $vB2,i$ of materials of all positive lenses contained in said first lens sub-unit is denoted by $\Sigma B1=\phi B1,i/vB1,i$; and said second lens sub-unit has a positive lens of meniscus form convex toward an object side, where a refractive power of said second lens sub-unit is denoted by $\phi B2$, and a ratio of a refractive power $\phi B2,1$ and an Abbe number $vB2,1$ of a material of the positive lens contained in said second lens sub-unit is denoted by $\Sigma B2=\phi B2,1/vB2,1$, wherein the following conditions are satisfied:

$$0.30<\phi A/\phi 1<-0.0095$$

$$0.02<\Sigma A/\phi 1<-0.009$$

$$1.22<\Sigma A/(\Sigma B1+\Sigma B2)<-0.77$$

$$0.23<\phi B2/\phi B1<0.95$$

$$0.23<\Sigma \phi B2/\Sigma \phi B1<1.40.$$

5. A zoom lens according to claim 1, wherein said plurality of lens units has, in order from front, a second lens unit having a negative refractive power and movable for zooming and a third lens unit movable for zooming.

6. A zoom lens according to claim 1, wherein said front lens sub-unit comprises a negative lens and a positive lens.

7. A zoom lens according to claim 1, wherein said front lens sub-unit comprises, from front to rear, a negative lens and a positive lens.

8. A zoom lens according to claim 7, wherein said front lens sub-unit consists of said negative lens and said positive lens.

9. A zoom lens according to claim 1, wherein each of said first lens sub-unit and said second lens sub-unit consists of a positive lens.

10. A zoom lens according to claim 1, wherein said first lens sub-unit comprises two positive lenses.

11. A zoom lens according to claim 10, wherein said second lens sub-unit consists of a positive lens.

12. A zoom lens comprising, from front to rear:

a front lens unit having a positive refractive power, said front lens unit comprising a front lens sub-unit of negative refractive power and a rear lens sub-unit of positive refractive power; and a plurality of lens units movable for zooming, wherein for focusing purposes, both of said front and rear lens sub-units move, where the amounts of movement of said front and rear lens sub-units are different, and wherein during focusing from an infinitely distant object to an object at a shorter distance, said rear lens sub-unit moves toward an object side monotonically and said front lens sub-unit moves so that a focusing position thereof for the object at the shorter distance lies nearer to an image side than a focusing position thereof for the infinitely distant object.

13. A zoom lens according to claim 12, satisfying the following condition:

$$0.08<|\Delta d/\Delta X|<1.10$$

where $\Delta d$ and $\Delta X$ are axial differences between the focusing positions for the infinitely distant object and an object at a minimum distance of said front lens sub-unit and said rear lens sub-unit, respectively.

14. A zoom lens according to claim 12, wherein said front lens sub-unit has at least a negative first lens and a positive second lens, where a refractive power of said front lens sub-unit is denoted by $\phi A$, and a total sum of ratios of a refractive power $\phi Ai$ and an Abbe number $vAi$ of the i-th lens in said front lens sub-unit is denoted by $\Sigma A=\phi Ai/vAi$; and said rear lens sub-unit has a positive first lens and a positive second lens, where a refractive power of said rear lens sub-unit is denoted by $\phi B$, and a total sum of ratios of a refractive power $\phi Bi$ and an Abbe number $vBi$ of the i-th lens in said rear lens sub-unit is denoted by $\Sigma B=\phi Bi/vBi$, wherein the following conditions are satisfied:

$$0.3<\phi A/\phi<-0.02$$

$$0.018<\Sigma A/\phi<-0.008$$

$$1.15<\Sigma A/\Sigma B<-0.75$$

where $\phi$ is a refractive power of said front lens unit.

15. A zoom lens according to claims 12, wherein during focusing from an infinitely distant object to an object at a nearer distance, said front lens sub-unit moves toward an image side monotonically.

16. A zoom lens according to claim 12, wherein during focusing from an infinitely distant object to an object at a nearer distance, said front lens sub-unit moves in a locus convex toward an object side.

17. A zoom lens according to claim 12, wherein the shorter distance is the minimum object distance.

18. A zoom lens according to claim 12, wherein said front lens sub-unit comprises a negative lens and a positive lens.

19. A zoom lens according to claimed 12, wherein said front lens sub-unit comprises, from front to rear, a negative lens and a positive lens.

20. A zoom lens according to claim 19, wherein said front lens sub-unit consists of said negative lens and said positive lens.

* * * * *

UNITED STATES PATENT AND TRADEMARK OFFICE
CERTIFICATE OF CORRECTION

PATENT NO. : 5,760,967

DATED : June 2, 1998

INVENTOR(S) : CHIAKI TERASAWA, ET AL.

It is certified that error appears in the above-identified patent and that said Letters Patent is hereby corrected as shown below:

COLUMN 1:

Line 27, "no" should be deleted.

COLUMN 4:

Line 15, "make." should read --be made.--; and
    Line 61, "having-a" should read --having a--.

COLUMN 6:

Line 51, "are is" should read --are--; and
    Line 55, "are is" should read --are--.

COLUMN 10:

Line 62, "each-other" should read --each other--.

COLUMN 11:

Line 51, "0.30" should read ---0.30--;
    Line 52, "0.02" should read ---0.02--; and
    Line 54, "1.22" should read ---1.22--.

UNITED STATES PATENT AND TRADEMARK OFFICE
CERTIFICATE OF CORRECTION

PATENT NO. : 5,760,967

DATED : June 2, 1998

INVENTOR(S) : CHIAKI TERASAWA, ET AL.

It is certified that error appears in the above-identified patent and that said Letters Patent is hereby corrected as shown below:

COLUMN 12:

Line 60, "subunit" should read --sub-unit--.

COLUMN 13:

Line 9, "undercorrection" should read --under-correction--; and
    Line 13, "subunits" should read --sub-units--.

COLUMN 15:

Line 3, "lenses." should read --lens.--; and
    Line 26, "be to" should read --be--.

COLUMN 16:

Line 1, "the." should read --the--; and
    Line 53, "lenses," should read --lens,--.

COLUMN 17:

Line 12, "lenses," should read --lens,--;
    Line 48, "lenses," should read --lens,--.

UNITED STATES PATENT AND TRADEMARK OFFICE
CERTIFICATE OF CORRECTION

PATENT NO. : 5,760,967

DATED : June 2, 1998

INVENTOR(S) : CHIAKI TERASAWA, ET AL.

It is certified that error appears in the above-identified patent and that said Letters Patent is hereby corrected as shown below:

COLUMN 25:

Line 7, "0.3" should read ---0.3--;
Line 9, "0.018" should read ---0.018--; and
Line 11, "1.15" should read ---1.15--.

COLUMN 28:

Line 41, "negative lenses" should read --negative lens--; and
Line 56, "$\phi_A$" should read --$\phi_A/\phi$--.

COLUMN 29:

Line 25, "R1" should read --Ri--.

COLUMN 33:

Line 17, "su-unit" should read --sub-unit--.

COLUMN 35:

Line 52, "57.60°" should read --57.6°--.

UNITED STATES PATENT AND TRADEMARK OFFICE
CERTIFICATE OF CORRECTION

PATENT NO. : 5,760,967
DATED : June 2, 1998
INVENTOR(S) : CHIAKI TERASAWA, ET AL.

It is certified that error appears in the above-identified patent and that said Letters Patent is hereby corrected as shown below:

COLUMN 36:

Line 23, "N21=1.79913" should read --N21=1.79013--; and
    Line 67, "focusing" should read --focusing,--.

COLUMN 37:

Line 18, "FN1" should read --FN1=--;
    Line 43, "0.30" should read ---0.30--;
    Line 45, "0.02" should read ---0.02--; and
    Line 46, "1.22" should read ---1.22--.

UNITED STATES PATENT AND TRADEMARK OFFICE
CERTIFICATE OF CORRECTION

PATENT NO.   : 5,760,967

DATED        : June 2, 1998

INVENTOR(S)  : CHIAKI TERASAWA, ET AL.

It is certified that error appears in the above-identified patent and that said Letters Patent is hereby corrected as shown below:

COLUMN 38:

```
Line  9, "wherein" should begin a new paragraph.
Line 42, "0.3" should read ---0.3--;
Line 44, "0.018" should read ---0.018--;
Line 45, "1.15" should read -- -1.15--;
Line 48, "claims" should read --claim--; and
Line 60, "claimed" should read --claim--.
```

Signed and Sealed this

Eleventh Day of May, 1999

Attest:

Q. TODD DICKINSON

Attesting Officer

Acting Commissioner of Patents and Trademarks